(12) United States Patent
Takiguchi et al.

(10) Patent No.: US 9,223,159 B2
(45) Date of Patent: Dec. 29, 2015

(54) SPATIAL LIGHT MODULATION DEVICE AND SPATIAL LIGHT MODULATION METHOD

(75) Inventors: Yuu Takiguchi, Hamamatsu (JP); Naoya Matsumoto, Hamamatsu (JP); Tomoko Otsu, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 75 days.

(21) Appl. No.: 14/000,428

(22) PCT Filed: Feb. 13, 2012

(86) PCT No.: PCT/JP2012/053303
§ 371 (c)(1),
(2), (4) Date: Oct. 10, 2013

(87) PCT Pub. No.: WO2012/114924
PCT Pub. Date: Aug. 30, 2012

(65) Prior Publication Data
US 2014/0036180 A1    Feb. 6, 2014

(30) Foreign Application Priority Data
Feb. 22, 2011   (JP) ................................ P2011-036307

(51) Int. Cl.
  *G02F 1/133*   (2006.01)
  *G02F 1/136*   (2006.01)
  *G02B 26/06*   (2006.01)
  (Continued)

(52) U.S. Cl.
  CPC ............ *G02F 1/13306* (2013.01); *G02B 26/06* (2013.01); *G02F 1/136* (2013.01); *G03H 1/0808* (2013.01); *G03H 1/2294* (2013.01); *G09G 3/36* (2013.01); *G02F 2203/12* (2013.01); *G02F 2203/21* (2013.01); *G02F 2203/50* (2013.01); *G02F 2203/60* (2013.01); *G03H 2001/0224* (2013.01); *G03H 2225/32* (2013.01); *G09G 2320/041* (2013.01)

(58) Field of Classification Search
None
See application file for complete search history.

(56) References Cited

U.S. PATENT DOCUMENTS

2006/0098156 A1   5/2006  Frisken et al.
2006/0227402 A1*  10/2006 Maram et al. ................. 359/279
(Continued)

FOREIGN PATENT DOCUMENTS

CN    101226292     7/2008
CN    101889238    11/2010
(Continued)

*Primary Examiner* — Jason Olson
*Assistant Examiner* — Krishna Neupane
(74) *Attorney, Agent, or Firm* — Drinker Biddle & Reath LLP

(57) ABSTRACT

A spatial light modulation device includes a phase-modulation type spatial light modulator, a temperature sensor detecting a temperature of the spatial light modulator, and a control unit providing a drive signal to the spatial light modulator. The control unit has a storage unit. The storage unit stores N correction patterns created so as to correspond to N (N is an integer not less than 2) temperature values of the spatial light modulator in order to correct phase distortion of the spatial light modulator. The control unit selects one correction pattern according to a temperature value of the spatial light modulator, and generates the drive signal based on a phase pattern created by adding the one correction pattern to a desired phase pattern. Thereby, it becomes possible to suppress phase distortion according to a temperature change while suppressing a delay in operation.

23 Claims, 36 Drawing Sheets

(51) Int. Cl.
*G03H 1/22* (2006.01)
*G03H 1/08* (2006.01)
*G09G 3/36* (2006.01)
*G03H 1/02* (2006.01)

(56) References Cited

U.S. PATENT DOCUMENTS

2008/0174581 A1* 7/2008 Matsumoto et al. .......... 345/205
2010/0295836 A1* 11/2010 Matsumoto et al. .......... 345/211

FOREIGN PATENT DOCUMENTS

| | | |
|---|---|---|
| JP | H8-152602 | 6/1996 |
| JP | H10-186283 A | 7/1998 |
| JP | 2001-343629 | 12/2001 |
| JP | 2003-204100 A | 7/2003 |
| JP | 2008-519298 A | 6/2008 |
| JP | 2008-519598 | 6/2008 |
| JP | 2009-031367 A | 2/2009 |
| WO | WO-2009/072563 A1 | 6/2009 |

* cited by examiner

*Fig.2*
(a)
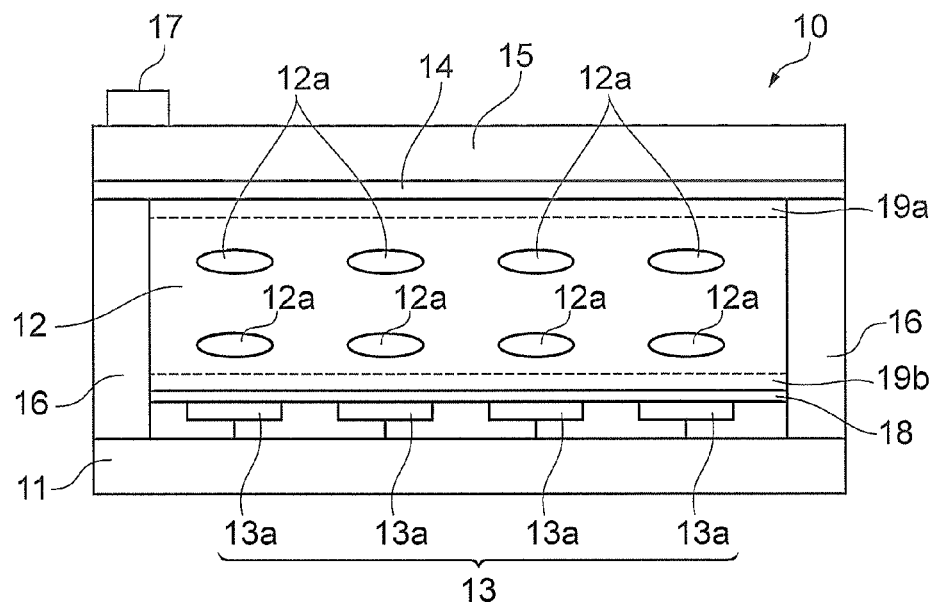
(b)
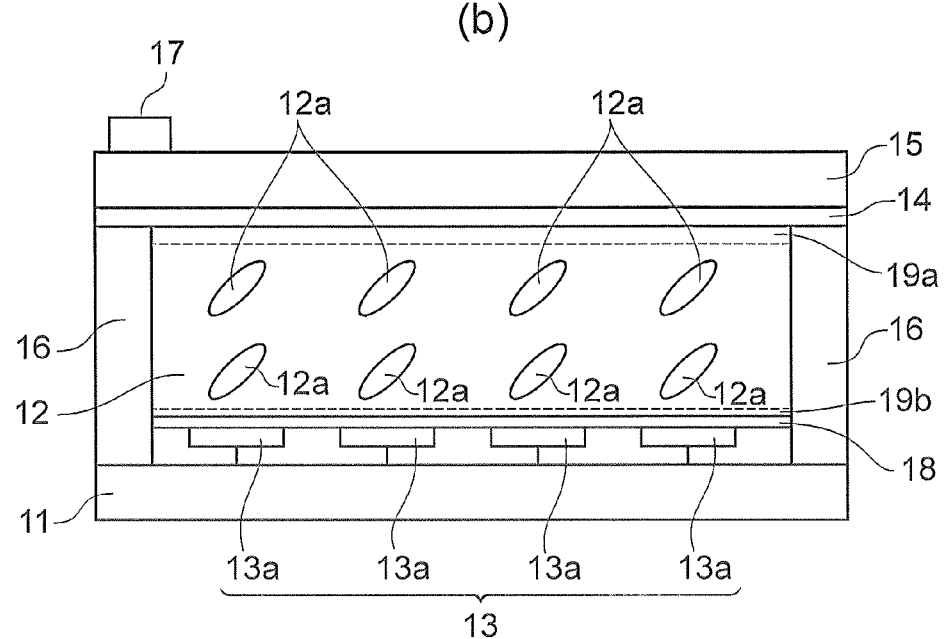

Fig.5
(a) 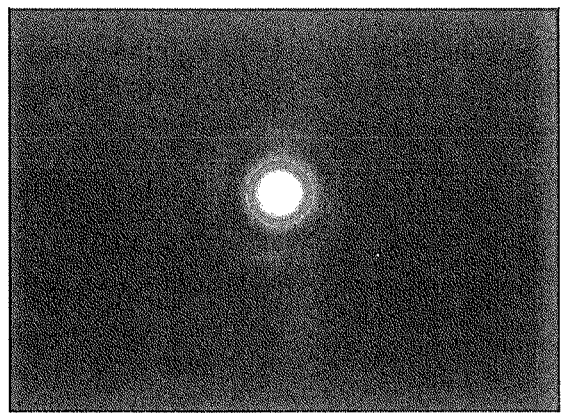
(b) 

SPATIAL LIGHT MODULATION DEVICE AND SPATIAL LIGHT MODULATION METHOD

TECHNICAL FIELD

The present invention relates to a spatial light modulation device and a spatial light modulation method.

BACKGROUND ART

In Patent Document 1, there is described a technology for forming a clear image with high light use efficiency in an image forming device including a phase-modulation type spatial light modulator. The device described in this document generates a Fourier optical image of a phase modulation optical image output from the spatial light modulator, and provides a predetermined phase shift for only the zero-order light component of the Fourier optical image, and takes an optical image which is obtained by performing inverse Fourier transformation of the phase-shifted optical image with an imaging device. This device compares the image obtained in this way and a target image input to the spatial light modulator, and carries out feedback control of a light source, the spatial light modulator, and the like, based on a difference between the images.

CITATION LIST

Patent Literature

Patent Document 1: Japanese Patent Application Laid-Open No. H10-186283

SUMMARY OF INVENTION

Technical Problem

Conventionally, a technology of modulating a phase of light by a spatial light modulator (SLM) has been known. A spatial light modulator is used for, for example, controlling an irradiation spot shape of a laser beam with which a processing object is irradiated in laser processing. As a typical structure of a spatial light modulator, for example, there is a structure in which a liquid crystal layer is provided on a substrate made of silicon or the like, and a plurality of electrodes composing pixels are disposed between the substrate and the liquid crystal layer. When light is made incident into such a spatial light modulator, the light passes through the liquid crystal layer and is reflected on the substrate surface, and again passes through the liquid crystal layer, to be emitted. Then, when the light passes through the liquid crystal layer, a phase of the light is modulated according to a level of voltage applied to each electrode.

However, there is the following problem in the spatial light modulator. That is, when a temperature of the spatial light modulator changes, the substrate warps due to a difference in the coefficient of thermal expansion of the substrate, the electrodes, and the like. Such a warpage in the substrate has an effect on a phase of light reflected on the substrate surface. That is, an error is caused in a phase modulation amount of reflected light on each pixel, which causes distortion in a phase distribution of an entire reflected optical image. For example, when such distortion in a phase distribution is caused in laser processing, it becomes impossible to obtain a desired irradiation spot shape with a high degree of accuracy, which exerts a great effect on processing accuracy.

In addition, in the technology described in Patent Document 1, it is necessary to repeatedly perform a feedback loop until a desired output image is obtained, which leads to a delay in operation of the device. Further, in actuality, irregular variation is caused in an output image due to fluctuation of a light source or the like. Because such irregular variation is included in an image of base of feedback control, it is extremely difficult to obtain the desired modulation accuracy.

The present invention has been made in view of the above problem, and an object thereof is to provide a spatial light modulation device and a spatial light modulation method which are capable of suppressing distortion in a phase distribution according to a temperature change in a spatial light modulator while suppressing a delay in operation.

Solution to Problem

In order to solve the above-described problem, a first spatial light modulation device according to the present invention includes (1) a spatial light modulator modulating a phase of incident light for each of a plurality of pixels one-dimensionally or two-dimensionally arrayed, (2) a temperature sensor generating a temperature signal which is a signal corresponding to a temperature of the spatial light modulator, and (3) a control unit providing a drive signal for controlling a phase modulation amount for each of the plurality of pixels to the spatial light modulator. The control unit has storage means storing N correction patterns which are created so as to correspond to N (N is an integer not less than 2) temperature values of the spatial light modulator in order to correct phase distortion of the spatial light modulator. The control unit selects one correction pattern from among the N correction patterns according to a temperature value indicated by the temperature signal, and generates the drive signal based on a corrected phase pattern which is created by adding the one correction pattern to a desired phase pattern.

In the first spatial light modulation device described above, the storage means of the control unit stores the N correction patterns for correcting phase distortion of the spatial light modulator. These correction patterns respectively correspond to the N temperature values of the spatial light modulator. The control unit selects one correction pattern according to a temperature value indicated by the temperature signal from the temperature sensor, and adds the correction pattern to the desired phase pattern. In accordance with such a configuration, it is possible to preferably suppress distortion in a phase distribution according to a temperature change in the spatial light modulator. Further, because the processing in the control unit has only to select and add one correction pattern corresponding to a temperature value, it is possible to keep a delay in operation to a minimum.

Further, a first spatial light modulation method according to the present invention which uses a spatial light modulator modulating a phase of incident light for each of a plurality of pixels one-dimensionally or two-dimensionally arrayed, the spatial light modulation method includes (1) a temperature acquisition step of acquiring a temperature signal which is a signal corresponding to a temperature of the spatial light modulator from a temperature sensor, (2) a correction pattern selection step of selecting one correction pattern according to a temperature value indicated by the temperature signal from among N correction patterns which are created in advance so as to correspond to N (N is an integer not less than 2) temperature values of the spatial light modulator in order to correct phase distortion of the spatial light modulator, (3) a drive signal generation step of generating a drive signal based on a corrected phase pattern which is created by adding the one correction pattern to a desired phase pattern, and (4) a modulation control step of controlling a phase modulation amount for each of the plurality of pixels by the drive signal.

In the first spatial light modulation method described above, the N correction patterns for correcting phase distortion of the spatial light modulator are used in the correction pattern selection step. These correction patterns respectively correspond to the N temperature values of the spatial light modulator. In the correction pattern selection step, one correction pattern is selected according to a temperature value indicated by the temperature signal from the temperature sensor. Then, in the drive signal generation step, the correction pattern is added to the desired phase pattern. In accordance with such a method, it is possible to preferably suppress distortion in a phase distribution according to a temperature change in the spatial light modulator. Further, because the processing in the control means for realizing the spatial light modulation method has only to select and add one correction pattern corresponding to a temperature value, it is possible to keep a delay in operation to a minimum.

A second spatial light modulation device according to the present invention includes (1) a spatial light modulator modulating a phase of incident light for each of a plurality of pixels one-dimensionally or two-dimensionally arrayed, (2) a temperature sensor generating a temperature signal which is a signal corresponding to a temperature of the spatial light modulator, and (3) a control unit providing a drive signal for controlling a phase modulation amount for each of the plurality of pixels to the spatial light modulator. The control unit has storage means storing N coefficient value groups calculated from N correction patterns which are created so as to correspond to N (N is an integer not less than 2) temperature values of the spatial light modulator in order to correct phase distortion of the spatial light modulator. The control unit selects one coefficient value group from among the N coefficient value groups according to a temperature value indicated by the temperature signal, and generates the drive signal based on a corrected phase pattern which is created by adding the correction pattern reconstructed from the one coefficient value group to a desired phase pattern.

In the second spatial light modulation device described above, the storage means of the control unit stores the N coefficient value groups for correcting phase distortion of the spatial light modulator. These coefficient value groups are calculated from the N correction patterns which are created so as to respectively correspond to the N temperature values of the spatial light modulator. The control unit selects one coefficient value group according to a temperature value indicated by the temperature signal from the temperature sensor, and reconstructs a correction pattern from this coefficient value group, and thereafter adds the correction pattern to the desired phase pattern. In accordance with such a configuration, it is possible to preferably suppress distortion in a phase distribution according to a temperature change in the spatial light modulator. Further, because the processing in the control unit has only to select one coefficient value group corresponding to a temperature value, and reconstruct and add the correction pattern, it is possible to keep a delay in operation to a minimum.

Further, a second spatial light modulation method according to the present invention which uses a spatial light modulator modulating a phase of incident light for each of a plurality of pixels one-dimensionally or two-dimensionally arrayed, the spatial light modulation method includes (1) a temperature acquisition step of acquiring a temperature signal which is a signal corresponding to a temperature of the spatial light modulator from a temperature sensor, (2) a coefficient value group selection step of selecting one coefficient value group according to a temperature value indicated by the temperature signal from among N coefficient value groups calculated in advance from N correction patterns which are created so as to correspond to N (N is an integer not less than 2) temperature values of the spatial light modulator in order to correct phase distortion of the spatial light modulator, (3) a drive signal generation step of generating a drive signal based on a corrected phase pattern which is created by adding the correction pattern reconstructed from the one coefficient value group to a desired phase pattern, and (4) a modulation control step of controlling a phase modulation amount for each of the plurality of pixels by the drive signal.

In the second spatial light modulation method described above, the N coefficient value groups for correcting phase distortion of the spatial light modulator are used in the coefficient value group selection step. These coefficient value groups are calculated from the N correction patterns which are created so as to respectively correspond to the N temperature values of the spatial light modulator. In the coefficient value group selection step, one coefficient value group is selected according to a temperature value indicated by the temperature signal from the temperature sensor. Then, in the drive signal generation step, after a correction pattern is reconstructed from this coefficient value group, the correction pattern is added to the desired phase pattern. In accordance with such a method, it is possible to preferably suppress distortion in a phase distribution according to a temperature change in the spatial light modulator. Further, because the processing in the control means for realizing the spatial light modulation method has only to select one coefficient value group corresponding to a temperature value, and reconstruct and add the correction pattern, it is possible to keep a delay in operation to a minimum.

A third spatial light modulation device according to the present invention includes (1) a spatial light modulator modulating a phase of incident light for each of a plurality of pixels one-dimensionally or two-dimensionally arrayed, (2) a temperature sensor generating a temperature signal which is a signal corresponding to a temperature of the spatial light modulator, and (3) a control unit providing a drive signal for controlling a phase modulation amount for each of the plurality of pixels to the spatial light modulator. The control unit has storage means storing a function of the temperature value and N coefficient value groups calculated from N correction patterns which are created so as to correspond to N (N is an integer not less than 2) temperature values of the spatial light modulator in order to correct phase distortion of the spatial light modulator. The control unit calculates one coefficient value group from among the N coefficient value groups by applying a temperature value indicated by the temperature signal to the function, and generates the drive signal based on a corrected phase pattern which is created by adding the correction pattern reconstructed from the one coefficient value group to a desired phase pattern.

In the third spatial light modulation device described above, the storage means of the control unit stores the function for correcting phase distortion of the spatial light modulator. This function is a function of the N coefficient value groups and the temperature values, and the N coefficient value groups are calculated from the N correction patterns which are created so as to respectively correspond to the N temperature values of the spatial light modulator. The control unit applies a temperature value indicated by the temperature signal from the temperature sensor to the function, to calculate one coefficient value group, and reconstructs a correction pattern from this coefficient value group, and thereafter adds the correction pattern to the desired phase pattern. In accordance with such a configuration, it is possible to preferably suppress distortion in a phase distribution according to a temperature change in the spatial light modulator. Further, because the processing in the control unit has only to perform calculation of the function, and reconstruction and addition of the correction pattern, it is possible to keep a delay in operation to a minimum.

Further, a third spatial light modulation method according to the present invention which uses a spatial light modulator modulating a phase of incident light for each of a plurality of pixels one-dimensionally or two-dimensionally arrayed, the spatial light modulation method includes (1) a temperature acquisition step of acquiring a temperature signal which is a signal corresponding to a temperature of the spatial light modulator from a temperature sensor, (2) a coefficient value group calculation step of calculating one coefficient value group from among N coefficient value groups by applying a temperature value indicated by the temperature signal to a function of the temperature value and the N coefficient value groups calculated from N correction patterns which are created so as to correspond to N (N is an integer not less than 2) temperature values of the spatial light modulator in order to correct phase distortion of the spatial light modulator, (3) a drive signal generation step of generating a drive signal based on a corrected phase pattern which is created by adding the correction pattern reconstructed from the one coefficient value group to a desired phase pattern, and (4) a modulation control step of controlling a phase modulation amount for each of the plurality of pixels by the drive signal.

In the third spatial light modulation method described above, the function for correcting phase distortion of the spatial light modulator is used in the coefficient value group calculation step. This function is a function of the N coefficient value groups and the temperature values, and the N coefficient value groups are calculated from the N correction patterns which are created so as to respectively correspond to the N temperature values of the spatial light modulator. In the coefficient value group calculation step, a temperature value indicated by the temperature signal from the temperature sensor is applied to the function, to calculate one coefficient value group. Then, in the drive signal generation step, after a correction pattern is reconstructed from this coefficient value group, the correction pattern is added to the desired phase pattern. In accordance with such a method, it is possible to preferably suppress distortion in a phase distribution according to a temperature change in the spatial light modulator. Further, because the processing in the control means for realizing the spatial light modulation method has only to perform calculation of the function, and reconstruction and addition of the correction pattern, it is possible to keep a delay in operation to a minimum.

Advantageous Effects of Invention

In accordance with a spatial light modulation device and a spatial light modulation method of the present invention, it is possible to suppress distortion in a phase distribution according to a temperature change in a spatial light modulator while suppressing a delay in operation.

BRIEF DESCRIPTION OF DRAWINGS

FIG. 2 includes sectional side views showing a part of the configuration of a spatial light modulator.
FIG. 5 includes images showing the optical spot shapes when an emitted optical image is condensed through a lens.

DESCRIPTION OF EMBODIMENTS

Hereinafter, embodiments of a spatial light modulation device and a spatial light modulation method according to the present invention will be described in detail with reference to the accompanying drawings. In addition, the same components are denoted by the same reference symbols in the description of the drawings, and overlapping descriptions will be omitted.

First Embodiment

Figure 1:
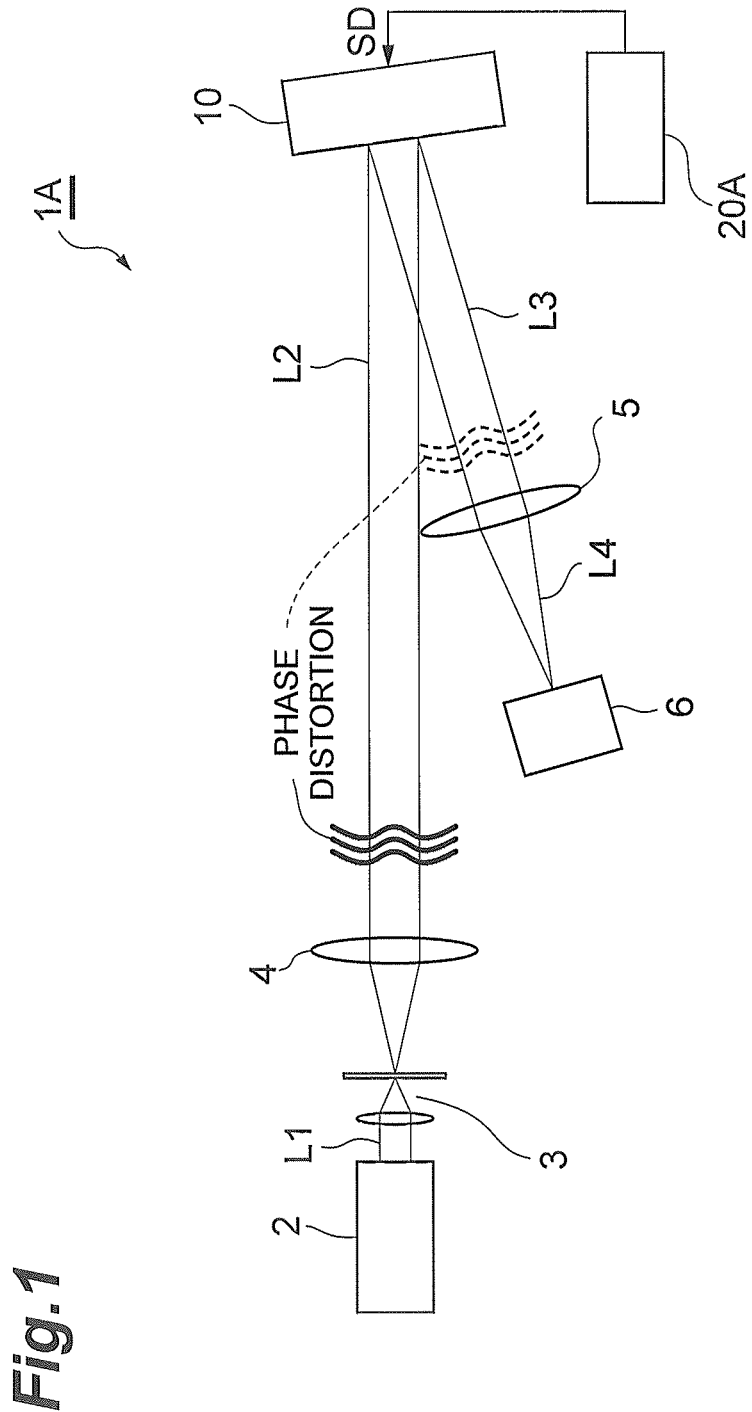
FIG. 1 is a diagram showing a configuration of a spatial light modulation device according to a first embodiment.

FIG. 1 is a diagram showing a configuration of a spatial light modulation device according to a first embodiment of the present invention. This spatial light modulation device 1A includes a light source 2, a spatial filter 3, a collimator lens 4, a Fourier transform lens 5, a spatial light modulator 10, and a control unit 20A. Light L1 emitted from the light source 2 passes through the spatial filter 3 and the collimator lens 4, to become an optical image L2. This optical image L2 is made incident into the spatial light modulator 10. In the spatial light modulator 10, a phase of the optical image L2 is modulated for each of a plurality of pixels according to a drive signal SD provided from the control unit 20A. Thereby, a phase-modulated optical image L3 is output from the spatial light modulator 10. The optical image L3 passes through the Fourier transform lens 5, to become a Fourier optical image L4, and a processing object 6 is irradiated with the Fourier optical image L4.

(a) in FIG. 2 is a sectional side view showing a part of the configuration of the spatial light modulator 10. The spatial light modulator 10 has a silicon substrate 11 and a liquid crystal layer 12 provided on the silicon substrate 11. Further, the spatial light modulator 10 further has a first electrode 13 disposed between the silicon substrate 11 and the liquid crystal layer 12, and a second electrode 14 provided at a position so as to sandwich the liquid crystal layer 12 with the first electrode 13. The first electrode 13 has a plurality of pixel electrodes 13a for applying voltage to the liquid crystal layer 12. The plurality of pixel electrodes 13a are two-dimensionally arrayed in a plurality of rows and a plurality of columns, and a plurality of pixels of the spatial light modulator 10 are defined by these pixel electrodes 13a. A reflecting mirror 18 is disposed between the plurality of pixel electrodes 13a and the liquid crystal layer 12. The second electrode 14 is made of a metal film evaporated on one surface of a glass substrate 15. The glass substrate 15 is supported on the silicon substrate 11 via a spacer 16 such that the above-described one surface and the silicon substrate 11 face each other. The liquid crystal layer 12 is formed by filling the space between the silicon substrate 11 and the glass substrate 15 with liquid crystals, and has an orientation film 19a on a region along the glass substrate 15, and has an orientation film 19b on a region along the reflecting mirror 18.

In the spatial light modulator 10 having such a configuration, an analog signal voltage is applied between the respective pixel electrodes 13a and the second electrode 14 based on the drive signal SD output from the control unit 20A. Thereby, an electric field is generated in the liquid crystal layer 12. Then, as shown in (b) in FIG. 2, liquid crystal molecules 12a on the respective pixel electrodes 13a rotate only by an angle corresponding to the level of the applied electric field. Because the liquid crystal molecules 12a have birefringence characteristics, when light passes through the glass substrate 15 to be made incident, a phase difference corresponding to an angle of inclination of the liquid crystal molecules 12a is provided only for optical components parallel to the electric field of this light. In this way, a phase of light is modulated for each pixel electrode 13a.

Further, as will be described later, when a temperature of the spatial light modulator 10 changes, the silicon substrate 11 warps due to a difference in the coefficient of thermal expansion of the silicon substrate 11, the first electrode 13, and the like. Thereby, a phase modulation amount of light reflected on each pixel varies, which causes distortion in a phase distribution of the entire reflected optical image L3 (refer to FIG. 1). The spatial light modulator 10 of the present embodiment further has a temperature sensor 17 in order to correct such variation caused by a temperature change. The temperature sensor 17 is provided in order to detect a temperature of the spatial light modulator 10, and generates a temperature signal which is a signal corresponding to a temperature of the spatial light modulator 10. The temperature sensor 17 is disposed, for example, on the silicon substrate 11 or on the glass substrate 15.

Figure 3:
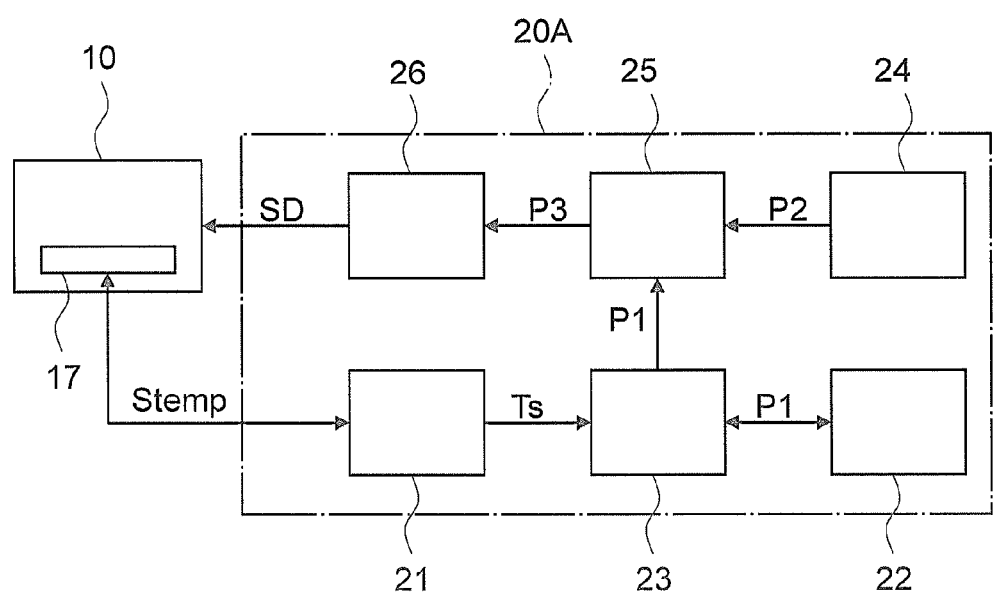
FIG. 3 is a block diagram showing a configuration of a control unit according to the first embodiment.

FIG. 3 is a block diagram showing the configuration of the control unit 20A. As shown in FIG. 3, the control unit 20A has a temperature sensor control unit 21, a storage unit 22, a selection unit 23, a computer generated hologram creation unit 24, a computer generated hologram calculation unit 25, and a drive unit 26.

The temperature sensor control unit 21 acquires a temperature signal Stemp from the temperature sensor 17 of the spatial light modulator 10, and carries out a predetermined calculation on the temperature signal Stemp, to determine a temperature value Ts of the spatial light modulator 10. The temperature sensor control unit 21 provides the determined temperature value Ts to the selection unit 23. The storage unit 22 is storage means in the present embodiment, and stores N (N is an integer not less than 2) correction patterns. Here, the N correction patterns are phase patterns created in advance so as to respectively correspond to N temperature values of the spatial light modulator 10 in order to correct phase distortion of the emitted optical image L3 caused by a temperature change in the spatial light modulator 10. Each of the correction patterns is data containing a plurality of correction phase values respectively corresponding to the plurality of pixels of the spatial light modulator 10. The storage unit 22 is preferably composed of, for example, a RAM (Random Access Memory) or the like. The selection unit 23 selects one correction pattern corresponding to a temperature value most proximate to the temperature value Ts from among the N correction patterns based on the temperature value Ts provided from the temperature sensor control unit 21, and reads out the correction pattern from the storage unit 22. The selection unit 23 provides the readout correction pattern P1 to the computer generated hologram calculation unit 25.

The computer generated hologram creation unit 24 creates a computer generated hologram (Computer Generated Hologram; CGH) having a desired phase pattern. This computer generated hologram contains a plurality of pixel components, and each pixel component expresses a desired phase modulation amount in each of the plurality of pixels of the spatial light modulator 10. The computer generated hologram creation unit 24 provides a created computer generated hologram (desired phase pattern) P2 to the computer generated hologram calculation unit 25. The computer generated hologram calculation unit 25 creates a phase pattern in which an effect by a temperature change in the spatial light modulator 10 is corrected (hereinafter called a corrected phase pattern) by adding a phase modulation amount contained in the computer generated hologram P2 and a correction phase value contained in the correction pattern P1 for each pixel. The computer generated hologram calculation unit 25 provides a corrected phase pattern P3 created in this way to the drive unit 26.

The drive unit 26 generates a drive signal SD based on the corrected phase pattern P3 provided from the computer generated hologram calculation unit 25. In detail, voltage values to be respectively applied to the plurality of pixel electrodes 13a (refer to FIG. 2) of the spatial light modulator 10 are calculated based on a phase modulation amount of each pixel contained in the corrected phase pattern P3, to generate the drive signal SD indicating these voltage values. The drive unit 26 provides the generated drive signal SD to the spatial light modulator 10.

Figure 4:
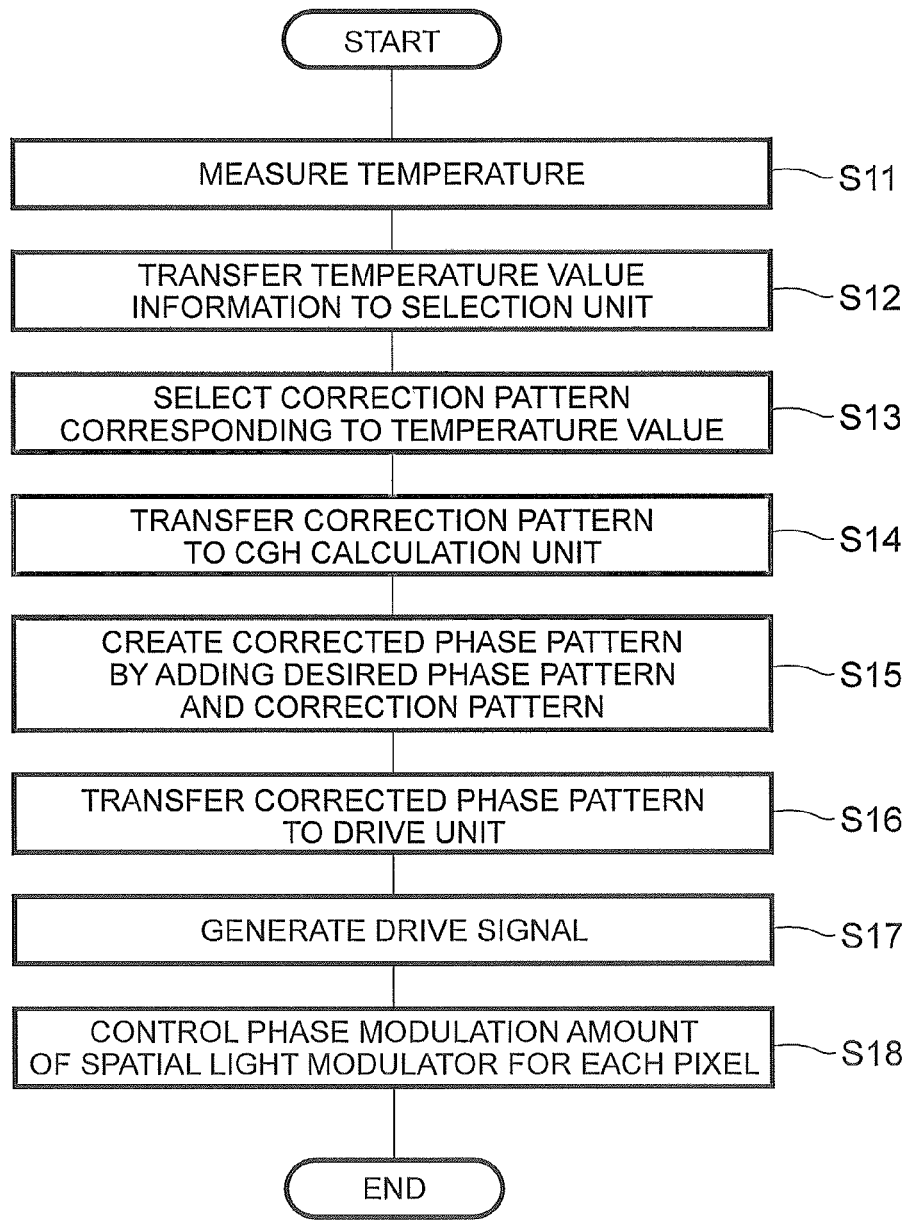
FIG. 4 is a flowchart showing the operations of the spatial light modulation device according to the first embodiment.

FIG. 4 is a flowchart showing the operations of the spatial light modulation device 1A. A spatial light modulation method of the present embodiment will be described along with the spatial light modulation device 1A with reference to FIG. 4.

First, the temperature sensor control unit 21 acquires a temperature signal Stemp from the temperature sensor 17, and determines a current temperature value Ts of the spatial light modulator 10 based on the temperature signal Stemp (Temperature acquisition step S11). The information on this temperature value Ts is transferred from the temperature sensor control unit 21 to the selection unit 23 (Step S12). Next, the selection unit 23 selects a correction pattern P1 of a temperature value most proximate to the temperature value Ts from among the N correction patterns stored in the storage unit 22 based on the temperature value Ts (Correction pattern selection step S13). This correction pattern P1 is transferred to the computer generated hologram calculation unit 25 (Step S14).

Next, the computer generated hologram calculation unit 25 creates a corrected phase pattern P3 by adding (combining) the computer generated hologram (desired phase pattern) P2 provided from the computer generated hologram creation unit 24 and the correction pattern P1 (Step S15). This corrected phase pattern P3 is transferred from the computer generated hologram calculation unit 25 to the drive unit 26 (Step S16). Then, the drive unit 26 generates a drive signal SD based on the corrected phase pattern P3 (Drive signal generation step S17).

Finally, a phase modulation amount for each of the plurality of pixels contained in the spatial light modulator 10 is controlled by the drive signal SD (Modulation control step S18). That is, when the drive signal SD is provided for the spatial light modulator 10, a voltage corresponding to a phase modulation amount shown in the corrected phase pattern P3 is applied to the respective pixel electrodes 13a. In the spatial light modulator 10, an inclination of the liquid crystal molecules 12a (refer to FIG. 2) changes according to a level of the applied voltage, to cause a change in refractive index. As a result, the phase distribution corresponding to the corrected phase pattern P3 is spatially expressed, thereby modulating the phase of the incident light.

The effects obtained by the spatial light modulation device 1A and the spatial light modulation method of the present embodiment including the above-described configuration will be described. As described above, when a temperature of the spatial light modulator 10 changes, the silicon substrate 11 warps due to a difference in the coefficient of thermal expansion of the silicon substrate 11, the pixel electrodes 13a, and the like shown in FIG. 2. An error is caused in a phase modulation amount of reflected light on each pixel caused by such a warpage of the silicon substrate 11, which causes distortion in a phase distribution of the entire reflected optical image. Accordingly, in a conventional device, phase modulation characteristics different from the phase modulation characteristics desired to be added by the computer generated hologram are obtained in an output optical image.

When a temperature of the spatial light modulator 10 changes, distortion is caused in a phase distribution of the emitted optical image. A temperature change in the spatial light modulator 10 is caused by accumulating heat in the spatial light modulator 10 due to a change in outside air temperature or incidence of a highly intensive laser beam. In particular, in the electrically-addressable spatial light modulator 10 as shown in FIG. 2, the reflecting mirror 18 warps due to a difference in the rate of thermal expansion of the respective layers such as the silicon substrate 11 and the pixel electrodes 13a, which leads to generation of phase distortion. FIG. 5 includes images showing the optical spot shapes when an emitted optical image is condensed through a lens. In FIG. 5, (a) shows the shape in the case where phase distortion is sufficiently small, and in this case, the optical spot shape is an ideal Rayleigh spot (diffraction limit). On the other hand, (b) shows the shape in the case where phase distortion is large, and in this case, the optical spot shape is distorted. In addition, in order to solve such a problem, for example, materials by which the rates of thermal expansion of constituent materials of the respective layers are in the same range may be used. However, a member made of such a material does not necessarily exist. Further, for example, it is considered that an optical system is configured by use of expensive high-accuracy optical components, or the flatness of the reflecting mirror 18 of the spatial light modulator 10 is improved. However, with these methods, material costs and production costs are significantly increased, which may become a factor in preventing mass-production.

In response to such a problem, in accordance with the spatial light modulation device 1A and the spatial light modulation method of the present embodiment, because a different correction pattern is used for each of a plurality of temperature values of the spatial light modulator 10, it is possible to preferably suppress distortion in a phase distribution according to a temperature change in the spatial light modulator 10. Further, because the processing in the control unit 20A has only to select and add one correction pattern P1 corresponding to a temperature value Ts, it is possible to keep a delay in operation to a minimum.

Figure 6:
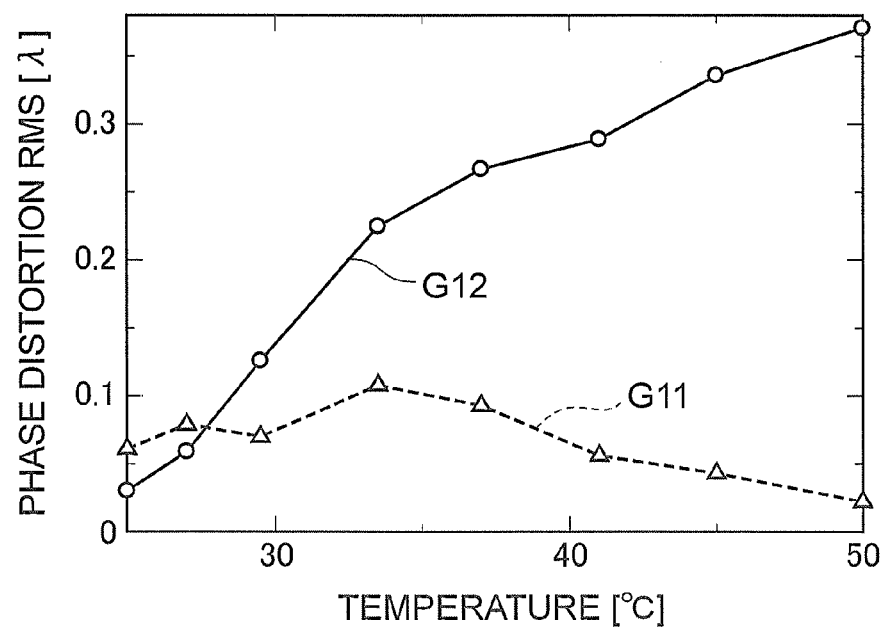
FIG. 6 is a graph showing the effect by the first embodiment.

FIG. 6 is a graph showing the effects by such a present embodiment. The graph G11 shown in FIG. 6 shows the relationship between the temperature of the spatial light modulator 10 and the root-mean-square of phase distortion (unit: wavelength $\lambda$) in the case where phase distortion of an emitted optical image L3 in the spatial light modulator 10 is measured at intervals of 5° C., and N (N=8 in this example) correction patterns are created from the measurement results. Further, for comparison, the graph G12 shown in FIG. 6 shows the relationship between the temperature of the spatial light modulator 10 and the root-mean-square of phase distortion (unit: wavelength $\lambda$) in the case where phase distortion of an emitted optical image L3 in the spatial light modulator 10 is measured at a certain reference temperature (27° C. in this example), and only one correction pattern is created from the measurement result, and this correction pattern is added to the desired phase pattern.

As shown by the graph G12, in the case where the desired phase pattern is corrected by use of the only one correction pattern created at a certain reference temperature, phase distortion sensitively changes with respect to a temperature change in the spatial light modulator 10. On the other hand, by correcting the desired phase pattern by use of N correction patterns corresponding to a plurality of temperature values as in the present embodiment, as shown by the graph G11, it is possible to suppress phase distortion to $\frac{1}{10}$ or less of the phase modulation amount $\lambda$ even though there are measurement errors.

Further, in accordance with the spatial light modulation device 1A and the spatial light modulation method of the present embodiment, because a component to be added to the spatial light modulation device 1A is only the temperature sensor 17, it is possible to solve the above-described problem with low production costs. Further, in the case where temperature control means such as a Peltier device is attached to the outside of the spatial light modulator 10, a temperature gradient is caused between a contacting portion with the temperature control means and another portion in the spatial light modulator 10. Even in such a case, in accordance with the present embodiment, it is possible for this temperature gradient to relax phase distortion provided for an emitted optical image. Further, it is possible to relax phase distortion caused by physical deterioration of the spatial light modulator 10 due to forcible temperature control.

In addition, in the present embodiment, the electrically-addressable liquid crystal element is exemplified as the spatial light modulator 10, however, as the spatial light modulator 10, other than this, various spatial light modulators such as, for example, an optically-addressable liquid crystal element and a deformable mirror type modulator are applicable.

Further, in the present embodiment, an attachment position (that is, a temperature measurement position) of the temperature sensor 17 in the spatial light modulator 10 is preferably any one point of the inside of the housing of the spatial light modulator 10 (to measure a housing internal temperature), the outside of the housing of the spatial light modulator 10 (to measure an outside air temperature of the housing), the surface of the glass substrate 15 of the spatial light modulator 10, the rear surface of the silicon substrate 11 of the spatial light modulator 10, the incident position of the incident optical image L2, and the inside of the circuit of the spatial light modulator 10 serving as a heat source. Or, the temperature sensors 17 may be disposed at a plurality of points among those, or a plurality of the temperature sensors 17 may be disposed at one point.

Figure 7:
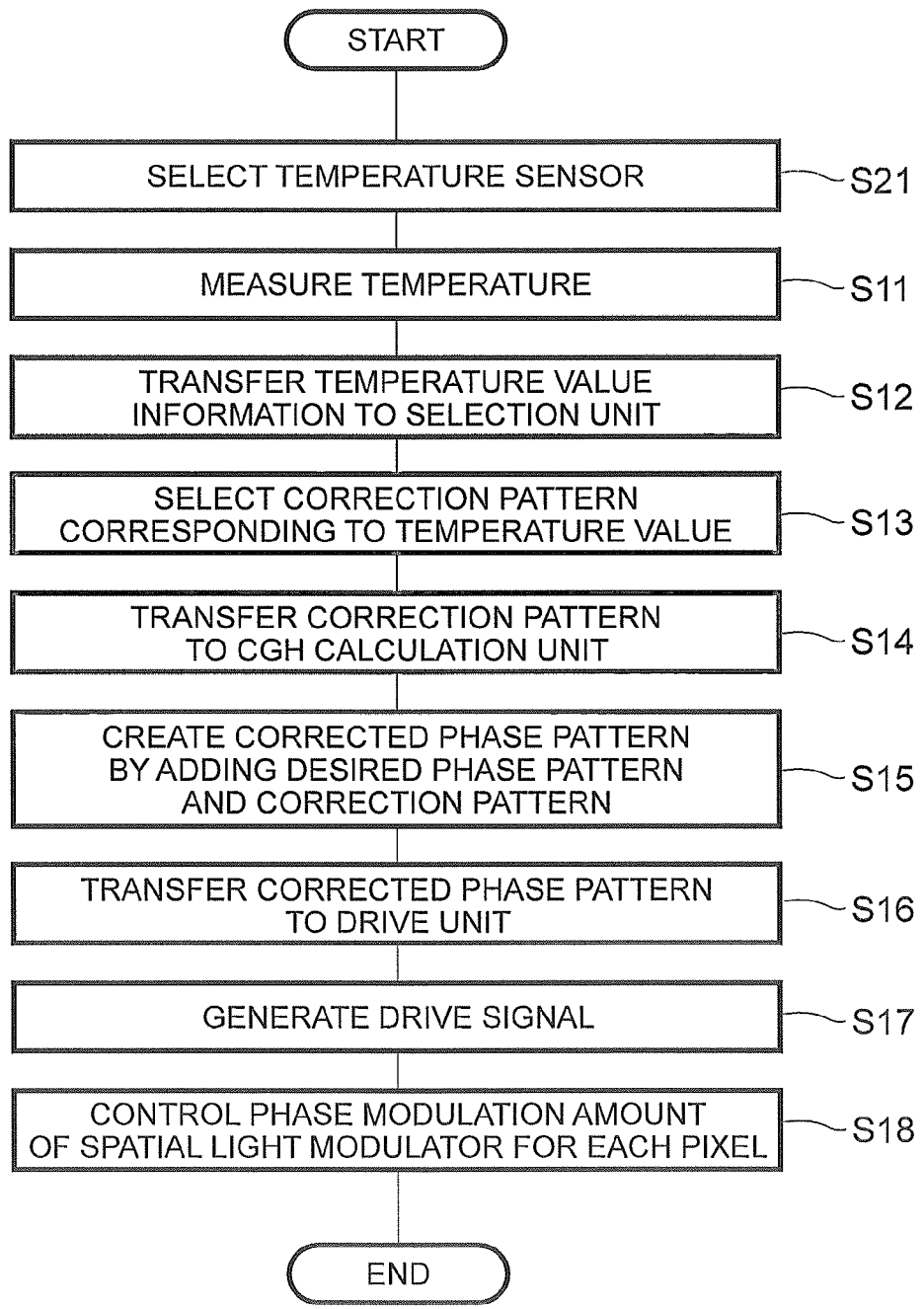
FIG. 7 is a flowchart showing an example of the operations of the spatial light modulation device in the case where the spatial light modulator has a plurality of temperature sensors.

In addition, in the case where the spatial light modulator 10 has a plurality of the temperature sensors 17, the spatial light modulation device 1A can operate according to a flowchart shown in FIG. 7. First, a temperature sensor 17 to be used for measurement is selected from among the plurality of temperature sensors 17 (Step S21). Next, the temperature sensor control unit 21 determines a current temperature value Ts of the spatial light modulator 10 based on the temperature signal Stemp provided from the selected temperature sensor 17 (Temperature acquisition step S11). Thereafter, processing which is the same as that in Steps S12 to S18 (refer to FIG. 4) in the above-described embodiment is carried out. In addition, in order for the spatial light modulation device 1A to perform such operations, correction patterns corresponding to respective temperature values measured by each of the plurality of temperature sensors 17 and an information table for associating the temperature sensors 17 and temperature values with each other are preferably retained in advance in the storage unit 22.

In the case where the spatial light modulator 10 has a plurality of the temperature sensors 17, the spatial light modulation device 1A performs the above-described operations, to be able to further exert the following effect. That is, a position optimum for measuring a temperature of the spatial light modulator 10 may be different depending on a usage mode of the spatial light modulator 10 in some cases. For example, in the case where an outside air temperature with which the spatial light modulator 10 is in contact is low, and an internal temperature is increased with the internal circuit of the spatial light modulator 10 serving as a heat source, a temperature gradient is caused inside the spatial light modulator 10, and exact temperature correction may be difficult by merely measuring a temperature at a certain specific position in some cases. Even in such a case, the spatial light modulator 10 has the plurality of temperature sensors 17, and the spatial light modulation device 1A performs the above-described operations, thereby it is possible to measure a temperature of the spatial light modulator 10 at a preferable temperature measurement position. In addition, in order to appropriately select the temperature sensor 17 according to a purpose of use or a usage environment of the spatial light modulation device 1A, it is further preferable that the temperature sensor control unit 21 have an external signal input mechanism (for example, an RS 232C, a GPIB, a USB, an Ethernet (Registered trademark), or the like).

Figure 8:
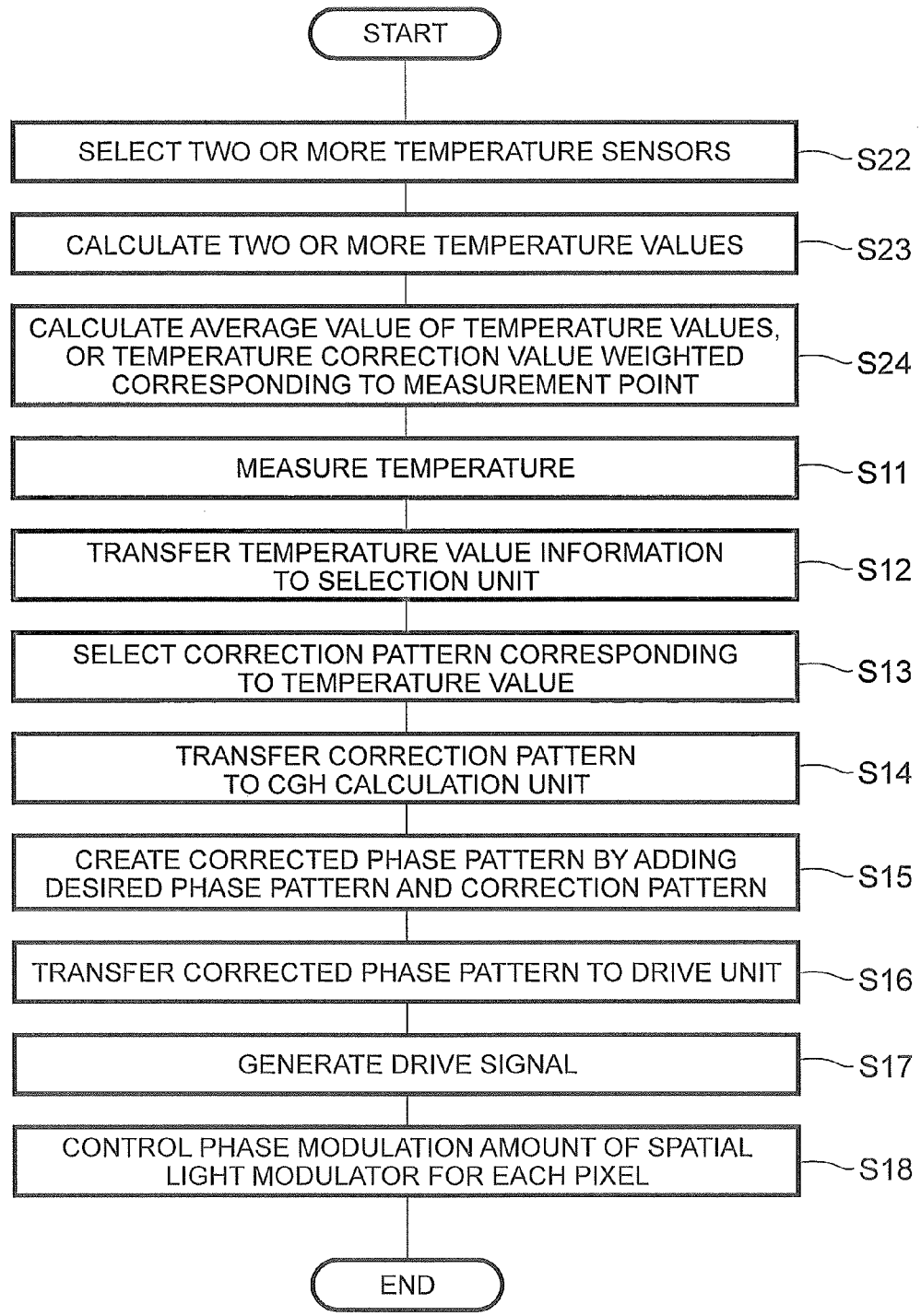
FIG. 8 is a flowchart showing another example of the operations of the spatial light modulation device in the case where the spatial light modulator has a plurality of temperature sensors.

Further, in the case where the spatial light modulator 10 has a plurality of the temperature sensors 17, the spatial light modulation device 1A may operate according to a flowchart shown in FIG. 8. First, two or more temperature sensors 17 to be used for measurement are selected from among the plurality of temperature sensors 17 (Step S22). Next, the temperature sensor control unit 21 determines two or more temperature values corresponding to these based on the two or more temperature signals Stemp provided from the selected two or more temperature sensors 17 (Step S23). Then, an average value of these temperature values, or a temperature correction value weighed according to a measurement point is calculated, and the value is set as a temperature value Ts (Step S24). Thereafter, processing which is the same as that in Steps S12 to S18 (refer to FIG. 4) in the above-described embodiment is carried out. As described above, a temperature gradient may be caused inside the spatial light modulator 10 in some cases, however, as described above, temperatures at a plurality of points are simultaneously measured by use of the plurality of temperature sensors 17, and an average value of those or a temperature correction value is used, thereby it is possible to further improve the accuracy of temperature correction. In addition, a temperature correction value may be calculated by use of a correction coefficient derived by estimation of heat distribution by a heat conduction equation or a finite element method.

Figure 9:
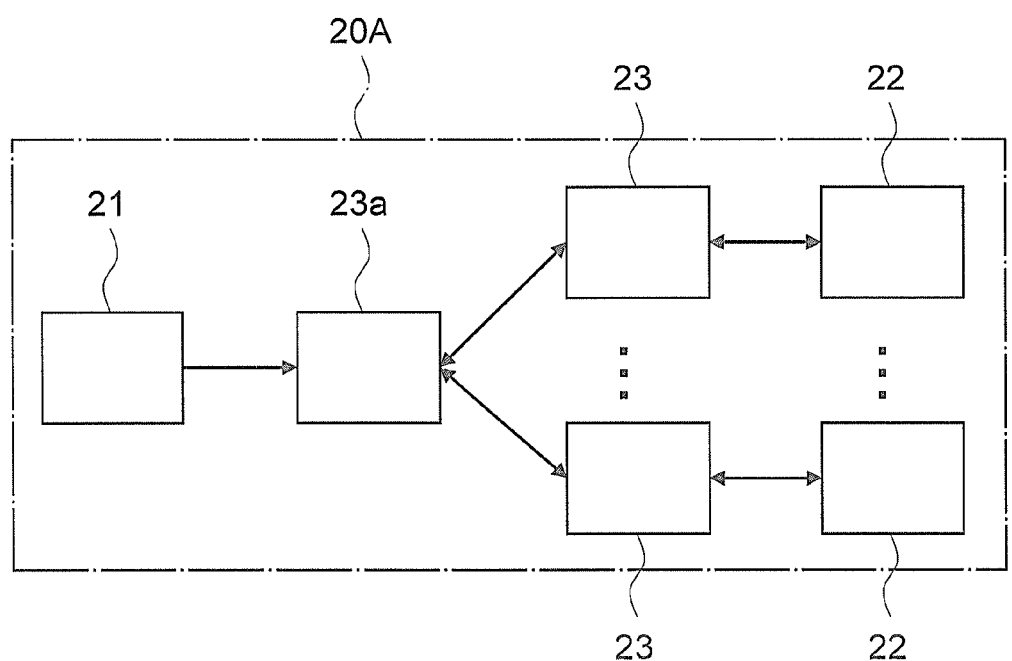
FIG. 9 is a diagram showing a configuration example of a control unit in the case where the operations shown in FIG. 7 are carried out.

In addition, in the case where the spatial light modulation device 1A performs the operations shown in FIG. 7, as shown in FIG. 9, a single storage unit 22 and a selection unit 23 may be provided respectively for the single temperature sensor 17. In the same way, in the case where the spatial light modulation device 1A performs the operations shown in FIG. 8, a single storage unit 22 and a selection unit 23 may be provided respectively for a plurality of combinations of the temperature sensors 17. In accordance with these configurations, it is possible to independently handle the respective storage units 22 and the respective selection units 23. For example, in the case where an attempt is made to update only the one correction pattern, it suffices to update only a corresponding storage unit 22. Further, because it is sufficient that the capacities of the respective storage units 22 are small, there is no need to use expensive large-capacity storage elements. In addition, as shown in FIG. 9, it is more preferable that the control unit 20A further has another selection unit 23a for selecting the single storage unit 22 and the selection unit 23 from among the plurality of storage units 22 and selection units 23.

Further, in the present embodiment or the above-described configuration (the configuration in which the spatial light modulator 10 has the plurality of temperature sensors 17), the temperature sensor control unit 21 may retain N temperature values corresponding to N correction patterns in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present embodiment, the storage unit 22 may store a temperature information table for associating those N correction patterns and N temperature values with each other in advance in addition to the N correction patterns. Further, the N correction patterns may be image-compressed to be stored, and in this case, it is preferable that an image processing unit for performing image decompression be further provided at a stage prior to or subsequent to the selection unit 23.

Further, in the present embodiment, it is preferable that the storage unit 22 has a certain amount of large volume of capacity. Now, it is assumed that the correction pattern is an 8-bit image of SVGA resolution (800 pixels×600 pixels). In the case where the image is not compressed, a data volume per correction pattern is 800 pixels×600 pixels×8 bits=480 kilobytes. Then, when correction patterns are created at intervals of 5° C. within a temperature range from 0° C. to 50° C., the total number of the correction patterns is 11, and the total data volume is about 5 megabytes. Further, when correction patterns are created at intervals of 1° C. within the above-described temperature range in order to improve the accuracy of temperature correction, the total number of the correction patterns is 51, and the total data volume is about 25 megabytes. In this way, the data volume required for the storage unit 22 is necessarily increased by improving the accuracy of temperature correction, and therefore, it is preferable that the control unit 20A has the storage unit 22 capable of storing such large volumes of data.

Further, in the present embodiment, in the case where a temperature change in the spatial light modulator 10 is gradual, or the accuracy of temperature correction to be required is relatively low, another storage unit (for example, a frame memory or the like) for temporarily retaining the selected correction pattern P1 may be provided for the control unit 20A, and the correction pattern may be appropriately read out of the other storage unit, thereby decreasing the frequency of operations of the selection unit 23. In that case, it is preferable that the control unit 20A further has means for storing a temperature value corresponding to the correction pattern stored in the other storage unit, and means for calculating a difference between the temperature value and the current temperature value Ts in addition to the other storage unit. Then, in the case where this difference is smaller than a threshold value, the correction pattern stored in the other storage unit can be transferred to the computer generated hologram calculation unit 25. In addition, even in the case where high-accuracy temperature correction is required, such a configuration is possible by use of a high-speed response memory as the above-described other storage unit.

Figure 10:
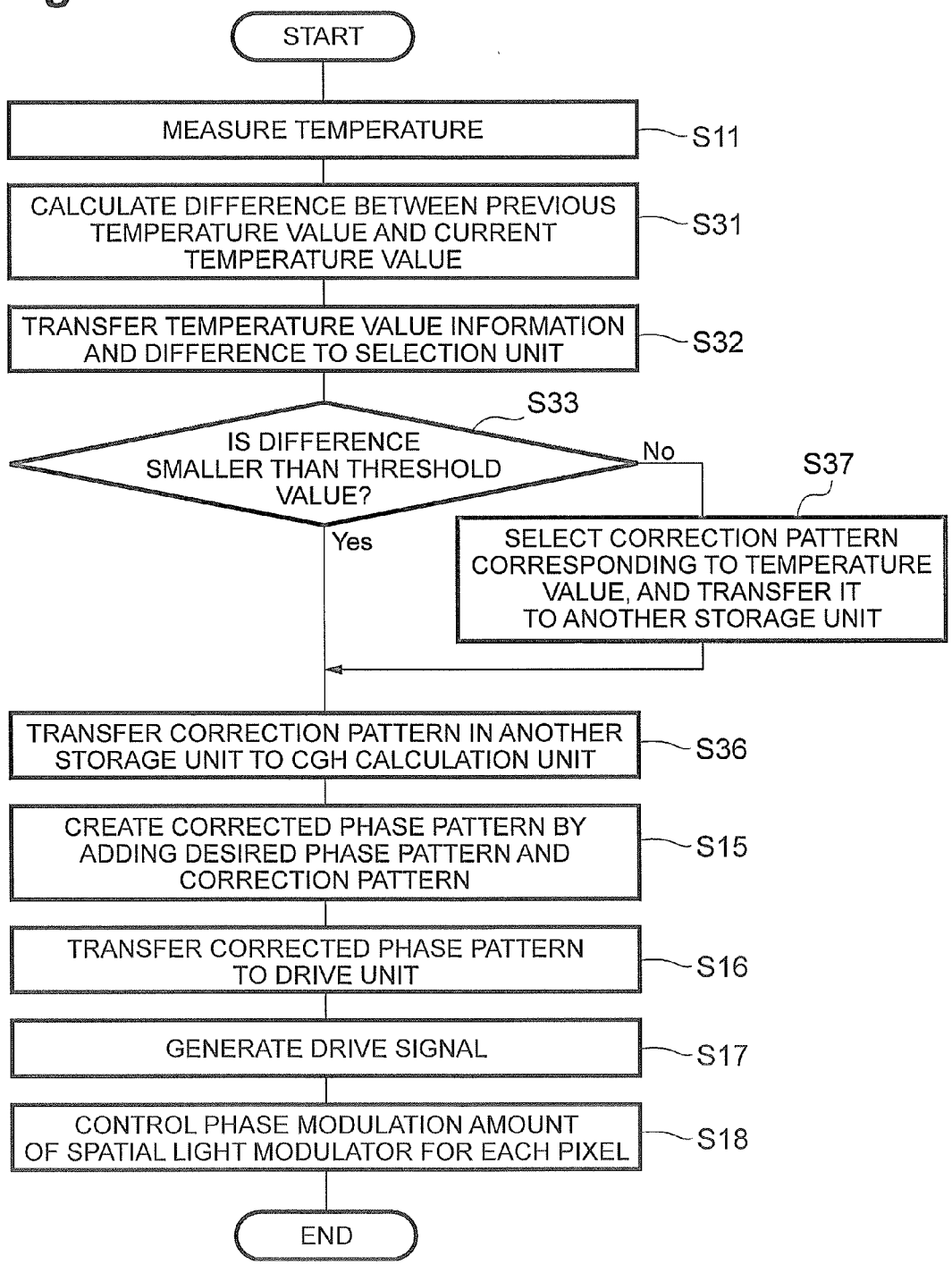
FIG. 10 is a flowchart showing the operations of a control unit having another storage unit for temporarily retaining correction patterns.

FIG. 10 is a flowchart showing the operations of the control unit 20A having such a configuration. First, the temperature sensor control unit 21 determines a current temperature value of the spatial light modulator 10 (Temperature acquisition step S11). Next, a difference between the temperature value calculated last time and the current temperature value is calculated (Step S31). Then, the current temperature value is stored in the other storage unit, and the current temperature value and the difference are transferred to the selection unit 23 (Step S32). It is judged whether the difference and the threshold value are large or small in the selection unit 23 (Step S33), and in the case where the difference is smaller than the threshold value (Yes in Step S33), the correction pattern stored in the other storage unit is transferred to the computer generated hologram calculation unit 25 (Step S36). Further, in the case where the difference is greater than the threshold value (No in Step S33), the selection unit 23 selects one correction pattern from among the N correction patterns stored in the storage unit 22, and the correction pattern is transferred to the other storage unit (Step S37). Moreover, this correction pattern is transferred to the computer generated hologram calculation unit 25 from the other storage unit (Step S36). Thereafter, processing which is the same as that in Steps S15 to S18 (refer to FIG. 4) in the above-described embodiment is carried out.

First Modification

Here, a modification of the control unit 20A according to the first embodiment will be described. In the present modification, the storage unit 22 stores a correction pattern at a certain reference temperature, and stores N correction difference patterns which are differences between the correction pattern at the reference temperature and correction patterns at respective temperatures. That is, the correction difference patterns are information showing how phase distortion changes when the temperature is changed from the reference temperature to the respective temperatures, and data which are added to (combined with) the phase distortion correction pattern at the reference temperature, thereby making it possible to calculate phase distortion correction patterns at the respective temperatures. In this way, the storage unit 22 in the present modification stores a correction pattern at a reference temperature and N correction difference patterns at other temperatures, thereby substantially storing N correction patterns.

Figure 11:
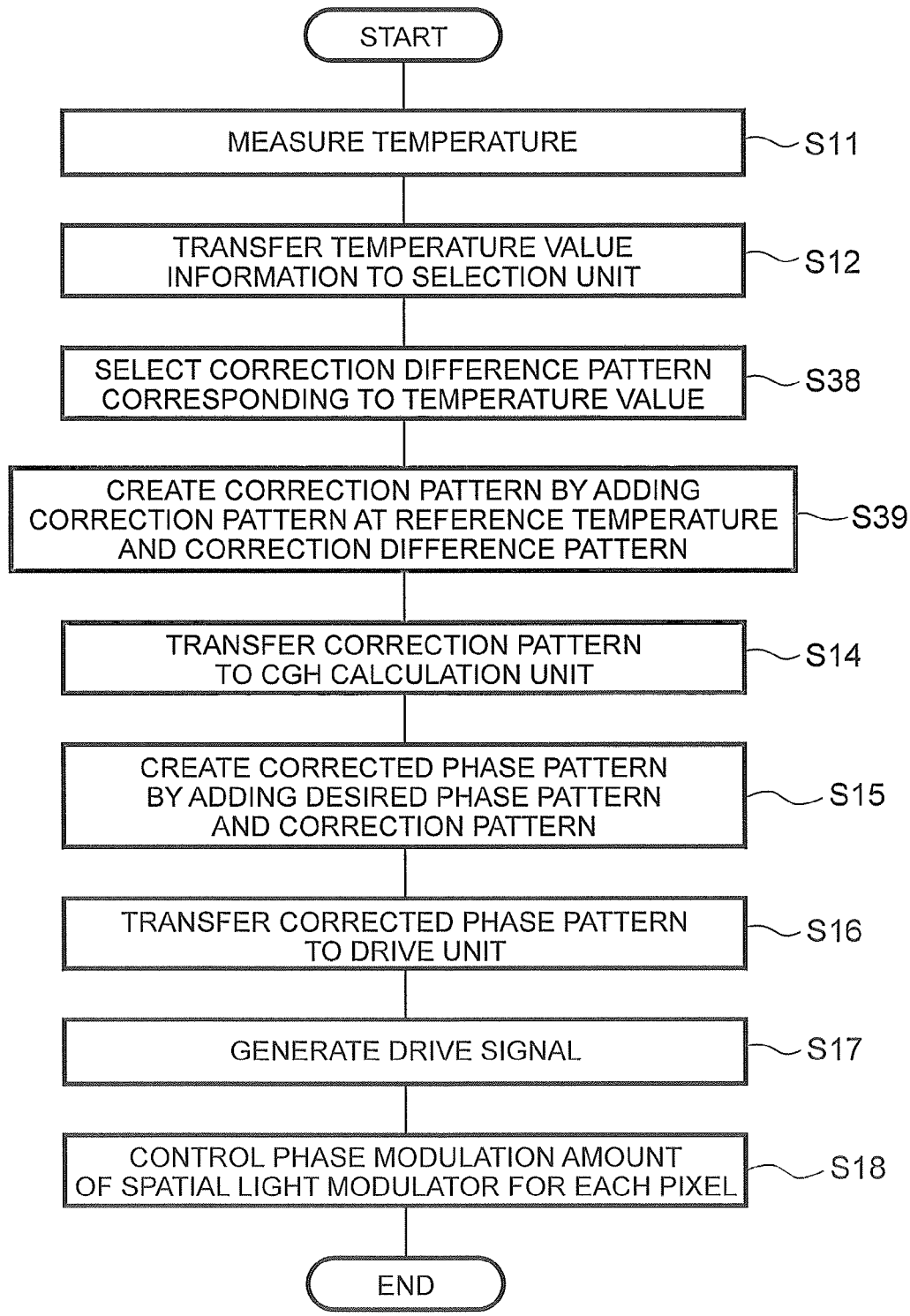
FIG. 11 is a flowchart showing the operations of a control unit according to a first modification.

FIG. 11 is a flowchart showing the operations of the control unit 20A having such a configuration. First, the temperature sensor control unit 21 acquires a temperature signal Stemp from the temperature sensor 17, and determines a current temperature value Ts of the spatial light modulator 10 based on the temperature signal Stemp (Temperature acquisition step S11). The information on this temperature value Ts is transferred from the temperature sensor control unit 21 to the selection unit 23 (Step S12).

Next, the selection unit 23 selects a correction difference pattern corresponding to a temperature value most proximate to the temperature value Ts from among the correction patterns stored in the storage unit 22 based on the temperature value Ts (Correction pattern selection step S38). Then, the selection unit 23 creates a correction pattern P1 corresponding to the temperature value by adding (combining) the correction pattern corresponding to the reference temperature and the correction difference pattern (Step S39). This correction pattern P1 is transferred to the computer generated hologram calculation unit 25 (Step S14). Thereafter, processing which is the same as that in Steps S15 to S18 (refer to FIG. 4) in the above-described embodiment is carried out.

As exemplified in the present modification, the storage unit 22 may substantially store N correction patterns by various manners. Even in such a case, it is possible to preferably exert the operation and effect according to the above-described embodiment. In addition, in the present modification as well, in the case where the spatial light modulator 10 has a plurality of the temperature sensors 17, the temperature sensor 17 to be used for measurement may be selected from among the plurality of temperature sensors 17, and the temperature sensor control unit 21 may determine a current temperature value Ts of the spatial light modulator 10 based on the temperature signal Stemp provided from the selected temperature sensor 17 (refer to FIG. 7). In this case, a single storage unit 22 and a selection unit 23 may be provided respectively for the single temperature sensor 17 (refer to FIG. 9). Or, two or more temperature sensors 17 to be used for measurement may be selected from among the plurality of temperature sensors 17, and the temperature sensor control unit 21 may determine two or more temperature values corresponding to these based on the two or more temperature signals Stemp provided from the selected two or more temperature sensors 17, and an average value of these temperature values, or a temperature correction value weighed according to a measurement point is calculated, and the value may be set as a temperature value Ts (refer to FIG. 8). In this case, a single storage unit 22 and a selection unit 23 may be provided respectively for a plurality of combinations of the temperature sensors 17.

Further, in the present modification, the temperature sensor control unit 21 may retain N temperature values corresponding to N correction difference patterns in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present modification, the storage unit 22 may store a temperature information table for associating those N correction difference patterns and N temperature values with each other in advance in addition to the N correction difference patterns. Further, the N correction difference patterns may be image-compressed to be stored, and in this case, it is preferable that an image processing unit for performing image decompression be further provided at a stage prior to or subsequent to the selection unit 23.

Further, in the same way as the above-described embodiment, in the present modification as well, it is preferable that the storage unit 22 is capable of storing large volumes of data.

Further, in the present modification, in the case where a temperature change in the spatial light modulator 10 is gradual, or the accuracy of temperature correction to be required is relatively low, another storage unit (for example, a frame memory or the like) for temporarily retaining the synthesized correction pattern P1 may be provided for the control unit 20A, and the correction pattern may be appropriately read out of the other storage unit, thereby decreasing the frequency of operations of the selection unit 23. In that case, it is preferable that the control unit 20A further has means for storing a temperature value corresponding to the correction pattern stored in the other storage unit, and means for calculating a difference between the temperature value and the current temperature value Ts in addition to the other storage unit. Then, in the case where this difference is smaller than a threshold value, the correction pattern stored in the other storage unit can be transferred to the computer generated hologram calculation unit 25 (refer to FIG. 10).

Second Embodiment

A configuration of a spatial light modulation device according to a second embodiment of the present invention will be described hereinafter. In the same way as the first embodiment, the spatial light modulation device of the present embodiment includes the light source 2, the spatial filter 3, the collimator lens 4, the Fourier transform lens 5, and the spatial light modulator 10 which are shown in FIG. 1. The configurations thereof are the same as those in the first embodiment. Further, the spatial light modulation device of the present embodiment includes a control unit which will be described hereinafter, in place of the control unit 20A of the first embodiment.

Figure 12:
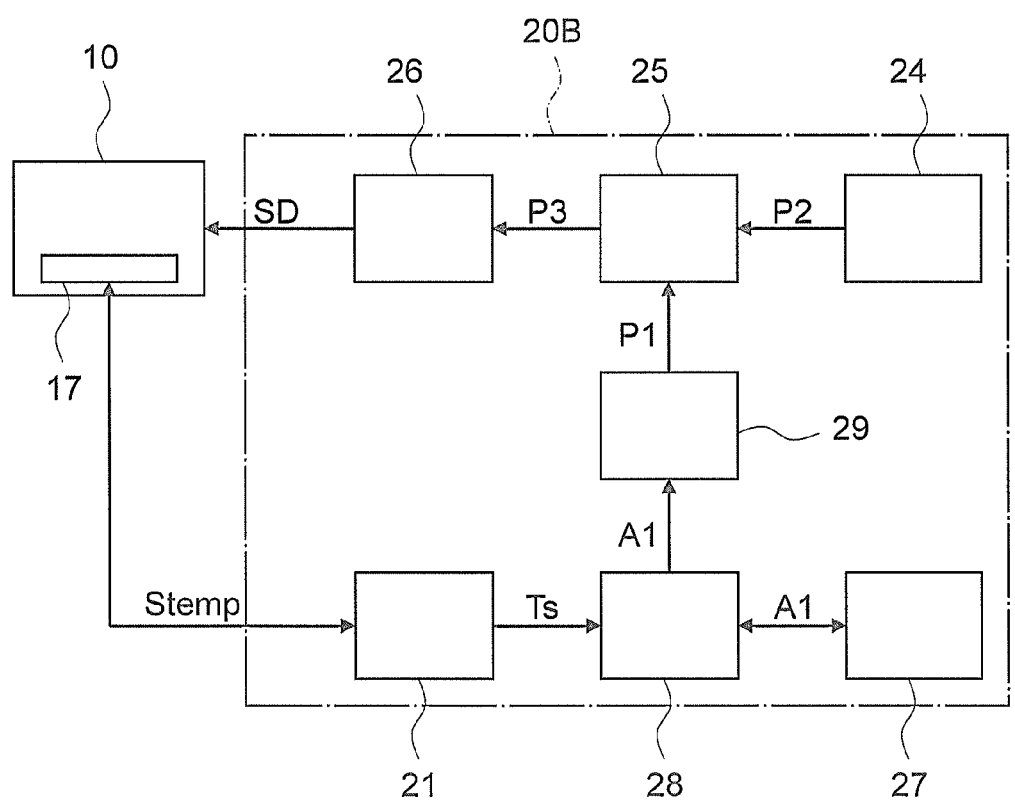
FIG. 12 is a block diagram showing a configuration of a control unit according to a second embodiment.

FIG. 12 is a block diagram showing a configuration of a control unit 20B included in the spatial light modulation device according to the present embodiment. As shown in FIG. 12, the control unit 20B has the temperature sensor control unit 21, the computer generated hologram creation unit 24, the computer generated hologram calculation unit 25, the drive unit 26, a storage unit 27, a selection unit 28, and a correction pattern reconstruction unit 29. The configurations of the temperature sensor control unit 21, the computer generated hologram creation unit 24, the computer generated hologram calculation unit 25, and the drive unit 26 among those are the same as those in the first embodiment.

The storage unit 27 is storage means in the present embodiment, and stores N (N is an integer not less than 2) coefficient value groups (coefficient value sequences). Here, the N coefficient value groups are coefficients which are calculated in advance from the respective N correction patterns in the first embodiment, one or a plurality of coefficients are calculated for one correction pattern, and the one or plurality of coefficients compose one coefficient value group. A coefficient value group is calculated from a correction pattern serving as two-dimensional image data by use of a calculation technique for expressing a three-dimensional plane such as an orthonormal function system, a spline curve, or a two-dimensional least-square method. The storage unit 27 is preferably composed of, for example, a RAM or the like in the same way as the storage unit 22 of the first embodiment. The selection unit 28 selects one coefficient value group corresponding to a temperature value most proximate to the temperature value Ts from among the N coefficient value groups based on the temperature value Ts provided from the temperature sensor control unit 21, and reads out the coefficient value group from the storage unit 27. The selection unit 28 provides a read-out coefficient value group A1 to the correction pattern reconstruction unit 29. The correction pattern reconstruction unit 29 reconstructs one correction pattern P1 from the coefficient value group A1 transferred from the selection unit 28. The correction pattern reconstruction unit 29 provides the generated correction pattern P1 to the computer generated hologram calculation unit 25.

Figure 13:
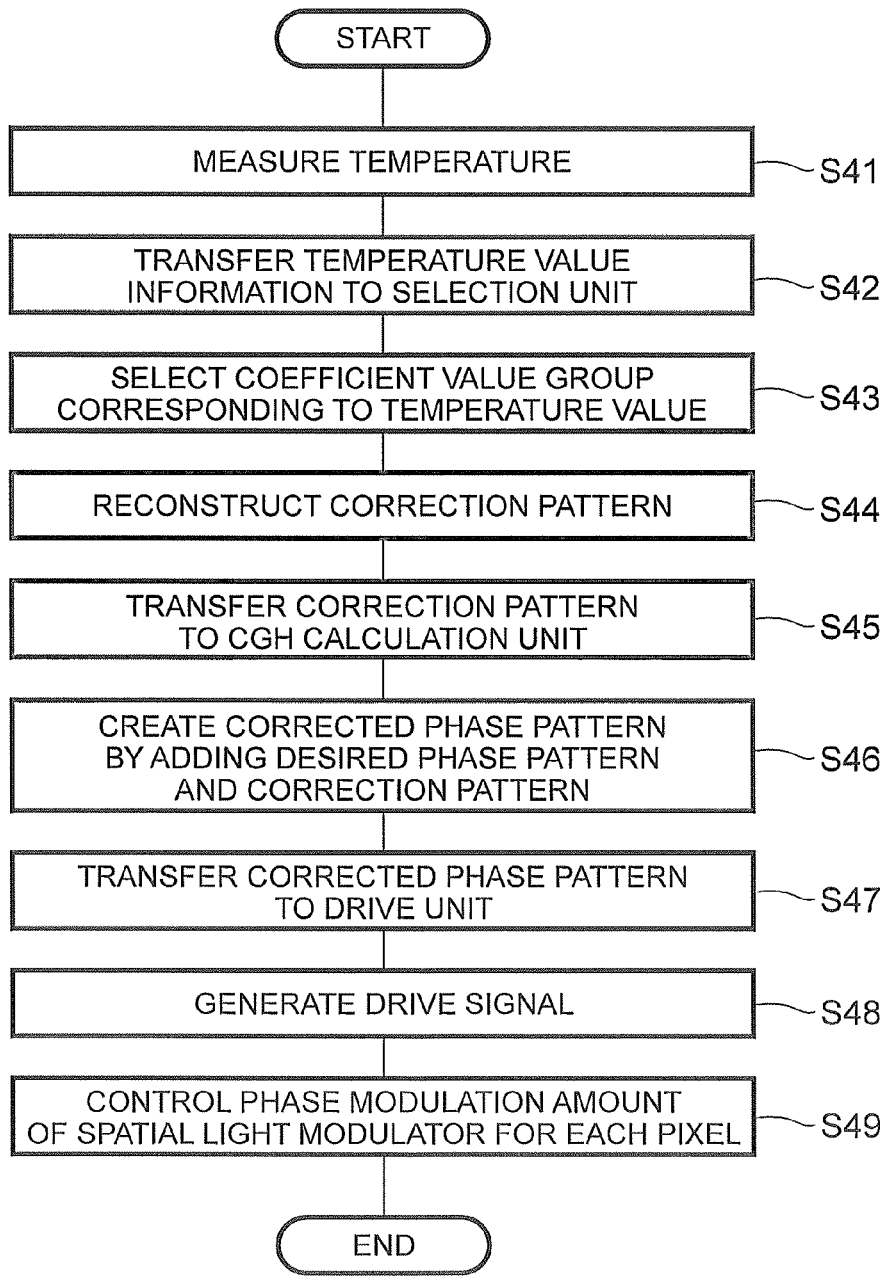
FIG. 13 is a flowchart showing the operations of a spatial light modulation device according to the second embodiment.

FIG. 13 is a flowchart showing the operations of a spatial light modulation device of the present embodiment. A spatial light modulation method of the present embodiment will be described along with the operations of the spatial light modulation device with reference to FIG. 13.

First, the temperature sensor control unit 21 acquires a temperature signal Stemp from the temperature sensor 17, and determines a current temperature value Ts of the spatial light modulator 10 based on the temperature signal Stemp (Temperature acquisition step S41). The information on this temperature value Ts is transferred from the temperature sensor control unit 21 to the selection unit 28 (Step S42). Next, the selection unit 28 selects a coefficient value group A1 corresponding to a temperature value most proximate to the temperature value Ts from among the N coefficient value groups stored in the storage unit 27 based on the temperature value Ts (Coefficient value group selection step S43). This coefficient value group A1 is transferred to the correction pattern reconstruction unit 29. Then, the correction pattern reconstruction unit 29 reconstructs one correction pattern P1 from the coefficient value group A1 transferred from the selection unit 28 (Step S44). The reconstructed correction pattern P1 is transferred to the computer generated hologram calculation unit 25 (Step S45).

Next, the computer generated hologram calculation unit 25 creates a corrected phase pattern P3 by adding (combining) the computer generated hologram (desired phase pattern) P2 provided from the computer generated hologram creation unit 24 and the correction pattern P1 (Step S46). This corrected phase pattern P3 is transferred from the computer generated hologram calculation unit 25 to the drive unit 26 (Step S47). Then, the drive unit 26 generates a drive signal SD based on the corrected phase pattern P3 (Drive signal generation step S48). Finally, a phase modulation amount for each of the plurality of pixels contained in the spatial light modulator 10 is controlled by the drive signal SD (Modulation control step S49).

In accordance with the spatial light modulation device and the spatial light modulation method of the present embodiment having the above-described configuration, it is possible to preferably suppress distortion in a phase distribution according to a temperature change in the spatial light modulator 10. Further, because the processing in the control unit 20B has only to select one coefficient value group A1 corresponding to a temperature value Ts, to reconstruct and add the correction pattern P1, it is possible to keep a delay in operation to a minimum. In particular, the spatial light modulation device and the spatial light modulation method of the present embodiment is effective in the case where a correction pattern is composed of low spatial frequency components with gradual phase inclination generated in the optical system such as the spatial filter 3, the collimator lens 4, and the Fourier transform lens 5 in FIG. 1.

Further, in accordance with the spatial light modulation device and the spatial light modulation method of the present embodiment, as compared with the first embodiment, it is possible to compress a data volume to be stored in the storage unit 27 to a large extent. As described in the first embodiment, for example, one correction pattern has a data volume of 480 kilobytes. Meanwhile, when a correction pattern is transformed into a coefficient value group, for example, by use of an associated Legendre polynomial up to a tenth-order coefficient, a correction pattern having such a data volume is expressed by about 55 coefficient values. Assuming that these coefficient values are all 32-bit signed single-precision floating point type data, its data volume is 220 bytes in total, that is compressed into a volume of information which is about 0.5% of that of an uncompressed image.

Figure 14:
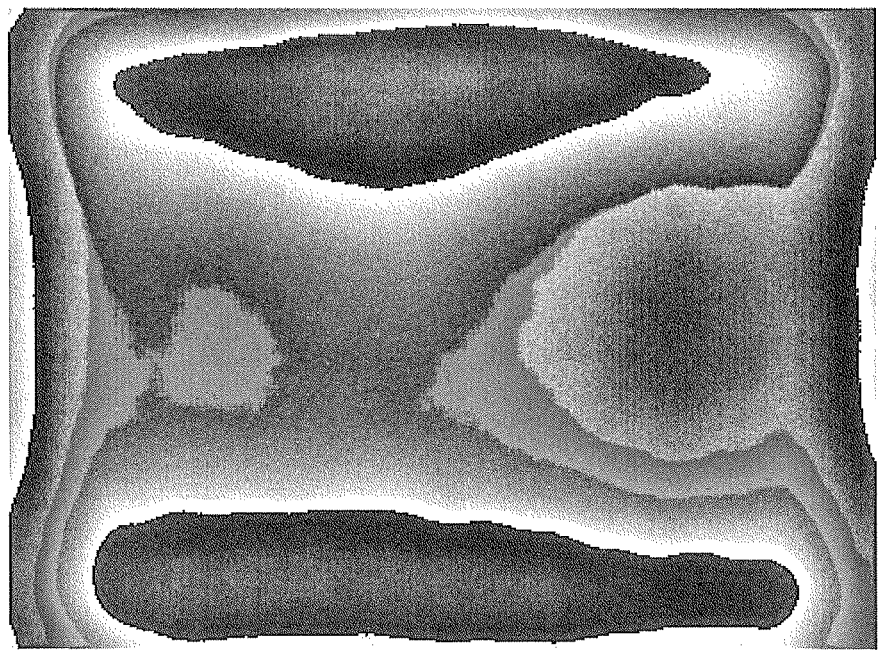
FIG. 14 is an image showing an example of a correction pattern acquired by interferometric measurement.
Figure 15:
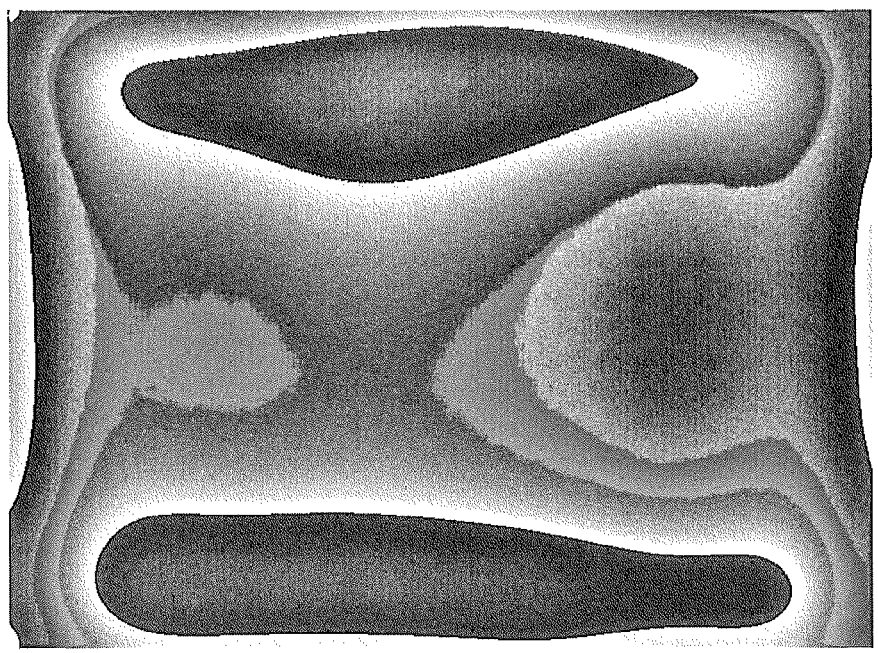
FIG. 15 is an image showing an example of the correction pattern in the case where a coefficient value group is calculated by use of an associated Legendre polynomial up to a tenth-order coefficient which is one of the orthonormal function systems, and a correction pattern is reconstructed from the coefficient value group.

Here, FIG. 14 is an image showing an example of a correction pattern acquired by interferometric measurement. In the spatial light modulator 10, for example, 8-bit two-dimensional image data is used in order to express phase values $0\pi$ to $2\pi$. In this case, for example, the phase value $0\pi$ denotes the 0 gradation value and the phase value $2\pi$ denotes the 255 gradation value. Then, in order to express a phase value greater than $2\pi$, a remainder value obtained by dividing by $2\pi$ is applied, and therefore, a region "to be looped back" from the 255 gradation value to the 0 gradation value in the 8-bit image data (hereinafter called a loop-back region) occurs. Regions which are the 0 gradation (black) for the 255 gradation (white) in FIG. 14 correspond to the loop-back regions. In addition, in the case of a phase-modulation type spatial light modulator which is capable of expressing phase values from $0\pi$ to $3\pi$, a loop-back region occurs when expressing a phase value greater than $3\pi$. FIG. 15 is an image showing an example of a correction pattern in the case where a coefficient value group is calculated by use of an associated Legendre polynomial up to a tenth-order coefficient which is one of the orthonormal function systems, and a correction pattern is reconstructed from the coefficient value group. As shown in FIG. 15, it is understood that it is possible to generate a correction pattern substantially the same as that of FIG. 14 even in the case where a correction pattern is reconstructed by use of a coefficient value sequence.

In addition, in the present embodiment, as the spatial light modulator 10, other than the electrically-addressable liquid crystal element, various spatial light modulators such as an optically-addressable liquid crystal element and a deformable mirror type modulator are applicable.

Further, in the present embodiment, an attachment position of the temperature sensor 17 in the spatial light modulator 10 is preferably any one point of the inside of the housing of the spatial light modulator 10, the outside of the housing of the spatial light modulator 10, the surface of the glass substrate 15 of the spatial light modulator 10, the rear surface of the silicon substrate 11 of the spatial light modulator 10, the incident position of the incident optical image L2, and the inside of the circuit of the spatial light modulator 10 serving as a heat source. Or, the temperature sensors 17 may be disposed at a plurality of points among those, or a plurality of the temperature sensors 17 may be disposed at one point.

In the case where the spatial light modulator 10 has a plurality of the temperature sensors 17, the spatial light modulation device can operate as follows, for example. First, a temperature sensor 17 to be used for measurement is selected from among the plurality of temperature sensors 17. Next, the temperature sensor control unit 21 determines a current temperature value Ts of the spatial light modulator 10 based on the temperature signal Stemp provided from the selected temperature sensor 17. Thereafter, processing which is the same as that in Steps S42 to S49 (refer to FIG. 13) in the present embodiment is carried out. In addition, in order for the spatial light modulation device to perform such operations, coefficient value groups corresponding to the respective temperature values measured by each of the plurality of temperature sensors 17 and an information table for associating the temperature sensors 17 and temperature values with each other are preferably retained in advance in the storage unit 27.

Further, in the case where the spatial light modulator 10 has a plurality of the temperature sensors 17, the spatial light modulation device may operate as follows. First, two or more temperature sensors 17 to be used for measurement are selected from among the plurality of temperature sensors 17. Next, the temperature sensor control unit 21 determines two or more temperature values corresponding to these based on the two or more temperature signals Stemp provided from the selected two or more temperature sensors 17. Then, an average value of these temperature values, or a temperature correction value weighed according to a measurement point is calculated, and the value is set as a temperature value Ts. Thereafter, processing which is the same as that in Steps S42 to S49 (refer to FIG. 13) in the above-described embodiment is carried out. A temperature gradient may be caused inside the spatial light modulator 10 in some cases, however, as described above, temperatures at a plurality of points are simultaneously measured by use of the plurality of temperature sensors 17 and an average value of those or a temperature correction value is used, thereby it is possible to further improve the accuracy of temperature correction. In addition, a temperature correction value may be calculated by use of a correction coefficient derived by estimation of heat distribution by a heat conduction equation or a finite element method.

In addition, in the case where the spatial light modulation device performs the operations described above, a single storage unit 27 and a selection unit 28 may be provided respectively for the single temperature sensor 17. Or, a single storage unit 27 and a selection unit 28 may be provided respectively for a plurality of combinations of the temperature sensors 17. In accordance with these configurations, it is possible to independently handle the respective storage units 27 and the respective selection units 28. Further, because it is sufficient that the capacities of the respective storage units 27 are small, there is no need to use expensive large-capacity storage elements. In addition, it is more preferable that the control unit 20B further has another selection unit for selecting a single storage unit 27 and a selection unit 28 from among the plurality of storage units 27 and selection units 28.

Further, in the present embodiment or the above-described configuration (the configuration in which the spatial light modulator 10 has the plurality of temperature sensors 17), the temperature sensor control unit 21 may retain N temperature values corresponding to N correction patterns in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present embodiment, a coefficient value memory for temporarily retaining a selected coefficient value group A1 may be provided for the control unit 20B, and the coefficient value group A1 may be appropriately read out of the coefficient value memory, thereby decreasing the frequency of operations of the selection unit 28. In that case, it is preferable that the control unit 20B further has means for storing a temperature value corresponding to the coefficient value group A1 stored in the coefficient value memory, and means for calculating a difference between the temperature value and the current temperature value Ts in addition to the coefficient value memory. Then, in the case where this difference is smaller than a threshold value, the coefficient value group A1 stored in the coefficient value memory can be transferred to the correction pattern reconstruction unit 29.

Figure 16:
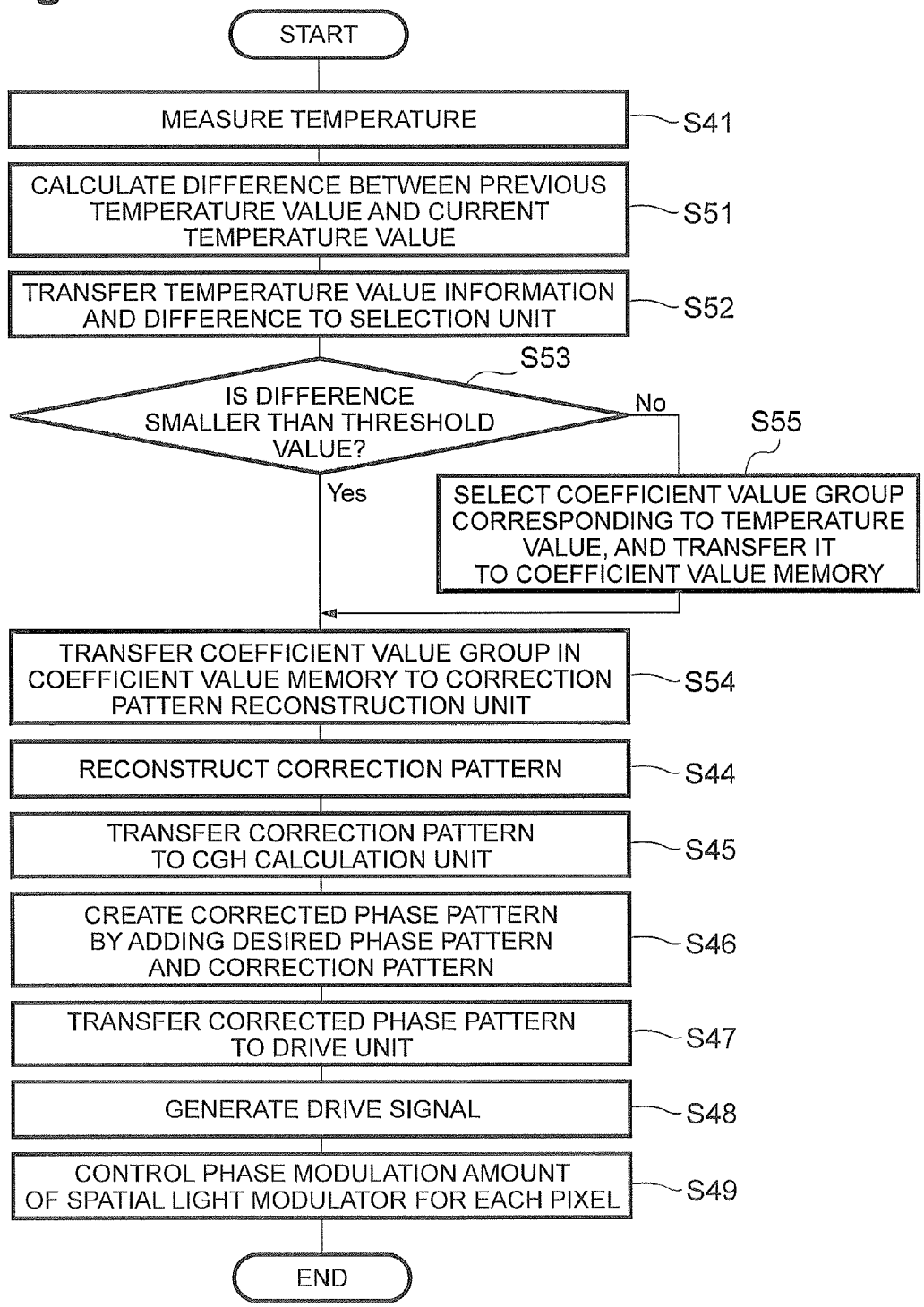
FIG. 16 is a flowchart showing an example of the operations in the case where the control unit has a coefficient value memory for temporarily retaining a coefficient value group in the second embodiment.

FIG. 16 is a flowchart showing an example of the operations of the control unit 20B having such a configuration. First, the temperature sensor control unit 21 determines a current temperature value of the spatial light modulator 10 (Temperature acquisition step S41). Next, a difference between the temperature value calculated last time and the current temperature value is calculated (Step S51). Then, the current temperature value is stored in the other storage unit, and the current temperature value and the difference are transferred to the selection unit 28 (Step S52). It is judged whether the difference and the threshold value are large or small in the selection unit 28 (Step S53), and in the case where the difference is smaller than the threshold value (Yes in Step S53), the coefficient value group A1 stored in the coefficient value memory is transferred to the correction pattern reconstruction unit 29 (Step S54). Further, in the case where the difference is greater than the threshold value (No in Step S53), the selection unit 28 selects one coefficient value group A1 from among the N coefficient value groups stored in the storage unit 27, and the coefficient value group A1 is transferred to the coefficient value memory (Step S55). Moreover, this coefficient value group A1 is transferred from the coefficient value memory to the correction pattern reconstruction unit 29 (Step S54). Thereafter, processing which is the same as that in Steps S44 to S49 (refer to FIG. 13) in the present embodiment is carried out.

Further, in the present embodiment, in the case where a temperature change in the spatial light modulator 10 is gradual, or the accuracy of temperature correction to be required is relatively low, another storage unit (for example, a frame memory or the like) for temporarily retaining the correction pattern P1 reconstructed by the coefficient value group A1 may be provided for the control unit 20B, and the correction pattern P1 may be appropriately read out of the other storage unit, thereby decreasing the frequency of operations of the selection unit 28 and the correction pattern reconstruction unit 29. In that case, it is preferable that the control unit 20B further has means for storing a temperature value corresponding to the correction pattern P1 stored in the other storage unit, and means for calculating a difference between the temperature value and the current temperature value Ts in addition to the other storage unit. Then, in the case where this difference is smaller than a threshold value, the correction pattern P1 stored in the other storage unit can be transferred to the computer generated hologram calculation unit 25. In addition, even in the case where high-accuracy temperature correction is required, such a configuration is possible by use of a high-speed response memory as the above-described other storage unit.

Figure 17:
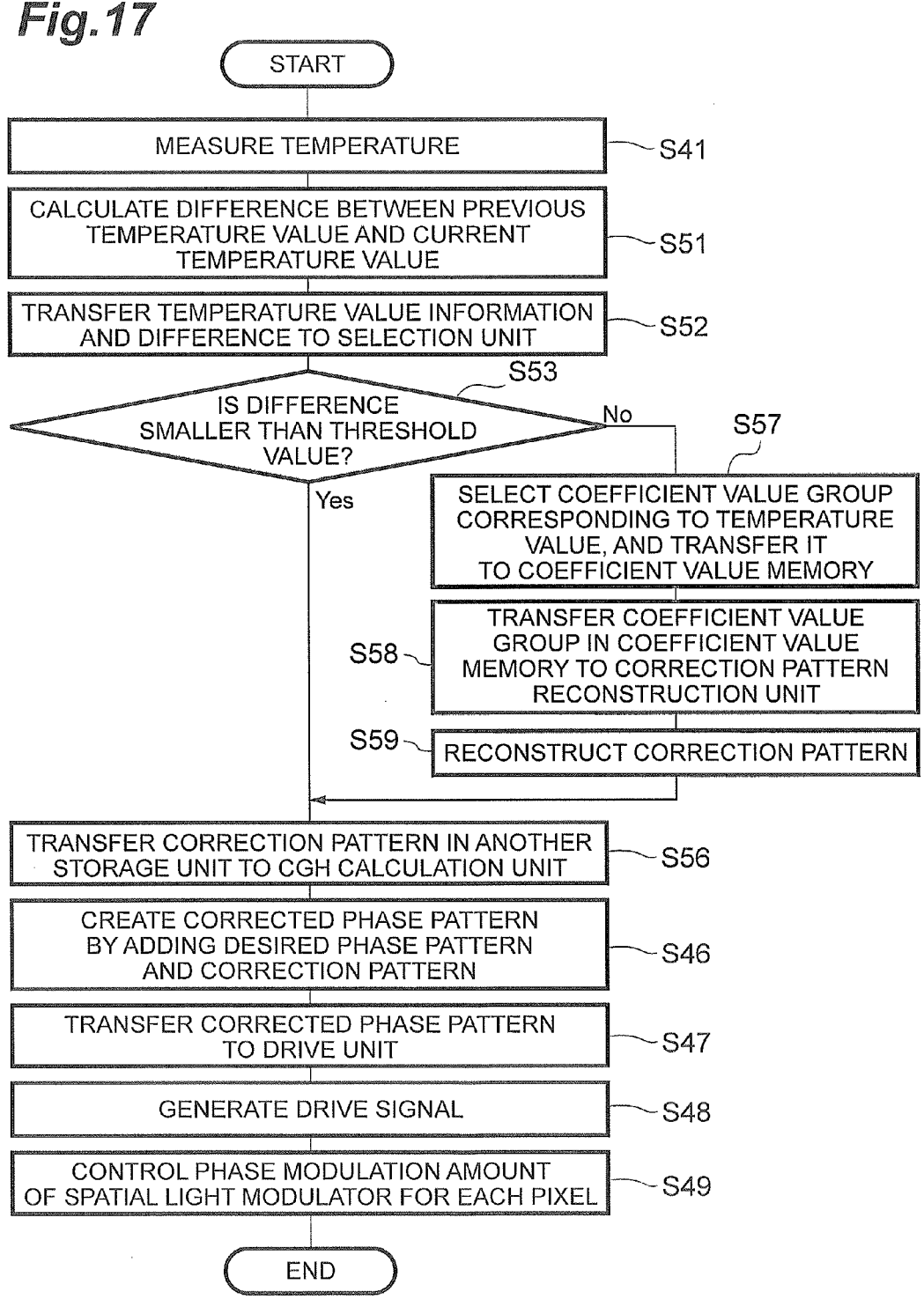
FIG. 17 is a flowchart showing an example of the operations in the case where the control unit has another storage unit for temporarily retaining a reconstructed correction pattern in the second embodiment.

FIG. 17 is a flowchart showing an example of the operations of the control unit 20B having such a configuration. In addition, in these operations, operations up to Step S53 are the same as the operations shown in FIG. 16. In this operation, in the case where the difference is smaller than the threshold value (Yes in Step S53), the correction pattern P1 stored in the other storage unit is transferred to the computer generated hologram calculation unit 25 (Step S56). Further, in the case where the difference is greater than the threshold value (No in Step S53), the selection unit 28 selects one coefficient value group A1 from among the N coefficient value groups stored in the storage unit 27, and the coefficient value group A1 is transferred to the coefficient value memory (Step S57). Moreover, this coefficient value group A1 is transferred from the coefficient value memory to the correction pattern reconstruction unit 29 (Step S58). Then, the correction pattern reconstruction unit 29 reconstructs one correction pattern P1 from the coefficient value group A1 (Step S59). The reconstructed correction pattern P1 is transferred to the computer generated hologram calculation unit 25 (Step S56). Thereafter, processing which is the same as that in Steps S46 to S49 (refer to FIG. 13) in the present embodiment is carried out.

Figure 18:
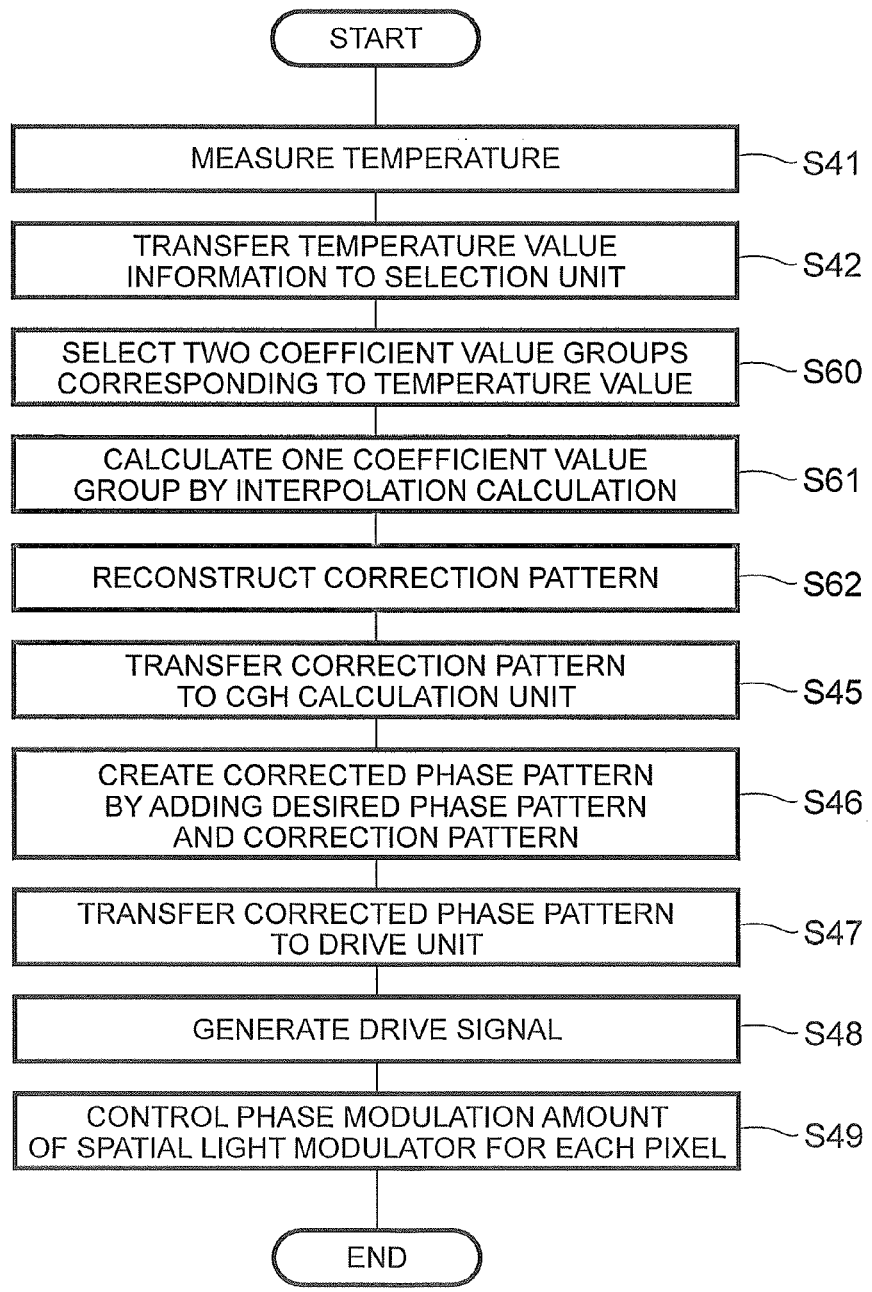
FIG. 18 is a flowchart showing a spatial light modulation method in the case where a coefficient value group corresponding to a temperature value between the N temperature values is determined by carrying out interpolation of the N coefficient value groups.

Further, in the present embodiment, a coefficient value group corresponding to a temperature value between the N temperature values may be determined by carrying out interpolation of the N coefficient value groups. FIG. 18 is a flowchart showing a spatial light modulation method including such an interpolation method. First, the temperature sensor control unit 21 determines a current temperature value Ts of the spatial light modulator 10 (Temperature acquisition step S41). The information on this temperature value Ts is transferred from the temperature sensor control unit 21 to the selection unit 28 (Step S42). Next, the selection unit 28 selects two coefficient value groups corresponding to temperature values immediately higher and lower than the temperature value Ts from among the N coefficient value groups stored in the storage unit 27 based on the temperature value Ts (Step S60). These coefficient value groups are transferred to a coefficient value group estimation unit provided between the selection unit 28 and the correction pattern reconstruction unit 29. Then, the coefficient value group estimation unit calculates one coefficient value group by performing an interpolation calculation based on the two coefficient value groups transferred from the selection unit 28 (Step S61). The calculated coefficient value group is transferred to the correction pattern reconstruction unit 29. The correction pattern reconstruction unit 29 reconstructs one correction pattern P1 from the coefficient value group transferred from the coefficient value group estimation unit (Step S62). Thereafter, processing which is the same as that in Steps S45 to S49 (refer to FIG. 13) in the present embodiment is carried out.

Figure 19:
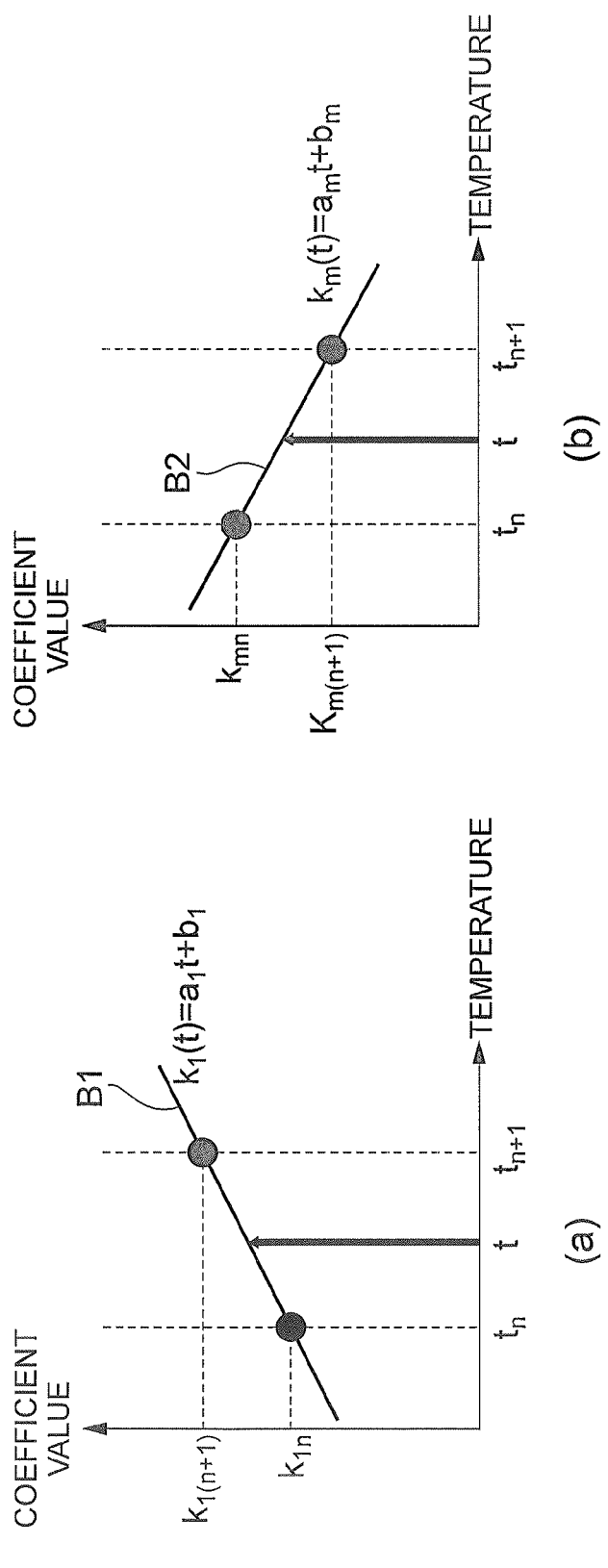
FIG. 19 includes graphs for explanation of an example of an interpolation calculation method for a coefficient value group in a coefficient value group estimation unit.

(a) and (b) in FIG. 19 are graphs for explanation of an example of an interpolation calculation method for coefficient value groups in the coefficient value group estimation unit. The horizontal axis of these graphs shows the temperature value, and the vertical axis shows the coefficient value. Now, it is assumed that each of the N coefficient groups contains m coefficient values $k_1, k_2, \ldots, k_m$. These coefficient values $k_1, k_2, \ldots, k_m$ have different values for each of the N coefficient groups. As shown in (a) in FIG. 19, it is given that a value of the coefficient value $k_1$ corresponding to a temperature value $t_n$ is $k_{1n}$, and a value of the coefficient value $k_1$ corresponding to a temperature value $t_{n+1}$ is $k_{1(n+1)}$. Further, as shown in (b) in FIG. 19, it is given that a value of the coefficient value $k_m$ corresponding to a temperature value $t_n$ is $k_{mn}$, and a value of the coefficient value $k_m$ corresponding to a temperature value $t_{n+1}$ is $k_{m(n+1)}$. At this time, the relationship between the coefficient value $k_1$ and the temperature value t (a straight line B1 in the graph) is expressed by:

$$k_1(t) = a_1 t + b_1$$

by use of a proportionality coefficient $a_1$ and a constant $b_1$. In the same way, the relationship between the coefficient value $k_m$ and the temperature value t (a straight line B2 in the graph) is expressed by:

$$k_m(t) = a_m t + b_m$$

by use of a proportionality coefficient $a_m$ and a constant $b_m$. This is the same with respect to the coefficient values $k_2(t)$ to $k_{m-1}(t)$. Then, it is possible to easily determine coefficient values $k_{10}, k_{20}, k_{m0}$ corresponding to a temperature value $t_0$ ($t_n < t_0 < t_{n+1}$) from these formulas. The coefficient value group estimation unit performs such linear interpolation calculation, thereby being capable of calculating one coefficient value group composed of the coefficient values $k_{10}, k_{20}, k_{m0}$.

Figure 20:
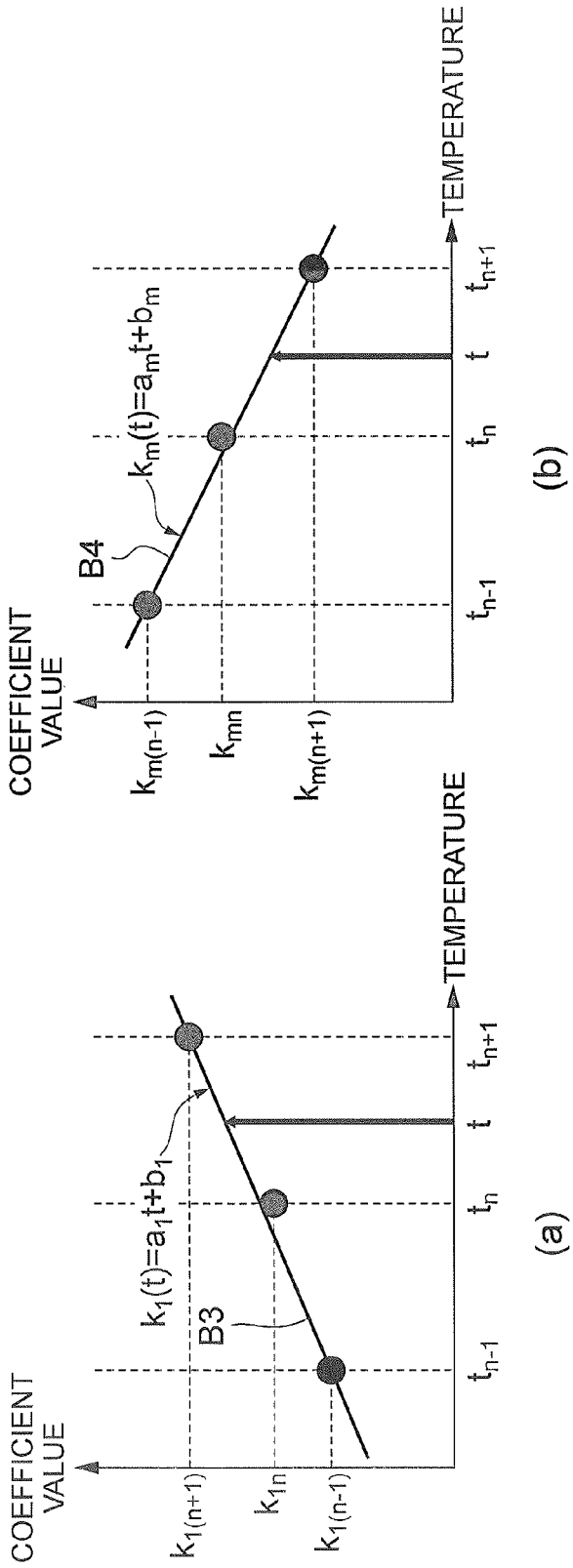
FIG. 20 includes graphs for explanation of another example of an interpolation calculation method for a coefficient value group in a coefficient value group estimation unit.

(a) and (b) in FIG. 20 are graphs for explanation of another example of an interpolation calculation method for coefficient value groups in the coefficient value group estimation unit. In addition, at the time of performing this interpolation calculation method, in Step S60 shown in FIG. 18, it is necessary for the selection unit 28 to select three or more coefficient value groups corresponding to temperature values approximate to the temperature value Ts from among the N coefficient value groups stored in the storage unit 27.

As shown in (a) in FIG. 20, it is given that a value of the coefficient value $k_1$ corresponding to a temperature value $t_{n-1}$ is $k_{1(n-1)}$, a value of the coefficient value $k_1$ corresponding to the temperature value $t_n$ is $k_{1n}$, and a value of the coefficient value $k_1$ corresponding to a temperature value $t_{n+1}$ is $k_{1(n+1)}$. Further, as shown in (b) in FIG. 20, it is given that a value of the coefficient value $k_m$ corresponding to the temperature value $t_{n-1}$ is $k_{m(n-1)}$, a value of the coefficient value $k_m$ corresponding to the temperature value $t_n$ is $k_{mn}$, and a value of the coefficient value $k_m$ corresponding to the temperature value $t_{n+1}$ is $k_{m(n+1)}$. At this time, it is possible to approximate the relationship between the coefficient value $k_1$ and the temperature value t (a straight line B3 in the graph) to:

$$k_1(t) = a_1 t + b_1$$

by the least-square method. In the same way, it is possible to approximate the relationship between the coefficient value $k_m$ and the temperature value t (a straight line B4 in the graph) to:

$$k_m(t) = a_m t + b_m.$$

This is the same with respect to the coefficient values $k_2(t)$ to $k_{m-1}(t)$. Then, it is possible to easily determine coefficient values $k_{10}, k_{20}, \ldots, k_{m0}$ corresponding to a temperature value $t_0$ ($t_n < t_0 < t_{n+1}$) from these formulas. The coefficient value group estimation unit performs such an approximate interpolation calculation by the least-square method, thereby being capable of calculating one coefficient value group composed of the coefficient values $k_{10}, k_{20}, \ldots, k_{m0}$. In addition, in this method, the approximate calculation by the least-square method may be performed after differently weighing to the respective temperature values. Further, not only the linear approximation described above, but also high-order polynomial approximation or exponential approximation may be applied.

Second Modification

Here, a modification of the control unit 20B according to the second embodiment will be described. In the present modification, the storage unit 27 stores a correction pattern at a certain reference temperature, or a coefficient value group for the correction pattern, and stores N coefficient value groups (hereinafter called difference coefficient value groups) for differences (correction difference patterns) between the correction pattern at this reference temperature and correction patterns at respective temperatures. In addition, the correction difference patterns are information showing how phase distortion changes when the temperature is changed from the reference temperature to the respective temperatures, and data which are added to (combined with) the phase distortion correction pattern at the reference temperature, thereby it is possible to calculate phase distortion correction patterns at the respective temperatures. In this way, the storage unit 27 in the present modification stores a correction pattern or a coefficient value group at the reference temperature, and N difference coefficient value groups at other temperatures, thereby substantially storing N coefficient value groups.

Figure 21:
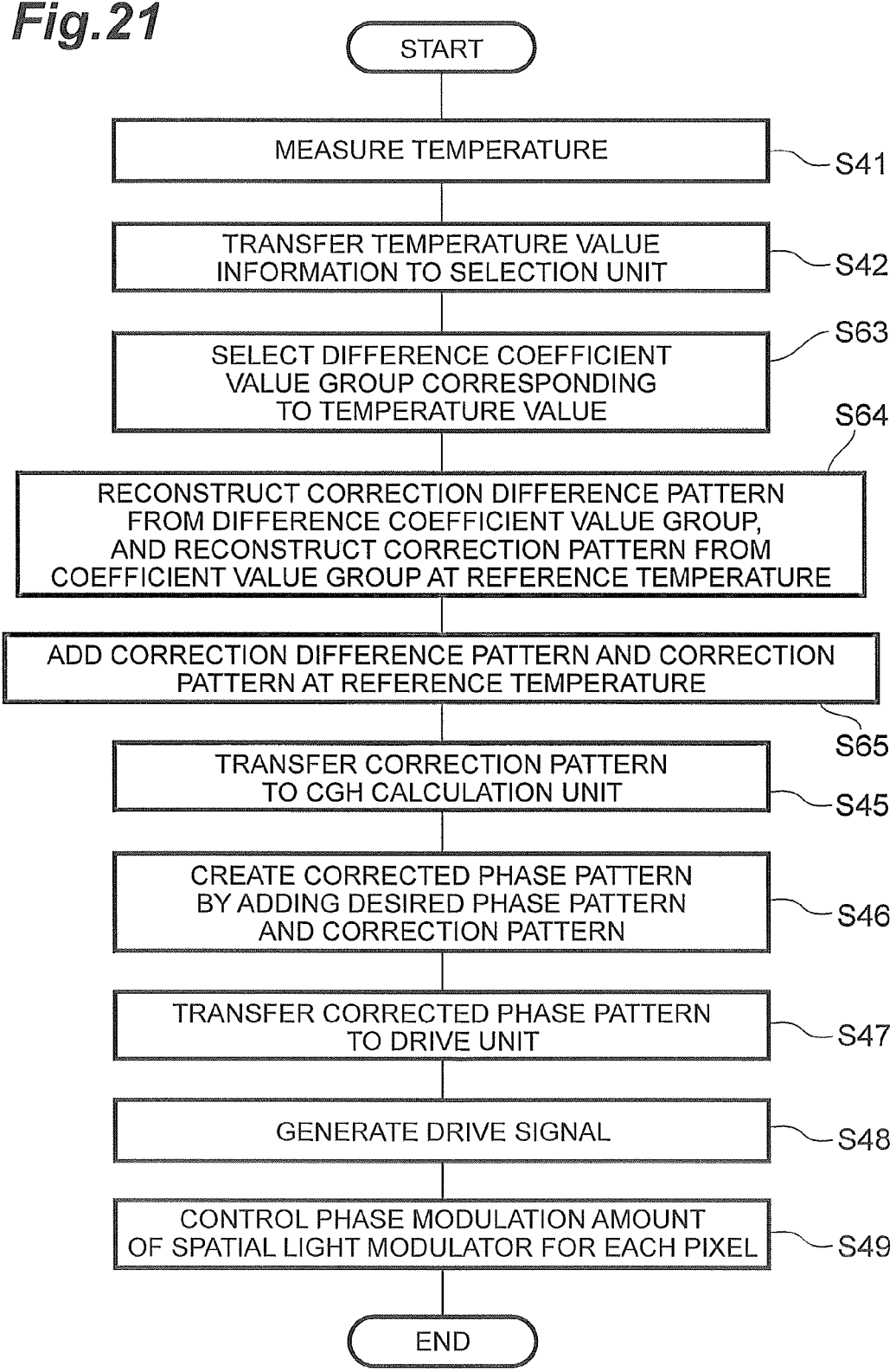
FIG. 21 is a flowchart showing the operations of a control unit according to a second modification.

FIG. 21 is a flowchart showing the operations of the control unit 20B having such a configuration. First, the temperature sensor control unit 21 acquires a temperature signal Stemp from the temperature sensor 17, and determines a current temperature value Ts of the spatial light modulator 10 based on the temperature signal Stemp (Temperature acquisition step S41). The information on this temperature value Ts is transferred from the temperature sensor control unit 21 to the selection unit 28 (Step S42).

Next, the selection unit 28 selects a difference coefficient value group corresponding to a temperature value most proximate to the temperature value Ts from among the difference coefficient value groups stored in the storage unit 27 based on the temperature value Ts (Coefficient value group selection step S63). This difference coefficient value group is transferred to the correction pattern reconstruction unit 29 along with the coefficient value group or the correction pattern at the reference temperature. The correction pattern reconstruction unit 29 reconstructs one correction difference pattern from the difference coefficient value group transferred from the selection unit 28, and reconstructs one correction pattern from the coefficient value group at the reference temperature as needed (Step S64). The correction pattern reconstruction unit 29 generates a correction pattern P1 by adding (combining) the correction difference pattern and the correction pattern at the reference temperature (Step S65). Thereafter, processing which is the same as that in Steps S45 to S49 (refer to FIG. 13) in the above-described embodiment is carried out.

As exemplified in the present modification, the storage unit 27 may substantially store N coefficient value groups by various manners. Even in such a case, it is possible to preferably exert the operation and effect according to the above-described embodiment. In addition, in the present modification as well, in the case where the spatial light modulator 10 has a plurality of the temperature sensors 17, a temperature sensor 17 to be used for measurement may be selected from among the plurality of temperature sensors 17, and the temperature sensor control unit 21 may determine a current temperature value Ts of the spatial light modulator 10 based on the temperature signal Stemp provided from the selected temperature sensor 17. In this case, a single storage unit 27 and a selection unit 28 may be provided respectively for the single temperature sensor 17. Or, two or more temperature sensors 17 to be used for measurement may be selected from among the plurality of temperature sensors 17, and the temperature sensor control unit 21 may determine two or more temperature values corresponding to these based on the two or more temperature signals Stemp provided from the selected two or more temperature sensors 17, and an average value of these temperature values, or a temperature correction value weighed according to a measurement point is calculated, and the value may be set as a temperature value Ts. In this case, a single storage unit 27 and a selection unit 28 may be provided respectively for a plurality of combinations of the temperature sensors 17.

Further, in the present modification, the temperature sensor control unit 21 may retain N temperature values corresponding to the N difference coefficient value groups in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present modification, a difference coefficient value memory for temporarily retaining a selected difference coefficient value group may be provided for the control unit 20B, and the difference coefficient value group may be appropriately read out of the coefficient value memory, thereby decreasing the frequency of operations of the selection unit 28. In that case, it is preferable that the control unit 20B further has means for storing a temperature value corresponding to the difference coefficient value group stored in the difference coefficient value memory, and means for calculating a difference between the temperature value and the current temperature value Ts in addition to the difference coefficient value memory. Then, in the case where this difference is smaller than a threshold value, the difference coefficient value group stored in the difference coefficient value memory can be transferred to the correction pattern reconstruction unit 29.

Further, in the present modification, in the case where a temperature change in the spatial light modulator 10 is gradual, or the accuracy of temperature correction to be required is relatively low, another storage unit (for example, a frame memory or the like) for temporarily retaining the correction difference pattern reconstructed from the difference coefficient value group or the correction pattern P1 synthesized from the correction difference pattern may be provided for the control unit 20B, and the correction difference pattern or the correction pattern P1 may be appropriately read out of the other storage unit, thereby decreasing the frequency of operations of the selection unit 28 and the correction pattern reconstruction unit 29. In that case, it is preferable that the control unit 20B further has means for storing a temperature value corresponding to the correction difference pattern or the correction pattern P1 stored in the other storage unit, and means for calculating a difference between the temperature value and the current temperature value Ts in addition to the other storage unit. Then, in the case where this difference is smaller than a threshold value, the correction pattern P1 generated by use of the correction difference pattern stored in the other storage unit, or the correction pattern P1 stored in the other storage unit can be transferred to the computer generated hologram calculation unit 25.

Further, in the present modification, a difference coefficient value group corresponding to a temperature value within the N temperature values may be determined by carrying out interpolation of the N difference coefficient value groups (refer to FIG. 18 to FIG. 20).

Third Embodiment

A configuration of a spatial light modulation device according to a third embodiment of the present invention will be described hereinafter. In the same way as the first embodiment, the spatial light modulation device of the present embodiment includes the light source 2, the spatial filter 3, the collimator lens 4, the Fourier transform lens 5, and the spatial light modulator 10 which are shown in FIG. 1. The configurations thereof are the same as those in the first embodiment. Further, the spatial light modulation device of the present embodiment includes a control unit which will be described hereinafter, in place of the control unit 20A of the first embodiment.

Figure 22:
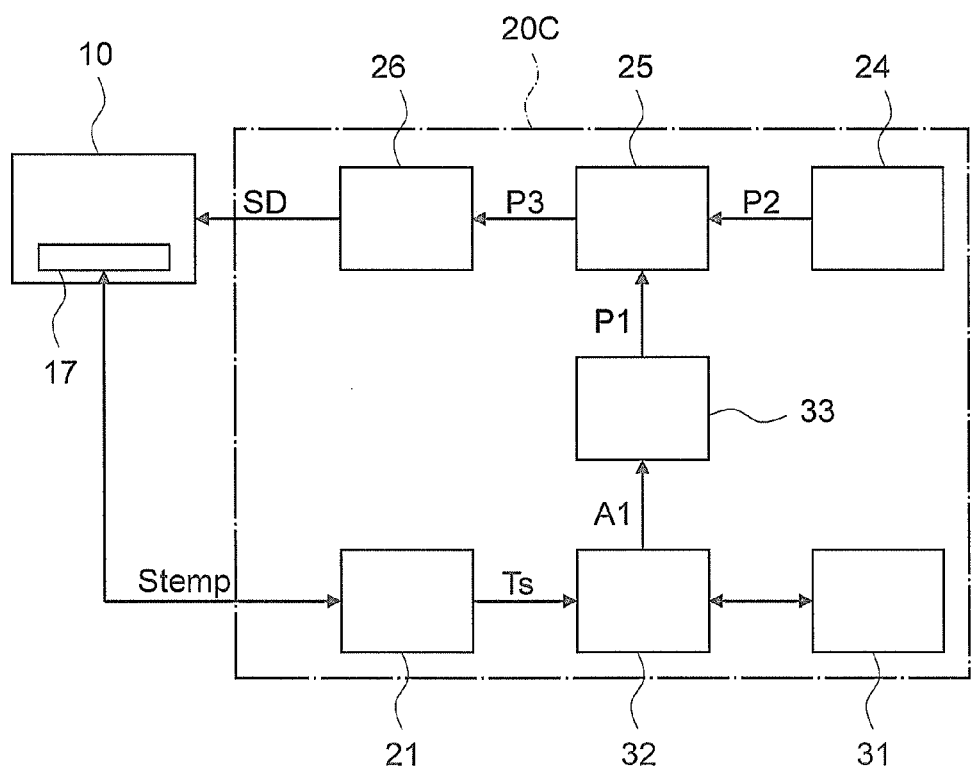
FIG. 22 is a block diagram showing a configuration of a control unit according to a third embodiment.

FIG. 22 is a block diagram showing a configuration of a control unit 20C included in the spatial light modulation device according to the present embodiment. As shown in FIG. 22, the control unit 20C has the temperature sensor control unit 21, the computer generated hologram creation unit 24, the computer generated hologram calculation unit 25, the drive unit 26, a storage unit 31, a coefficient value calculation unit 32, and a correction pattern reconstruction unit 33. The configurations of the temperature sensor control unit 21, the computer generated hologram creation unit 24, the computer generated hologram calculation unit 25, and the drive unit 26 among those are the same as those in the first embodiment.

The storage unit 31 is storage means in the present embodiment, and stores a function using a temperature value as a variable for respective coefficient values contained in N (N is an integer not less than 2) coefficient value groups (coefficient value sequences). Here, the N coefficient value groups are coefficients which are calculated in advance from the respective N correction patterns in the first embodiment, and one or a plurality of coefficients are calculated for one correction pattern, and the one or plurality of coefficients compose one coefficient value group. A coefficient value group is calculated by the same method as the second embodiment described above. The storage unit 31 is preferably composed of, for example, a RAM or the like in the same way as the storage unit 22 of the first embodiment. The coefficient value calculation unit 32 calculates one coefficient value group from among the N coefficient value groups by applying a temperature value Ts provided from the temperature sensor control unit 21 to the functions stored in the storage unit 31. The coefficient value calculation unit 32 provides the calculated coefficient value group A1 to the correction pattern reconstruction unit 33. The correction pattern reconstruction unit 33 reconstructs one correction pattern P1 from the coefficient value group A1 transferred from the coefficient value calculation unit 32. The correction pattern reconstruction unit 33 provides the generated correction pattern P1 to the computer generated hologram calculation unit 25.

Figure 23:
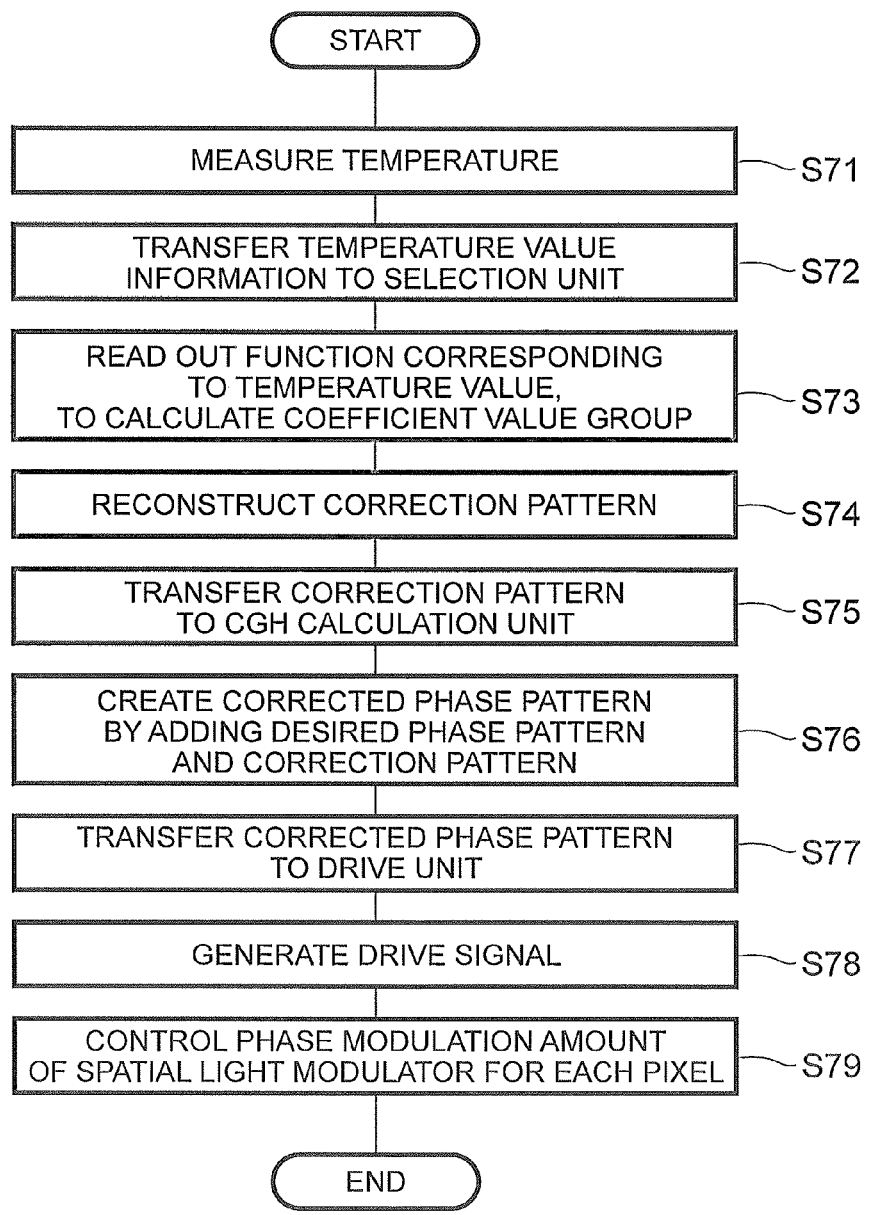
FIG. 23 is a flowchart showing the operations of a spatial light modulation device according to the third embodiment.

FIG. 23 is a flowchart showing the operations of the spatial light modulation device of the present embodiment. A spatial light modulation method of the present embodiment will be described along with the operations of the spatial light modulation device with reference to FIG. 23.

First, the temperature sensor control unit 21 acquires a temperature signal Stemp from the temperature sensor 17, and determines a current temperature value Ts of the spatial light modulator 10 based on the temperature signal Stemp (Temperature acquisition step S71). The information on this temperature value Ts is transferred from the temperature sensor control unit 21 to the coefficient value calculation unit 32 (Step S72). Next, the coefficient value calculation unit 32 reads out the functions of the respective coefficient values stored in the storage unit 31 sequentially, and applies the temperature value Ts to these functions. Thereby, respective coefficient values corresponding to the temperature value Ts can be obtained (Coefficient value calculation step S73). The coefficient value group A1 composed of these coefficient values is transferred to the correction pattern reconstruction unit 33. Then, the correction pattern reconstruction unit 33 reconstructs one correction pattern P1 from the coefficient value group A1 transferred from the coefficient value calculation unit 32 (Step S74). The reconstructed correction pattern P1 is transferred to the computer generated hologram calculation unit 25 (Step S75).

Next, the computer generated hologram calculation unit 25 creates a corrected phase pattern P3 by adding (combining) the computer generated hologram (desired phase pattern) P2 provided from the computer generated hologram creation unit 24 and the correction pattern P1 (Step S76). This corrected phase pattern P3 is transferred from the computer generated hologram calculation unit 25 to the drive unit 26 (Step S77). Then, the drive unit 26 generates a drive signal SD based on the corrected phase pattern P3 (Drive signal generation step S78). Finally, a phase modulation amount for each of the plurality of pixels contained in the spatial light modulator 10 is controlled by the drive signal SD (Modulation control step S79).

In accordance with the spatial light modulation device and the spatial light modulation method of the present embodiment having the above-described configuration, it is possible to preferably suppress distortion in a phase distribution according to a temperature change in the spatial light modulator 10. Further, because the processing in the control unit 20C has only to apply the temperature value Ts to a function to calculate one coefficient value group A1, and reconstruct and add the correction pattern P1, it is possible to keep a delay in operation to a minimum.

Further, in accordance with the spatial light modulation device and the spatial light modulation method of the present embodiment, as compared with the second embodiment, it is possible to further compress a data volume to be stored in the storage unit 31. For example, in the case where a correction pattern is expressed by use of a tenth-order associated Legendre polynomial, and functions using a temperature value as a variable are created by applying a third-order least-square method to the respective coefficient values, 55 functions having four coefficients are stored in the storage unit 31. Assuming that the respective coefficient values are all 32-bit signed single-precision floating point type data, its data volume is 32 bits×4 (coefficients)×55 (functions)=880 bytes. Because it is necessary to store a coefficient value group for each temperature value in the second embodiment described above, in the case where the number of temperature values is greater than 4, it is possible to make a data volume of the storage unit smaller in the present embodiment. In particular, in the case where there are a plurality of wavelengths of incident light, because it is necessary to prepare a plurality of correction patterns corresponding to the respective wavelengths, a storage capacity required for the storage unit is likely to be increased. In such a case, the present embodiment in which it is possible to make the storage capacity smaller is advantageous. Further, in accordance with the present embodiment, because the selection unit 28 of the second embodiment (refer to FIG. 12) may be omitted, it is possible to simplify the control unit.

Further, in accordance with the spatial light modulation device and the spatial light modulation method of the present embodiment, because a correction pattern is created by use of functions using a temperature value as a variable, high-accuracy and high-resolution correction is possible. Moreover, when a coefficient value group is calculated by use of only representative orthonormal functions, it is possible to shorten a calculation time.

In addition, in the present embodiment, as the spatial light modulator 10, other than the electrically-addressable liquid crystal element, various spatial light modulators such as an optically-addressable liquid crystal element and a deformable mirror type modulator are applicable.

Further, in the present embodiment, an attachment position of the temperature sensor 17 in the spatial light modulator 10 is preferably any one point of the inside of the housing of the spatial light modulator 10, the outside of the housing of the spatial light modulator 10, the surface of the glass substrate 15 of the spatial light modulator 10, the rear surface of the silicon substrate 11 of the spatial light modulator 10, the incident position of the incident optical image L2, and the inside of the circuit of the spatial light modulator 10 serving as a heat source. Or, the temperature sensors 17 may be disposed at a plurality of points among those, or a plurality of the temperature sensors 17 may be disposed at one point.

In the case where the spatial light modulator 10 has a plurality of the temperature sensors 17, the spatial light modulation device can operate as follows, for example. First, a temperature sensor 17 to be used for measurement is selected from among the plurality of temperature sensors 17. Next, the temperature sensor control unit 21 determines a current temperature value Ts of the spatial light modulator 10 based on the temperature signal Stemp provided from the selected temperature sensor 17. Thereafter, processing which is the same as that in Steps S72 to S79 (refer to FIG. 23) in the present embodiment is carried out.

Further, in the case where the spatial light modulator 10 has a plurality of the temperature sensors 17, the spatial light modulation device may operate as follows. First, two or more temperature sensors 17 to be used for measurement are selected from among the plurality of temperature sensors 17. Next, the temperature sensor control unit 21 determines two or more temperature values corresponding to these based on the two or more temperature signals Stemp provided from the selected two or more temperature sensors 17. Then, an average value of these temperature values, or a temperature correction value weighed according to a measurement point is calculated, and the value is set as a temperature value Ts. Thereafter, processing which is the same as that in Steps S72 to S79 (refer to FIG. 23) in the above-described embodiment is carried out. In particular, in the case where a temperature gradient is caused inside the spatial light modulator 10, as described above, temperatures at a plurality of points are simultaneously measured by use of the plurality of temperature sensors 17, and an average value of those or a temperature correction value is used, thereby it is possible to further improve the accuracy of temperature correction.

In addition, in the case where the spatial light modulation device performs the operations described above, a single storage unit 31 and a coefficient value calculation unit 32 may be provided respectively for the single temperature sensor 17. Or, a single storage unit 31 and a coefficient value calculation unit 32 may be provided respectively for a plurality of combinations of the temperature sensors 17. In accordance with these configurations, it is possible to independently handle the respective storage units 31 and the respective coefficient value calculation units 32. Further, because it is sufficient that the capacities of the respective storage units 31 are small, there is no need to use expensive large-capacity storage elements. In addition, it is more preferable that the control unit 20C further has another selection unit for selecting a single storage unit 31 and a coefficient value calculation unit 32 from among the plurality of storage units 31 and coefficient value calculation units 32.

Further, in the present embodiment or the above-described configuration (the configuration in which the spatial light modulator 10 has the plurality of temperature sensors 17), the temperature sensor control unit 21 may retain N temperature values corresponding to N correction patterns in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present embodiment, a coefficient value memory for temporarily retaining a coefficient value group A1 calculated by the coefficient value calculation unit 32 may be provided for the control unit 20C, and the coefficient value group A1 may be appropriately read out of the coefficient value memory, thereby decreasing the frequency of operations of the coefficient value calculation unit 32. In that case, it is preferable that the control unit 20C further has means for storing a temperature value corresponding to the coefficient value group A1 stored in the coefficient value memory, and means for calculating a difference between the temperature value and the current temperature value Ts in addition to the coefficient value memory. Then, in the case where this difference is smaller than a threshold value, the coefficient value group A1 stored in the coefficient value memory can be transferred to the correction pattern reconstruction unit 33.

Figure 24:
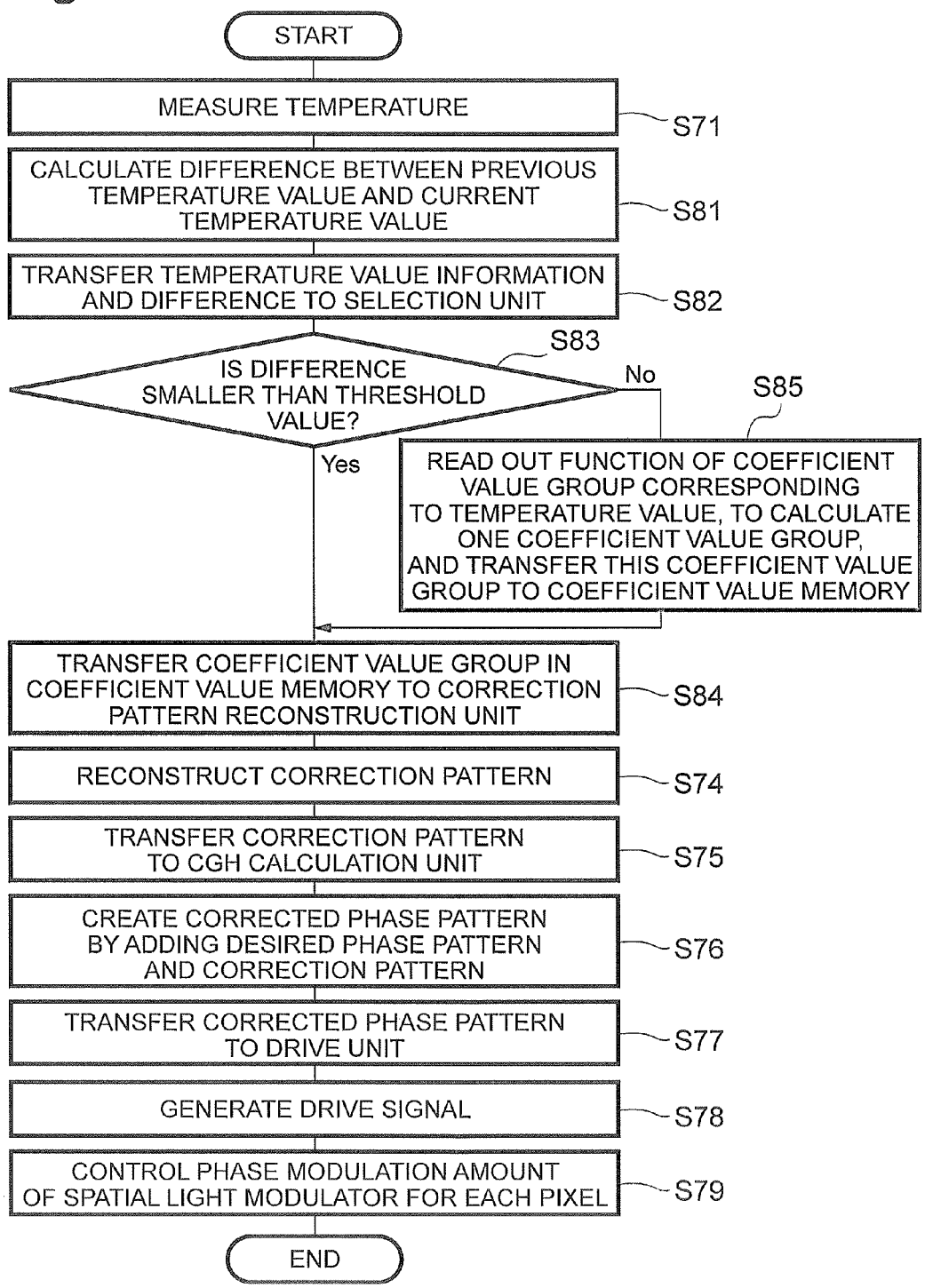
FIG. 24 is a flowchart showing an example of the operations in the case where the control unit has a coefficient value memory for temporarily retaining a coefficient value group in the third embodiment.

FIG. 24 is a flowchart showing an example of the operations of the control unit 20C having such a configuration. First, the temperature sensor control unit 21 determines a current temperature value of the spatial light modulator 10 (Temperature acquisition step S71). Next, a difference between the temperature value calculated last time and the current temperature value is calculated (Step S81). Then, the current temperature value is stored in the memory, and the current temperature value and the difference are transferred to the coefficient value calculation unit 32 (Step S82). It is judged whether the difference and the threshold value are large or small in the coefficient value calculation unit 32 (Step S83), and in the case where the difference is smaller than the threshold value (Yes in Step S83), the coefficient value group A1 stored in the coefficient value memory is transferred to the correction pattern reconstruction unit 33 (Step S84). Further, in the case where the difference is greater than the threshold value (No in Step S83), the coefficient value calculation unit 32 reads out a function stored in the storage unit 31, and applies the temperature value Ts to this function, thereby calculating one coefficient value group A1, and the coefficient value group A1 is transferred to the coefficient value memory (Step S85). Moreover, this coefficient value group A1 is transferred from the coefficient value memory to the correction pattern reconstruction unit 33 (Step S84). Thereafter, processing which is the same as that in Steps S74 to S79 (refer to FIG. 23) in the present embodiment is carried out.

Further, in the present embodiment, in the case where a temperature change in the spatial light modulator 10 is gradual, or the accuracy of temperature correction to be required is relatively low, another storage unit (for example, a frame memory or the like) for temporarily retaining the correction pattern P1 reconstructed by the coefficient value group A1 may be provided for the control unit 20C, and the correction pattern P1 may be appropriately read out of the other storage unit, thereby decreasing the frequency of operations of the coefficient value calculation unit 32 and the correction pattern reconstruction unit 33. In that case, it is preferable that the control unit 20C further has means for storing a temperature value corresponding to the correction pattern P1 stored in the other storage unit, and means for calculating a difference between the temperature value and the current temperature value Ts in addition to the other storage unit. Then, in the case where this difference is smaller than a threshold value, the correction pattern P1 stored in the other storage unit can be transferred to the computer generated hologram calculation unit 25. In addition, even in the case where high-accuracy temperature correction is required, such a configuration is possible by use of a high-speed response memory as the above-described other storage unit.

Figure 25:
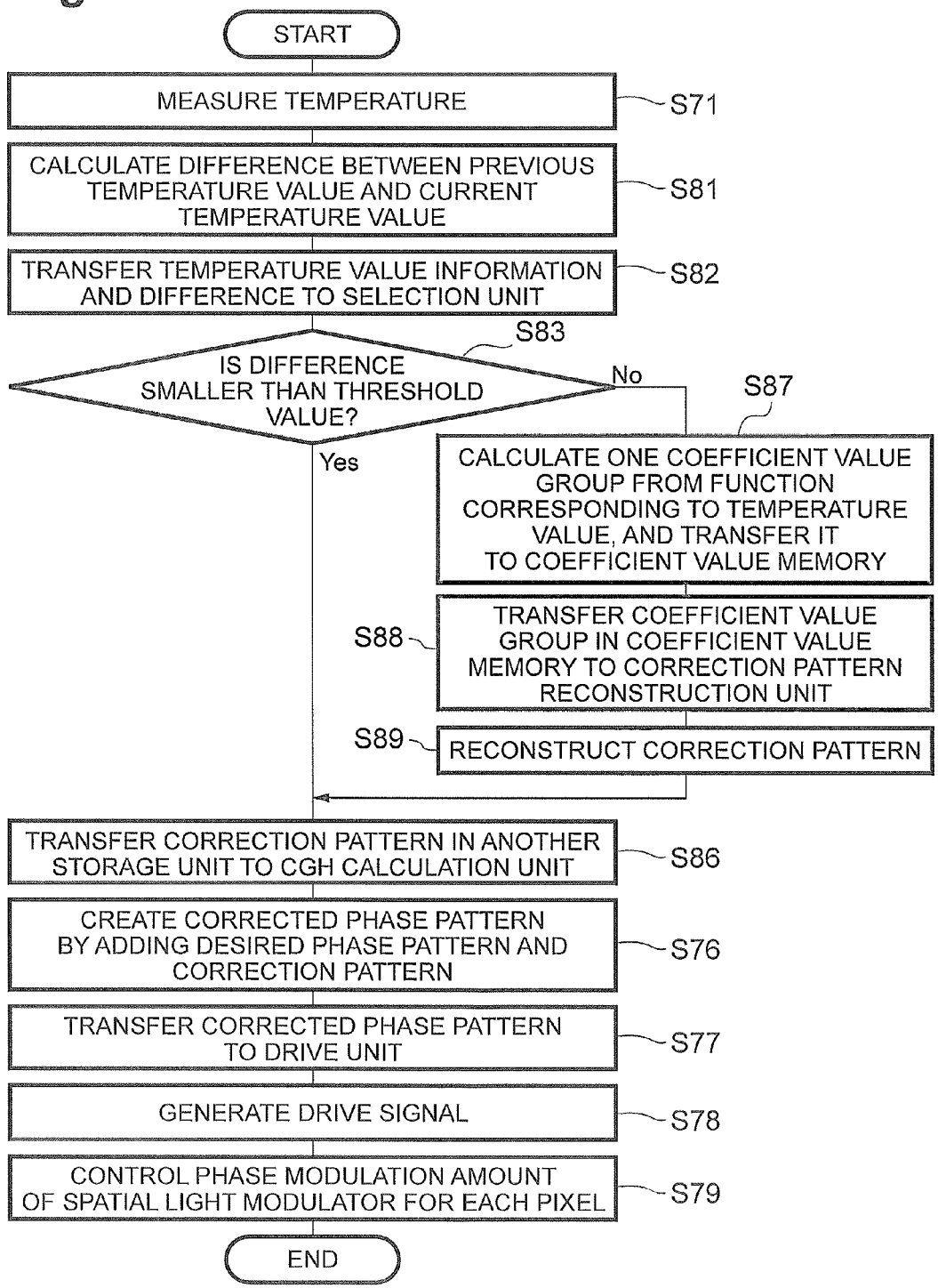
FIG. 25 is a flowchart showing an example of the operations in the case where the control unit has another storage unit for temporarily retaining a reconstructed correction pattern in the third embodiment.

FIG. 25 is a flowchart showing an example of the operations of the control unit 20C having such a configuration. In addition, in this operation, operations up to Step S83 are the same as the operations shown in FIG. 24. In this operation, in the case where the difference is smaller than the threshold value (Yes in Step S83), the correction pattern P1 stored in the other storage unit is transferred to the computer generated hologram calculation unit 25 (Step S86). Further, in the case where the difference is greater than the threshold value (No in Step S83), the coefficient value calculation unit 32 applies the temperature value Ts to the functions stored in the storage unit 31, thereby calculating one coefficient value group A1, and the coefficient value group A1 is transferred to the coefficient value memory (Step S87). Moreover, this coefficient value group A1 is transferred from the coefficient value memory to the correction pattern reconstruction unit 33 (Step S88). Then, the correction pattern reconstruction unit 33 reconstructs one correction pattern P1 from the coefficient value group A1 (Step S89). The reconstructed correction pattern P1 is transferred to the computer generated hologram calculation unit 25 (Step S86). Thereafter, processing which is the same as that in Steps S76 to S79 (refer to FIG. 23) in the present embodiment is carried out.

Fourth Embodiment

A configuration of a spatial light modulation device according to a fourth embodiment of the present invention will be described hereinafter. In the same way as the first embodiment, the spatial light modulation device of the present embodiment includes the light source 2, the spatial filter 3, the collimator lens 4, the Fourier transform lens 5, and the spatial light modulator 10 which are shown in FIG. 1. The configurations thereof are the same as those in the first embodiment. Further, the spatial light modulation device of the present embodiment includes a control unit which will be described hereinafter, in place of the control unit 20A of the first embodiment.

Figure 26:
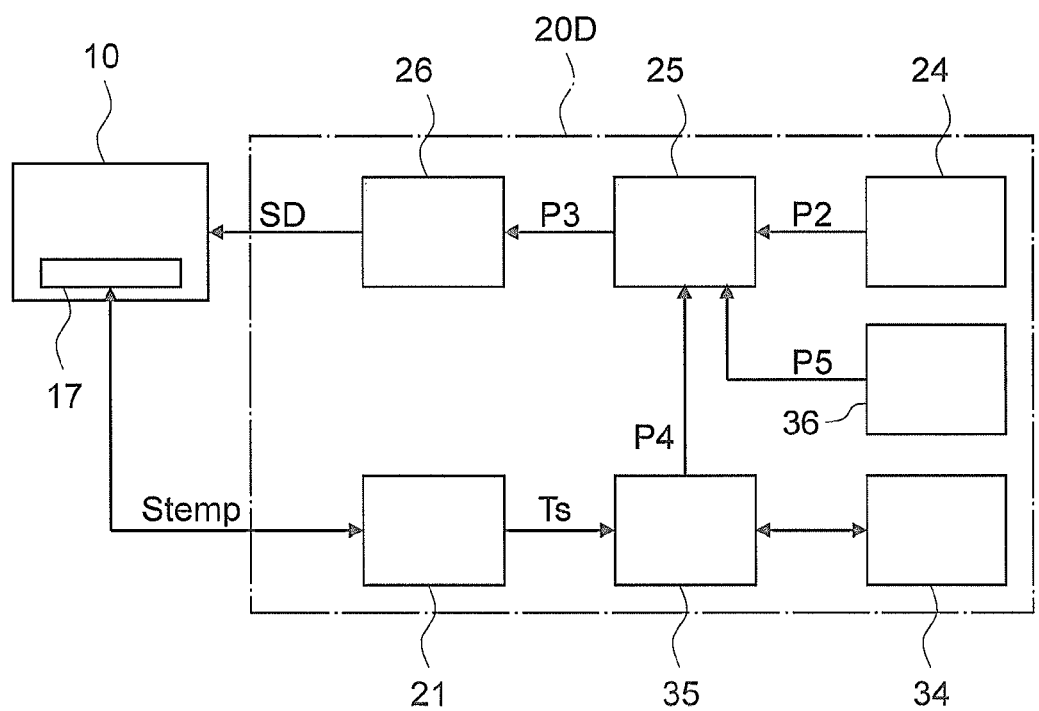
FIG. 26 is a block diagram showing a configuration of a control unit according to a fourth embodiment.

FIG. 26 is a block diagram showing a configuration of a control unit 20D included in the spatial light modulation device according to the present embodiment. As shown in FIG. 26, the control unit 20D has the temperature sensor control unit 21, the computer generated hologram creation unit 24, the computer generated hologram calculation unit 25, the drive unit 26, a storage unit 34, a temperature dependent component calculation unit 35, and a storage unit 36. The configurations of the temperature sensor control unit 21, the computer generated hologram creation unit 24, the computer generated hologram calculation unit 25, and the drive unit 26 among those are the same as those in the first embodiment.

The storage unit 34 is storage means in the present embodiment, and stores functions using a temperature value as a variable for respective coefficient values contained in N (N is an integer not less than 2) coefficient value groups (coefficient value sequences). Here, the respective N coefficient value groups are coefficient value groups which are calculated in advance from the respective N correction patterns in the first embodiment, meanwhile, these coefficient value groups in the present embodiment are composed only of coefficient values which are dependent on a temperature of the spatial light modulator 10 (or, whose degree of dependence is higher than a certain reference) among one or a plurality of coefficient values calculated for the respective correction patterns. These coefficient value groups are formed by selecting only coefficient values which are dependent on a temperature of the spatial light modulator 10 (or, whose degree of dependence is higher than a certain reference) among the coefficient values calculated by the same methods as those in the second embodiment described above. The storage unit 34 is preferably composed of, for example, a RAM or the like in the same way as the storage unit 22 of the first embodiment.

The temperature dependent component calculation unit 35 calculates one coefficient value group from among the N coefficient value groups by applying a temperature value Ts provided from the temperature sensor control unit 21 to the functions stored in the storage unit 34. Moreover, the temperature dependent component calculation unit 35 reconstructs one correction pattern P4 (temperature dependent component) from the calculated coefficient value group. The temperature dependent component calculation unit 35 provides the generated correction pattern P4 to the computer generated hologram calculation unit 25.

The storage unit 36 composes the storage means of the present embodiment along with the storage unit 34. The storage unit 36 stores a reference phase pattern in advance. The reference phase pattern is a phase pattern created in advance by subtracting the correction pattern P4 from a correction pattern at a reference temperature. In other words, the reference phase pattern is a phase pattern which is reconstructed in advance from only coefficient values which are independent of a temperature of the spatial light modulator 10 (or whose degree of dependence is lower than a certain reference). In the present embodiment, the computer generated hologram calculation unit 25 creates a corrected phase pattern P3 by adding a phase modulation amount contained in the computer generated hologram P2 provided from the computer generated hologram creation unit 24, a correction phase value contained in the correction pattern P4, and a correction phase value contained in the reference correction pattern P5 in the storage unit 36 for each pixel.

Figure 27:
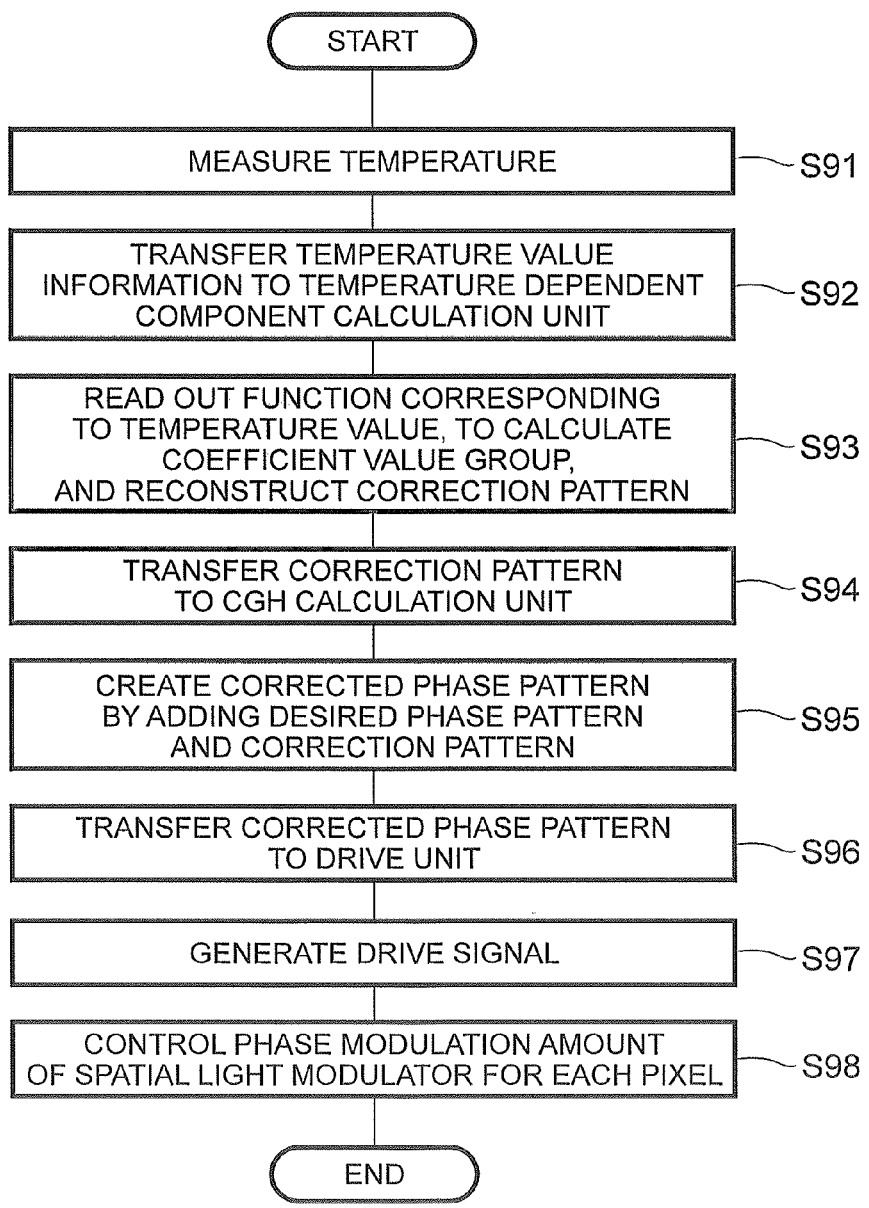
FIG. 27 is a flowchart showing the operations of a spatial light modulation device according to the fourth embodiment.

FIG. 27 is a flowchart showing the operations of the spatial light modulation device according to the present embodiment. A spatial light modulation method of the present embodiment will be described along with the operations of the spatial light modulation device with reference to FIG. 27.

First, the temperature sensor control unit 21 acquires a temperature signal Stemp from the temperature sensor 17, and determines a current temperature value Ts of the spatial light modulator 10 based on the temperature signal Stemp (Temperature acquisition step S91). The information on this temperature value Ts is transferred from the temperature sensor control unit 21 to the temperature dependent component calculation unit 35 (Step S92). Next, the temperature dependent component calculation unit 35 reads out the functions of the respective coefficient values (coefficient values dependent on a temperature of the spatial light modulator 10) stored in the storage unit 34 sequentially, and applies the temperature value Ts to these functions. Thereby, respective coefficient values corresponding to the temperature value Ts can be obtained. Moreover, the temperature dependent component calculation unit 35 reconstructs one correction pattern P4 from these coefficient values (Step S93). The reconstructed correction pattern P4 is transferred to the computer generated hologram calculation unit 25 (Step S94).

Next, the computer generated hologram calculation unit 25 creates a corrected phase pattern P3 by adding (combining) the computer generated hologram (desired phase pattern) P2 provided from the computer generated hologram creation unit 24, the correction pattern P4, and the reference phase pattern P5 (Step S95). This corrected phase pattern P3 is transferred from the computer generated hologram calculation unit 25 to the drive unit 26 (Step S96). Then, the drive unit 26 generates a drive signal SD based on the corrected phase pattern P3 (Drive signal generation step S97). Finally, a phase modulation amount for each of the plurality of pixels contained in the spatial light modulator 10 is controlled by the drive signal SD (Modulation control step S98).

In accordance with the spatial light modulation device and the spatial light modulation method of the present embodiment having the above-described configuration, it is possible to exert the following effects. That is, phase distortion caused by a temperature change in the spatial light modulator 10 is considered as being caused by a mechanical factor that rates of thermal expansion of the respective components such as the silicon substrate 11 and the pixel electrodes 13a composing the spatial light modulator 10 are different from each other. Accordingly, low-order functional phase distortion is dominant in the spatial light modulator 10. For example, at the time of expressing a correction pattern by an associated Legendre polynomial, low-order coefficient values (or functions) are likely to be more strongly affected by a temperature change. Therefore, only such low-order coefficient values (or functions) are corrected in temperature, and with respect to other coefficient values (functions), it is preferable that values of the correction pattern acquired at a certain reference temperature be directly used. Thereby, it is possible to preferably achieve temperature correction in the same way as in the first to third embodiments, and therefore, it is possible to preferably suppress distortion in a phase distribution according to a temperature change in the spatial light modulator 10.

Further, because the processing in the control unit 20D has only to apply the temperature value Ts to functions, to calculate a coefficient value group A2, and reconstruct and add the correction pattern P4 to the reference phase pattern P5 and the like, it is possible to keep a delay in operation to a minimum. In particular, in the present embodiment, because there are many low-load calculations such as substitution of the temperature value Ts into several functions, and addition of a phase value for each pixel in the respective calculation units, it is possible to speed up the operations as compared with the second embodiment and the third embodiment described above.

Further, when a low-order orthonormal function system is used for calculation of coefficient value groups, it may be impossible to sufficiently express high-order components of a correction pattern in some cases. In accordance with the spatial light modulation device and the spatial light modulation method of the present embodiment, even in such a case, constant values calculated from an actually-measured phase distortion pattern are used as high-order coefficient values of the correction pattern, and low-order coefficient values with high temperature dependence are made variable according to the temperature value Ts, thereby it is possible to correct phase distortion by a temperature change with a high degree of accuracy.

In addition, in the present embodiment, the coefficient value groups serving as the basis for the functions stored in the storage unit 34 are preferably calculated by use of the orthonormal function system which is capable of independently handling the functions of each other (for example, an associated Legendre polynomial in a case of a rectangle, and a Zernike polynomial in a case of a circle, or the like).

Figure 28:
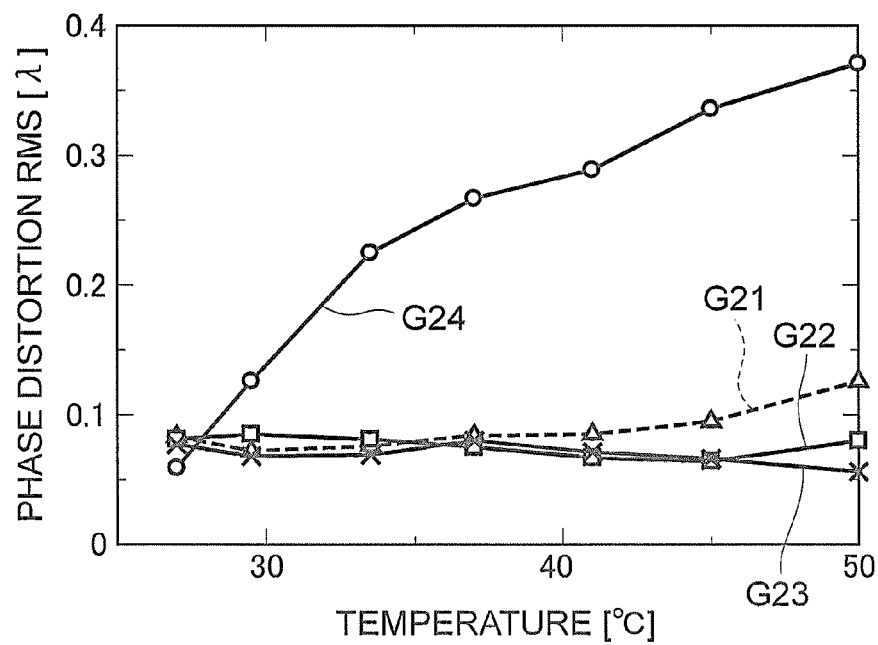
FIG. 28 is a graph showing the effect by the fourth embodiment.

FIG. 28 is a graph showing the effects by this embodiment. The graphs G21 to G23 shown in FIG. 28 are graphs showing the relationship between temperature values of the spatial light modulator 10 and the root-mean-square of phase distortion (unit: wavelength 2) in the spatial light modulation device of the present embodiment. In addition, these graphs G21 to G23 show the case where phase distortion of an emitted optical image L3 in the spatial light modulator 10 is measured at intervals of 5° C., and N (N=7 in this example) correction patterns are created from those measurement results, those correction patterns are expressed by a tenth-order associated Legendre polynomial, and a second-order least-square method is applied to one coefficient value in the graph G21, two coefficient values in the graph G22, and three coefficient values in the graph G23 among the coefficient values of the tenth-order associated Legendre polynomial, thereby creating functions using a temperature value Ts as a variable. Further, the graph G24 shown in FIG. 28 shows the relationship between the temperature of the spatial light modulator 10 and the root-mean-square of phase distortion, for comparison, in the case where phase distortion of an emitted optical image L3 in the spatial light modulator 10 is measured at a certain reference temperature (27° C. in this example), and only one correction pattern is created from the measurement result, and this correction pattern is added to a desired phase pattern.

As shown by the graph G24, in the case where the desired phase pattern is corrected by use of the only one correction pattern created at a certain reference temperature, phase distortion sensitively changes with respect to a temperature change in the spatial light modulator 10. In contrast thereto, a correction pattern is created by use of functions using a temperature value of the spatial light modulator 10 as a variable, and the desired phase pattern is corrected by use of this correction pattern as in the present embodiment, thereby, as shown by the graphs G21 to G23, it is possible to suppress phase distortion to $\frac{1}{10}$ or less of the phase modulation amount $\lambda$ even though there are measurement errors. In addition, in the present embodiment, as is clear from the graphs G21 to G23, the greater the number of coefficient values from which functions using a temperature value as a variable are created is, the more effective the phase distortion can be suppressed.

Figure 29:
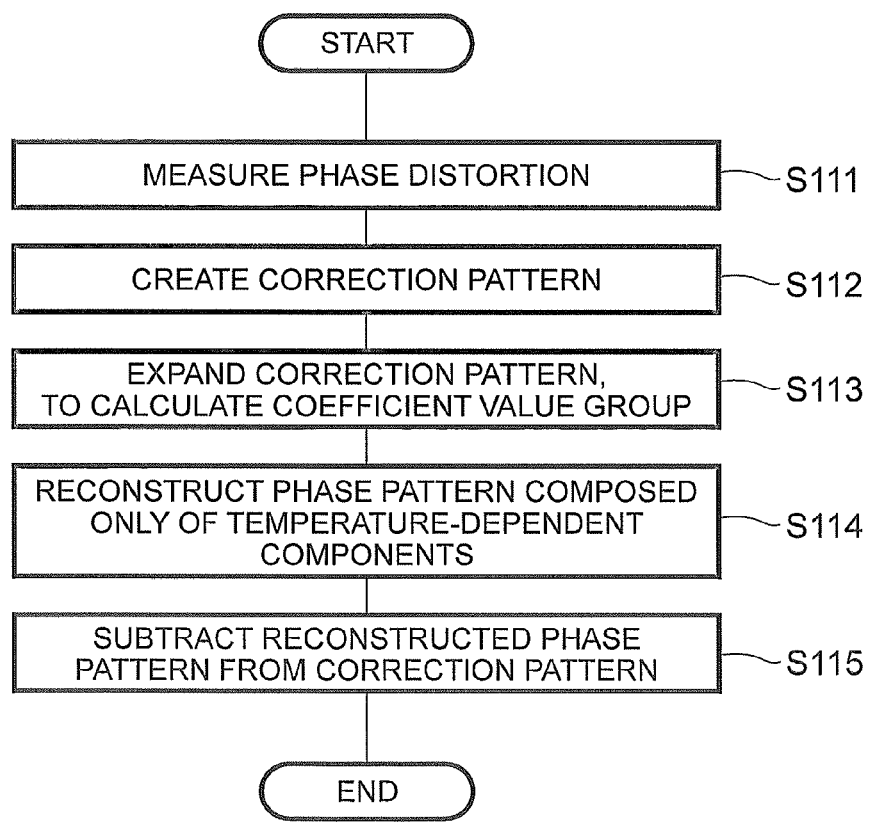
FIG. 29 is a flowchart showing an example of a method for creating a function and a reference phase pattern.

Further, in the present embodiment, it is important to appropriately create functions to be stored in the storage unit 34 and a reference phase pattern to be stored in the storage unit 36 in advance. FIG. 29 is a flowchart showing an example of a method for creating these functions and a reference phase pattern.

First, phase distortion of an emitted optical image L3 emitted from the spatial light modulator 10 is measured when a temperature of the spatial light modulator 10 is at a reference temperature (for example, at room temperature of 25° C.) (Step S111). At this time, it is preferable to measure phase distortion of a Fourier optical image L4 (that is, phase distortion of the entire optical system) after light L1 is emitted from the light source 2 shown in FIG. 1, an optical image L2 passing through the spatial filter 3 and the collimator lens 4 is made incident into the spatial light modulator 10, and the emitted optical image L3 emitted from the spatial light modulator 10 passes through the Fourier transform lens 5.

Next, a correction pattern for correcting the measured phase distortion is created (Step S112). Then, for example, the correction pattern is expanded by use of a tenth-order associated Legendre polynomial, and coefficient values at the respective orders of the associated Legendre polynomial are calculated (Step S113). Then, temperature-dependent orders among these coefficient values are checked in advance, and a phase pattern composed only of temperature-dependent components is reconstructed based on the associated Legendre polynomial composed of the orders and coefficient values in the orders (Step S114). Because the associated Legendre polynomial is an orthonormal function system, it is possible to preferably obtain a reference phase pattern which is the residual component by subtracting the reconstructed phase pattern from the correction pattern (Step S115). Further, it is possible to preferably obtain functions in the storage unit 34 by expressing the coefficient values concerning the temperature-dependent orders by functions using a temperature value as a variable.

Further, in the present embodiment, the case where only one reference phase pattern is stored in the storage unit 36 has been described. However, a plurality of reference phase patterns to be stored in the storage unit 36 may be prepared so as to correspond to a plurality of temperature values of the spatial light modulator 10. In that case, as shown in FIG. 30, it is preferable that the control unit 20D further has a selection unit 37 which selects one reference phase pattern from a plurality of reference phase patterns stored in the storage unit 36.

Figure 30:
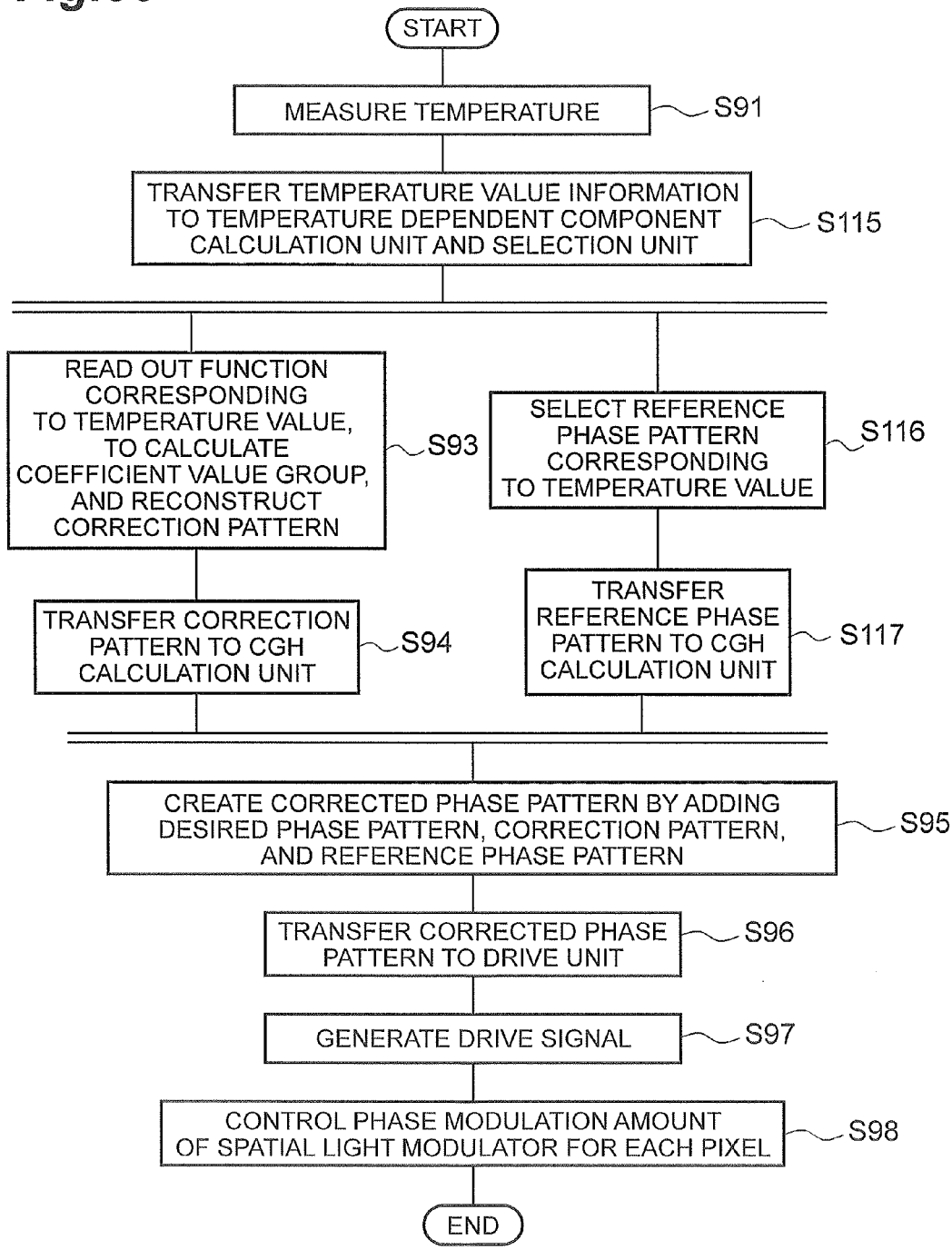
FIG. 30 is a diagram showing a configuration of a control unit having a selection unit that selects one reference phase pattern from a plurality of reference phase patterns stored in the storage unit.

FIG. 30 is a flowchart showing an example of the operations of the spatial light modulation device in the case where the control unit 20D has such a configuration. First, the temperature sensor control unit 21 acquires a temperature signal Stemp from the temperature sensor 17, and determines a current temperature value Ts of the spatial light modulator 10 based on the temperature signal Stemp (Temperature acquisition step S91). The information on this temperature value Ts is transferred from the temperature sensor control unit 21 to the temperature dependent component calculation unit 35 and the selection unit 37 (Step S115). The temperature dependent component calculation unit 35 reads out the functions of the respective coefficient values stored in the storage unit 34 sequentially, and applies the temperature value Ts to these functions. Thereby, respective coefficient values corresponding to the temperature value Ts can be obtained. Moreover, the temperature dependent component calculation unit 35 reconstructs one correction pattern P4 from these coefficient values (Step S93). The reconstructed correction pattern P4 is transferred to the computer generated hologram calculation unit 25 (Step S94). Meanwhile, the selection unit 37 selects a reference phase pattern corresponding to a temperature value most proximate to the temperature value Ts from among the plurality of reference phase patterns stored in the storage unit 36 based on the temperature value Ts (Step S116). This reference phase pattern P5 is transferred to the computer generated hologram calculation unit 25 (Step S117). Thereafter, processing which is the same as that in Steps S95 to S98 (refer to FIG. 27) in the present embodiment is carried out.

In the case where the reference phase pattern which is the residual component is slightly dependent on a temperature of the spatial light modulator 10, it is possible to perform correction of phase distortion with a higher degree of accuracy by use of the spatial light modulation method as described above.

Further, in the present embodiment, as the spatial light modulator 10, other than the electrically-addressable liquid crystal element, various spatial light modulators such as an optically-addressable liquid crystal element and a deformable mirror type modulator are applicable.

Further, in the present embodiment, an attachment position of the temperature sensor 17 in the spatial light modulator 10 is preferably any one point of the inside of the housing of the spatial light modulator 10, the outside of the housing of the spatial light modulator 10, the surface of the glass substrate 15 of the spatial light modulator 10, the rear surface of the silicon substrate 11 of the spatial light modulator 10, the incident position of the incident optical image L2, and the inside of the circuit of the spatial light modulator 10 serving as a heat source. Or, the temperature sensors 17 may be disposed at a plurality of points among those, or a plurality of the temperature sensors 17 may be disposed at one point.

In the case where the spatial light modulator 10 has a plurality of the temperature sensors 17, the spatial light modulation device can operate as follows, for example. First, a temperature sensor 17 to be used for measurement is selected from among the plurality of temperature sensors 17. Next, the temperature sensor control unit 21 determines a current temperature value Ts of the spatial light modulator 10 based on the temperature signal Stemp provided from the selected temperature sensor 17. Thereafter, processing which is the same as that in Steps S92 to S98 (refer to FIG. 27) in the present embodiment is carried out.

Further, in the case where the spatial light modulator 10 has a plurality of the temperature sensors 17, the spatial light modulation device may operate as follows. First, two or more temperature sensors 17 to be used for measurement are selected from among the plurality of temperature sensors 17. Next, the temperature sensor control unit 21 determines two or more temperature values corresponding to these based on the two or more temperature signals Stemp provided from the selected two or more temperature sensors 17. Then, an average value of these temperature values, or a temperature correction value weighed according to a measurement point is calculated, and the value is set as a temperature value Ts. Thereafter, processing which is the same as that in Steps S92 to S98 (refer to FIG. 27) in the above-described embodiment is carried out. In particular, in the case where a temperature gradient is caused inside the spatial light modulator 10, as described above, temperatures at a plurality of points are simultaneously measured by use of the plurality of temperature sensors 17, and an average value of those or a temperature correction value is used, thereby it is possible to further improve the accuracy of temperature correction.

In addition, in the case where the spatial light modulation device performs the operations described above, a single storage unit 34 and a temperature dependent component calculation unit 35 may be provided respectively for the single temperature sensor 17. Or, a single storage unit 34 and a temperature dependent component calculation unit 35 may be provided respectively for a plurality of combinations of the temperature sensors 17. In accordance with these configurations, it is possible to independently handle the respective storage units 34 and the respective temperature dependent component calculation units 35. Further, because it is sufficient that the capacities of the respective storage units 34 are small, there is no need to use expensive large-capacity storage elements. In addition, it is more preferable that the control unit 20D further has another selection unit for selecting a single storage unit 34 and a temperature dependent component calculation unit 35 from among the plurality of storage units 34 and temperature dependent component calculation units 35.

Further, in the present embodiment, the control unit 20D may have the temperature dependent component calculation units 35 and the storage units 34 which are the same in number of the temperature-dependent coefficient values. Thereby making parallel arithmetic processing possible, it becomes possible to further speed up the calculations.

Further, in the present embodiment or the above-described configuration (the configuration in which the spatial light modulator 10 has the plurality of temperature sensors 17), the temperature sensor control unit 21 may retain N temperature values corresponding to N correction patterns in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present embodiment, in the case where a temperature change in the spatial light modulator 10 is gradual, or the accuracy of temperature correction to be required is relatively low, another storage unit (for example, a frame memory or the like) for temporarily retaining the correction pattern P4 reconstructed by the temperature dependent component calculation unit 35 may be provided for the control unit 20D, and the correction pattern P4 may be appropriately read out of the other storage unit, thereby decreasing the frequency of operations of the temperature dependent component calculation unit 35. In that case, it is preferable that the control unit 20D further has means for storing a temperature value corresponding to the correction pattern P4 stored in the other storage unit, and means for calculating a difference between the temperature value and the current temperature value Ts in addition to the other storage unit. Then, in the case where this difference is smaller than a threshold value, the correction pattern P4 stored in the other storage unit can be transferred to the computer generated hologram calculation unit 25. In addition, even in the case where high-accuracy temperature correction is required, such a configuration is possible by use of a high-speed response memory as the above-described other storage unit.

Figure 31:
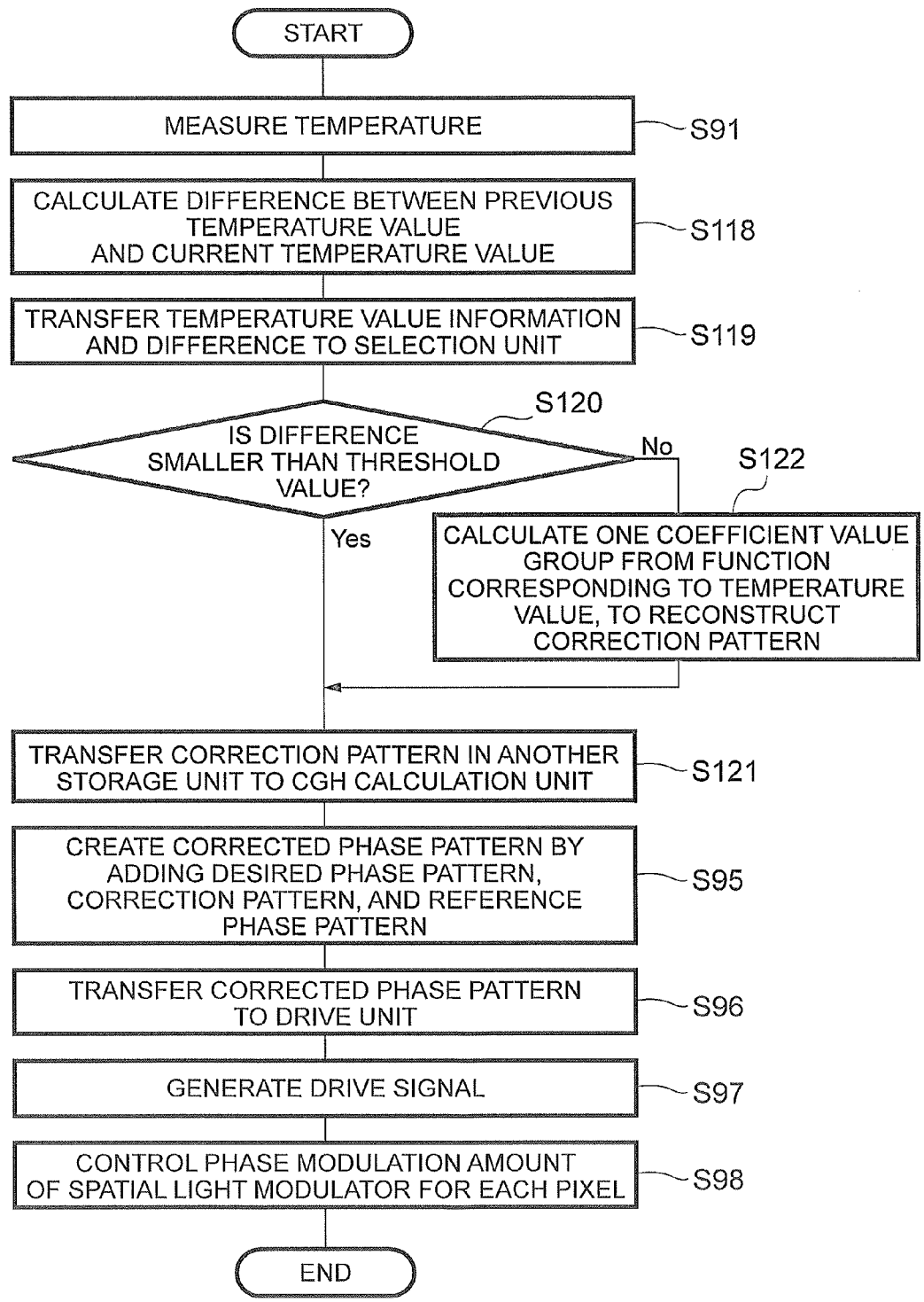
FIG. 31 is a flowchart showing an example of the operations in the case where the control unit has another storage unit for temporarily retaining a reconstructed correction pattern in the fourth embodiment.

FIG. 31 is a flowchart showing an example of the operations of the control unit 20D having such a configuration. First, the temperature sensor control unit 21 determines a current temperature value of the spatial light modulator 10 (Temperature acquisition step S91). Next, a difference between the temperature value calculated last time and the current temperature value is calculated (Step S118). Then, the current temperature value is stored in the memory, and the current temperature value and the difference are transferred to the temperature dependent component calculation unit 35 (Step S119). It is judged whether the difference and the threshold value are large or small in the temperature dependent component calculation unit 35 (Step S120), and in the case where the difference is smaller than the threshold value (Yes in Step S120), the correction pattern P4 stored in the other storage unit is transferred to the computer generated hologram calculation unit 25 (Step S121). Further, in the case where the difference is greater than the threshold value (No in Step S120), the temperature dependent component calculation unit 35 reads out a function stored in the storage unit 34, and applies the temperature value Ts to this function, thereby calculating one coefficient value group, and one correction pattern P4 is reconstructed from the coefficient value group, to be stored in another storage unit (Step S122). This correction pattern P4 is transferred from the other storage unit to the computer generated hologram calculation unit 25 (Step S121). Thereafter, processing which is the same as that in Steps S95 to S98 (refer to FIG. 27) in the present embodiment is carried out.

Further, in the present embodiment, the control unit 20D has two storage units which are the storage unit 34 and the storage unit 36, however, the control unit 20D may have one storage unit into which these storage units are integrated.

Third Modification

Here, a modification of the control unit 20D according to the fourth embodiment will be described. In the present modification, the storage unit 36 stores a correction pattern at a reference temperature in place of the reference phase pattern described above. Further, the storage unit 34 stores functions using a temperature value as a variable for the respective coefficient values contained in the N coefficient value groups (coefficient value sequences), and these functions show amounts of changes from the coefficient values at the reference temperature with a reference temperature serving as a point of origin (hereinafter, this function is called a difference function). That is, the difference function is information showing how phase distortion changes when the temperature is changed from the reference temperature to the respective temperatures, and a phase distortion correction pattern reconstructed from this difference function is added to (combined with) the phase distortion correction pattern at the reference temperature, thereby calculating phase distortion correction patterns at the respective temperatures. In this way, the storage units 34 and 36 in the present modification store a correction pattern at a reference temperature and functions showing amounts of changes from the coefficient values at the reference temperature, thereby substantially storing a function of N coefficient value groups which are calculated from the N correction patterns and the temperature values.

Figure 32:
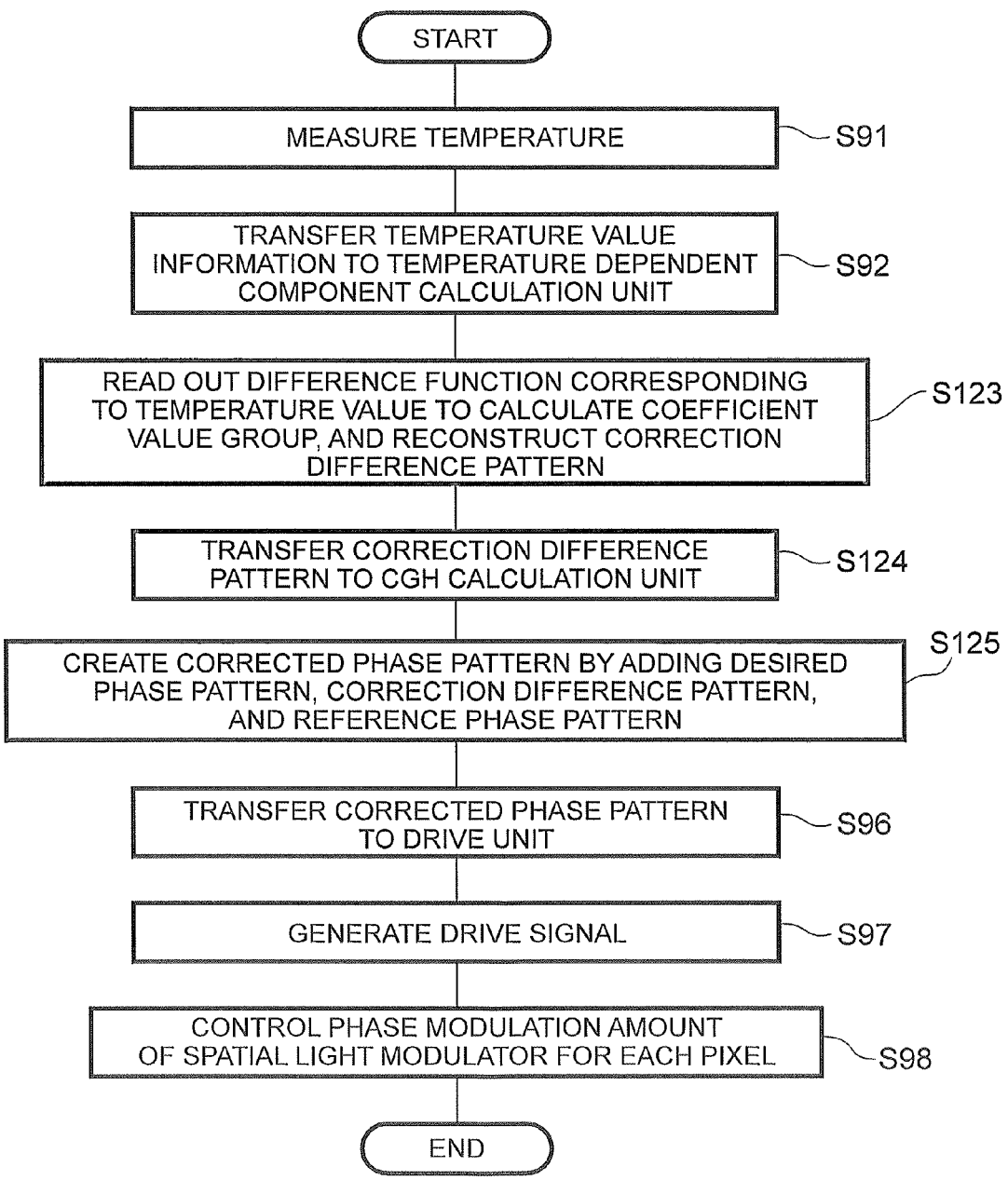
FIG. 32 is a flowchart showing the operations of a control unit according to a third modification.

FIG. 32 is a flowchart showing the operations of the control unit 20D having such a configuration. First, the temperature sensor control unit 21 acquires a temperature signal Stemp from the temperature sensor 17, and determines a current temperature value Ts of the spatial light modulator 10 based on the temperature signal Stemp (Temperature acquisition step S91). The information on this temperature value Ts is transferred from the temperature sensor control unit 21 to the temperature dependent component calculation unit 35 (Step S92).

Next, the temperature dependent component calculation unit 35 reads out the difference functions stored in the storage unit 34 sequentially, and applies the temperature value Ts to these difference functions. Thereby, respective coefficient values corresponding to the temperature value Ts can be obtained. Moreover, the temperature dependent component calculation unit 35 reconstructs one correction difference pattern from these coefficient values (Step S123). The reconstructed correction difference pattern is transferred to the computer generated hologram calculation unit 25 (Step S124).

Next, the computer generated hologram calculation unit 25 creates a corrected phase pattern P3 by adding (combining) the computer generated hologram (desired phase pattern) P2 provided from the computer generated hologram creation unit 24, the correction difference pattern provided from the temperature dependent component calculation unit 35, and the correction pattern at the reference temperature stored in the storage unit 36 (Step S125). Thereafter, processing which is the same as that in Steps S96 to S98 (refer to FIG. 27) in the present embodiment is carried out.

In addition, in the present modification, the data creation method is slightly different from that of the fourth embodiment. First, phase distortion of an emitted optical image L3 in the spatial light modulator 10 at a reference temperature (for example, at room temperature of 25° C.) is measured. Next, phase distortions of the emitted optical image L3 at respective temperatures are measured, to generate difference patterns between the phase distortion at the reference temperature and the phase distortions at the respective temperatures. This difference pattern is expressed by, for example, a tenth-order associated Legendre polynomial, to calculate coefficient values at the respective orders of the orthonormal function such as an associated Legendre polynomial. These coefficient values are expressed as functions with a temperature as a variable, thereby it is possible to create a difference function to be stored in the storage unit 34.

As exemplified in the present modification, the storage units 34 and 36 may substantially store a function of N coefficient value groups calculated from the N correction patterns and the temperature values by various manners. Even in such a case, it is possible to preferably obtain the operation and effect which are the same as those in the third embodiment. In addition, in the present modification as well, in the case where the spatial light modulator 10 has a plurality of the temperature sensors 17, a temperature sensor 17 to be used for measurement is selected from among the plurality of temperature sensors 17, and the temperature sensor control unit 21 may determine a current temperature value Ts of the spatial light modulator 10 based on the temperature signal Stemp provided from the selected temperature sensor 17. In this case, a single storage unit 34 and a temperature dependent component calculation unit 35 may be provided respectively for the single temperature sensor 17. Or, two or more temperature sensors 17 to be used for measurement may be selected from among the plurality of temperature sensors 17, the temperature sensor control unit 21 may determine two or more temperature values corresponding to these based on the two or more temperature signals Stemp provided from the selected two or more temperature sensors 17, and an average value of these temperature values, or a temperature correction value weighed according to a measurement point is calculated, and the value may be set as a temperature value Ts. In this case, a single storage unit 34 and a temperature dependent component calculation unit 35 may be provided respectively for a plurality of combinations of the temperature sensors 17.

Further, in the present modification, the temperature sensor control unit 21 may retain N temperature values corresponding to N difference coefficient value groups in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present modification, in the case where a temperature change in the spatial light modulator 10 is gradual, or the accuracy of temperature correction to be required is relatively low, another storage unit (for example, a frame memory or the like) for temporarily retaining the correction difference pattern reconstructed by the temperature dependent component calculation unit 35 may be provided for the control unit 20D, and the correction difference pattern may be appropriately read out of the other storage unit, thereby decreasing the frequency of operations of the temperature dependent component calculation unit 35. In that case, it is preferable that the control unit 20D further has means for storing a temperature value corresponding to the correction difference pattern stored in the other storage unit, and means for calculating a difference between the temperature value and the current temperature value Ts in addition to the other storage unit. Then, in the case where this difference is smaller than a threshold value, the correction difference pattern stored in the other storage unit can be transferred to the computer generated hologram calculation unit 25.

Further, in the present modification, a plurality of correction patterns to be stored in the storage unit 36 may be prepared so as to correspond to a plurality of reference temperature values. In that case, it is preferable that the control unit 20D further has a selection unit which selects one correction pattern from the plurality of correction patterns stored in the storage unit 36.

Further, in the present modification, the control unit 20D may have the temperature dependent component calculation units 35 and the storage units 34 which are the same in number of the difference functions. Thereby making parallel arithmetic processing possible, it becomes possible to further speed up the calculations.

Further, in the present modification, the control unit 20D has two storage units which are the storage unit 34 and the storage unit 36, however, the control unit 20D may have one storage unit into which these storage units are integrated.

Fifth Embodiment

A configuration of a spatial light modulation device according to a fifth embodiment of the present invention will be described hereinafter. In the same way as the first embodiment, the spatial light modulation device of the present embodiment includes the light source 2, the spatial filter 3, the collimator lens 4, the Fourier transform lens 5, and the spatial light modulator 10 which are shown in FIG. 1. The configurations thereof are the same as those in the first embodiment. Further, the spatial light modulation device of the present embodiment includes a control unit which will be described hereinafter, in place of the control unit 20A of the first embodiment.

Figure 33:
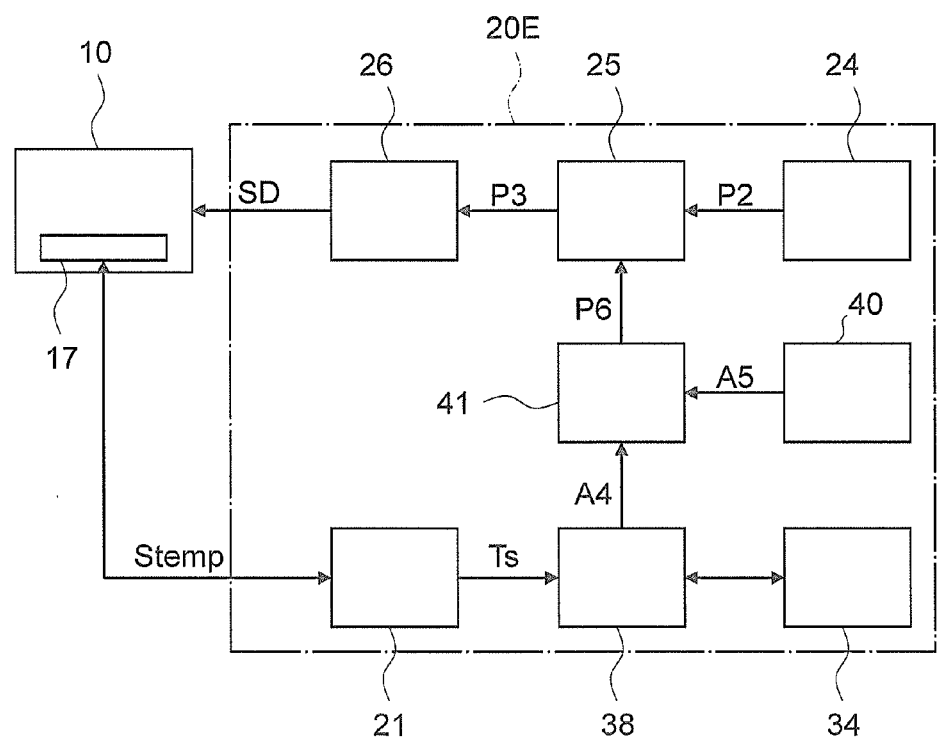
FIG. 33 is a block diagram showing a configuration of a control unit according to a fifth embodiment.

FIG. 33 is a block diagram showing a configuration of a control unit 20E included in the spatial light modulation device according to the present embodiment. As shown in FIG. 33, the control unit 20E has the temperature sensor control unit 21, the computer generated hologram creation unit 24, the computer generated hologram calculation unit 25, the drive unit 26, the storage unit 34, a coefficient value calculation unit 38, a storage unit 40, and a correction pattern reconstruction unit 41. The configurations of the temperature sensor control unit 21, the computer generated hologram creation unit 24, the computer generated hologram calculation unit 25, and the drive unit 26 among those are the same as those in the first embodiment. Further, in the same way as the fourth embodiment, the storage unit 34 stores functions for coefficient values dependent on a temperature of the spatial light modulator 10. These functions are preferably created according to the methods described in the fourth embodiment (refer to FIG. 29).

The coefficient value calculation unit 38 calculates one coefficient value group by applying a temperature value Ts provided from the temperature sensor control unit 21 to the functions stored in the storage unit 34. The coefficient value calculation unit 38 provides the generated coefficient value group A4 to the correction pattern reconstruction unit 41. The storage unit 40 composes the storage means of the present embodiment along with the storage unit 34. The storage unit 40 stores a reference coefficient value group in advance. A reference coefficient value group is a coefficient value group containing only coefficient values without dependence on a temperature of the spatial light modulator 10 (or, whose degree of dependence is lower than a certain reference). The correction pattern reconstruction unit 41 reconstructs one correction pattern P6 from one coefficient value group obtained by combining the coefficient value group A4 and a reference coefficient value group A5. The correction pattern reconstruction unit 41 provides the generated correction pattern P6 to the computer generated hologram calculation unit 25. In the present embodiment, the computer generated hologram calculation unit 25 creates a corrected phase pattern P3 by adding a phase modulation amount contained in the computer generated hologram P2 provided from the computer generated hologram creation unit 24, and a correction phase value contained in the correction pattern P6 for each pixel.

Figure 34:
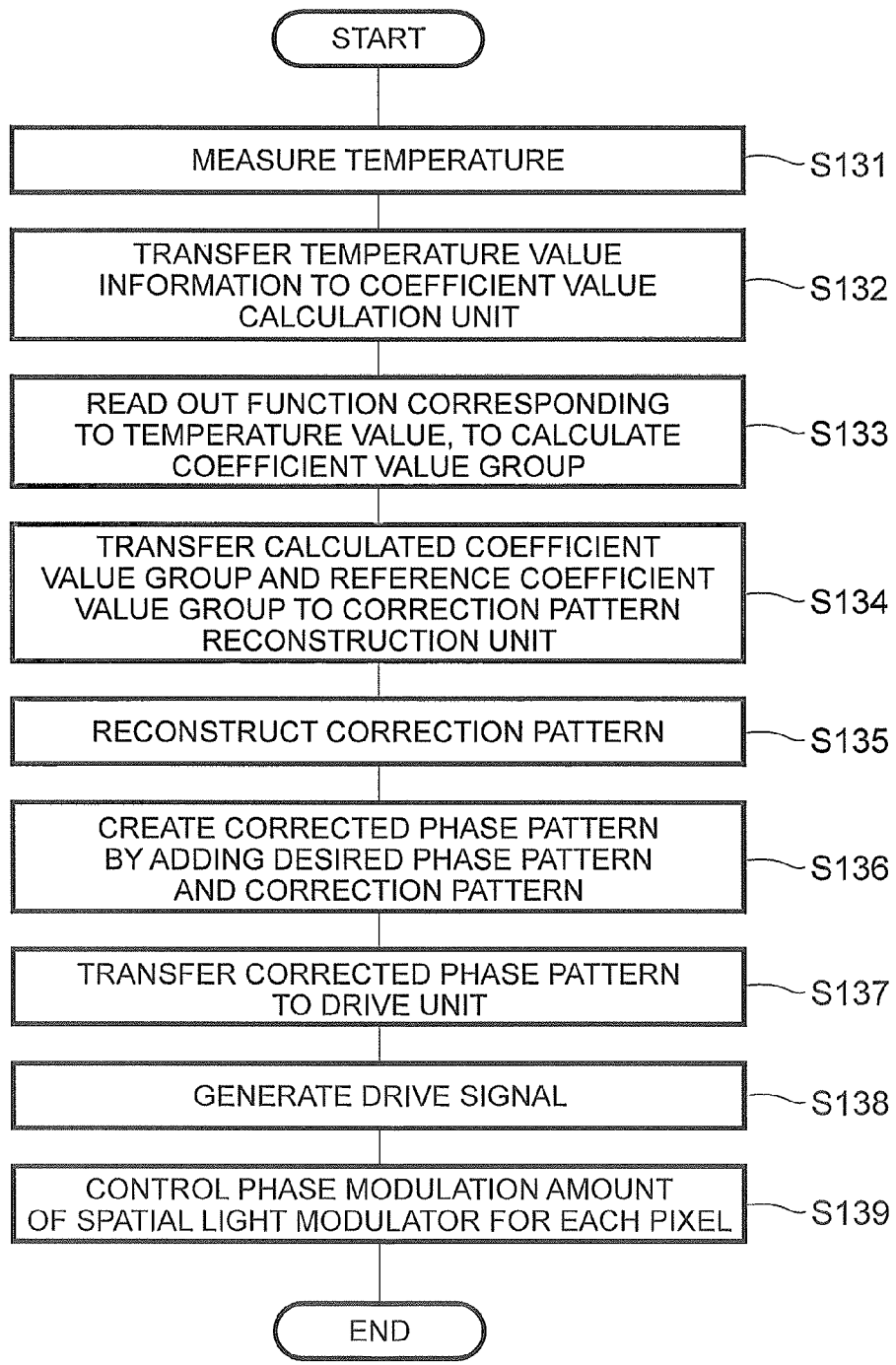
FIG. 34 is a flowchart showing the operations of a spatial light modulation device according to the fifth embodiment.

FIG. 34 is a flowchart showing the operations of the spatial light modulation device according to the present embodiment. A spatial light modulation method of the present embodiment will be described along with the operations of the spatial light modulation device with reference to FIG. 34.

First, the temperature sensor control unit 21 acquires a temperature signal Stemp from the temperature sensor 17, and determines a current temperature value Ts of the spatial light modulator 10 based on the temperature signal Stemp (Temperature acquisition step S131). The information on this temperature value Ts is transferred from the temperature sensor control unit 21 to the coefficient value calculation unit 38 (Step S132). Next, the coefficient value calculation unit 38 reads out the functions of the respective coefficient values (coefficient values dependent on a temperature of the spatial light modulator 10) stored in the storage unit 34 sequentially, and applies the temperature value Ts to these functions. Thereby, respective coefficient values corresponding to the temperature value Ts can be obtained (Step S133). Then, the coefficient value group A4 is transferred from the coefficient value calculation unit 38 to the correction pattern reconstruction unit 41, and the reference coefficient value group A5 is transferred from the storage unit 40 to the correction pattern reconstruction unit 41 (Step S134). The correction pattern reconstruction unit 41 reconstructs one correction pattern P6 from these coefficient value groups A4 and A5 (Step S135). The reconstructed correction pattern P6 is transferred to the computer generated hologram calculation unit 25.

Next, the computer generated hologram calculation unit 25 creates a corrected phase pattern P3 by adding (combining) the computer generated hologram (desired phase pattern) P2 provided from the computer generated hologram creation unit 24, and the correction pattern P6 (Step S136). This corrected phase pattern P3 is transferred from the computer generated hologram calculation unit 25 to the drive unit 26 (Step S137). Then, the drive unit 26 generates a drive signal SD based on the corrected phase pattern P3 (Drive signal generation step S138). Finally, a phase modulation amount for each of the plurality of pixels contained in the spatial light modulator 10 is controlled by the drive signal SD (Modulation control step S139).

In accordance with the spatial light modulation device and the spatial light modulation method of the present embodiment having the above-described configuration, it is possible to exert the following effects. That is, in the present embodiment, in the same way as the fourth embodiment, temperature correction is performed only on coefficient values more strongly affected by a temperature change, and other coefficient values of the correction pattern acquired at a certain reference temperature are directly used. In the case where the high-order components of the orthonormal function system of the reference phase pattern P5 in the fourth embodiment do not exert a strong effect on phase distortion, this reference phase pattern P5 may be retained as a coefficient value group of the orthonormal function system as in the present embodiment. Thereby, it is possible to preferably achieve temperature correction in the same way as in the first to third embodiments, and therefore, it is possible to preferably suppress distortion in a phase distribution according to a temperature change in the spatial light modulator 10.

Further, because the processing in the control unit 20E has only to apply the temperature value Ts to the functions, to calculate the coefficient value group A4, and reconstruct and add the correction pattern P6, it is possible to keep a delay in operation to a minimum. In particular, in the present embodiment, because there are many low-load calculations such as substitution of the temperature value Ts into several functions, and addition of a phase value for each pixel in the respective calculation units, it is possible to speed up the operation as compared with the second embodiment and the third embodiment described above.

Further, when a low-order orthonormal function system is used for calculation of coefficient value groups, it may be impossible to sufficiently express high-order components of a correction pattern in some cases. In accordance with the spatial light modulation device and the spatial light modulation method of the present embodiment, even in such a case, constant values calculated from an actually-measured phase distortion pattern are used as high-order coefficient values of the correction pattern, and low-order coefficient values with high temperature dependence are made variable according to the temperature value Ts, thereby it is possible to correct phase distortion by a temperature change with a high degree of accuracy.

In addition, in the present embodiment, the coefficient value groups serving as the basis for the functions stored in the storage unit 34 are preferably calculated by use of the orthonormal function system which is capable of independently handling the functions of each other (for example, an associated Legendre polynomial in a case of a rectangle, and a Zernike polynomial in a case of a circle, or the like).

Further, in the present embodiment, different from the fourth embodiment, the storage unit 40 stores, not a reference phase pattern, but a coefficient value group. In accordance with such a configuration, it is possible to easily create data to be stored in the storage unit in advance.

Further, in the present embodiment, the case where only one reference phase pattern is stored in the storage unit 40 has been described. However, a plurality of reference coefficient value groups to be stored in the storage unit 40 may be prepared so as to correspond to a plurality of temperature values of the spatial light modulator 10. In that case, in the same way as the configuration shown in FIG. 30 of the fourth embodiment, it is preferable that the control unit 20E further has a selection unit which selects one reference coefficient value group from the plurality of reference coefficient value groups stored in the storage unit 40. In the case where the reference phase value group which is the residual component is slightly dependent on a temperature of the spatial light modulator 10, it is possible to perform correction of phase distortion with a high degree of accuracy with such a configuration.

Further, in the present embodiment, as the spatial light modulator 10, other than the electrically-addressable liquid crystal element, various spatial light modulators such as an optically-addressable liquid crystal element and a deformable mirror type modulator are applicable.

Further, in the present embodiment, an attachment position of the temperature sensor 17 in the spatial light modulator 10 is preferably any one point of the inside of the housing of the spatial light modulator 10, the outside of the housing of the spatial light modulator 10, the surface of the glass substrate 15 of the spatial light modulator 10, the rear surface of the silicon substrate 11 of the spatial light modulator 10, the incident position of the incident optical image L2, and the inside of the circuit of the spatial light modulator 10 serving as a heat source. Or, the temperature sensors 17 may be disposed at a plurality of points among those, or a plurality of the temperature sensors 17 may be disposed at one point.

In the case where the spatial light modulator 10 has a plurality of the temperature sensors 17, the spatial light modulation device can operate as follows, for example. First, a temperature sensor 17 to be used for measurement is selected from among the plurality of temperature sensors 17. Next, the temperature sensor control unit 21 determines a current temperature value Ts of the spatial light modulator 10 based on the temperature signal Stemp provided from the selected temperature sensor 17. Thereafter, processing which is the same as that in Steps S132 to S139 (refer to FIG. 34) in the present embodiment is carried out.

Further, in the case where the spatial light modulator 10 has a plurality of the temperature sensors 17, the spatial light modulation device may operate as follows. First, two or more temperature sensors 17 to be used for measurement are selected from among the plurality of temperature sensors 17. Next, the temperature sensor control unit 21 determines two or more temperature values corresponding to these based on the two or more temperature signals Stemp provided from the selected two or more temperature sensors 17. Then, an average value of these temperature values, or a temperature correction value weighed according to a measurement point is calculated, and the value is set as a temperature value Ts. Thereafter, processing which is the same as that in Steps S132 to S139 (refer to FIG. 34) in the above-described embodiment is carried out. In particular, in the case where a temperature gradient is caused inside the spatial light modulator 10, as described above, temperatures at a plurality of points are simultaneously measured by use of the plurality of temperature sensors 17, and an average value of those or a temperature correction value is used, thereby it is possible to further improve the accuracy of temperature correction.

In addition, in the case where the spatial light modulation device performs the operations described above, a single storage unit 34 and a coefficient value calculation unit 38 may be provided respectively for the single temperature sensor 17. Or, a single storage unit 34 and a coefficient value calculation unit 38 may be provided respectively for a plurality of combinations of the temperature sensors 17. In accordance with these configurations, it is possible to independently handle the respective storage units 34 and the respective coefficient value calculation units 38. Further, because it is sufficient that the capacities of the respective storage units 34 are small, there is no need to use expensive large-capacity storage elements. In addition, it is more preferable that the control unit 20E further has another selection unit for selecting a single storage unit 34 and a coefficient value calculation unit 38 from among the plurality of storage units 34 and coefficient value calculation units 38.

Further, in the present embodiment, the control unit 20E may have the coefficient value calculation units 38 and the storage units 34 which are the same in number of the temperature-dependent coefficient values. Thereby making parallel arithmetic processing possible, it becomes possible to further speed up the calculations.

Further, in the present embodiment or the above-described configuration (the configuration in which the spatial light modulator 10 has the plurality of temperature sensors 17), the temperature sensor control unit 21 may retain N temperature values corresponding to N correction patterns in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present embodiment, in the case where a temperature change in the spatial light modulator 10 is gradual, or the accuracy of temperature correction to be required is relatively low, another storage unit (for example, a frame memory or the like) for temporarily retaining the correction pattern P6 reconstructed by the correction pattern reconstruction unit 41 may be provided for the control unit 20E, and the correction pattern P6 may be appropriately read out of the other storage unit, thereby decreasing the frequency of operations of the coefficient value calculation unit 38 and the correction pattern reconstruction unit 41. In that case, it is preferable that the control unit 20E further has means for storing a temperature value corresponding to the correction pattern P6 stored in the other storage unit, and means for calculating a difference between the temperature value and the current temperature value Ts in addition to the other storage unit. Then, in the case where this difference is smaller than a threshold value, the correction pattern P6 stored in the other storage unit can be transferred to the computer generated hologram calculation unit 25. In addition, even in the case where high-accuracy temperature correction is required, such a configuration is possible by use of a high-speed response memory as the above-described other storage unit.

Figure 35:
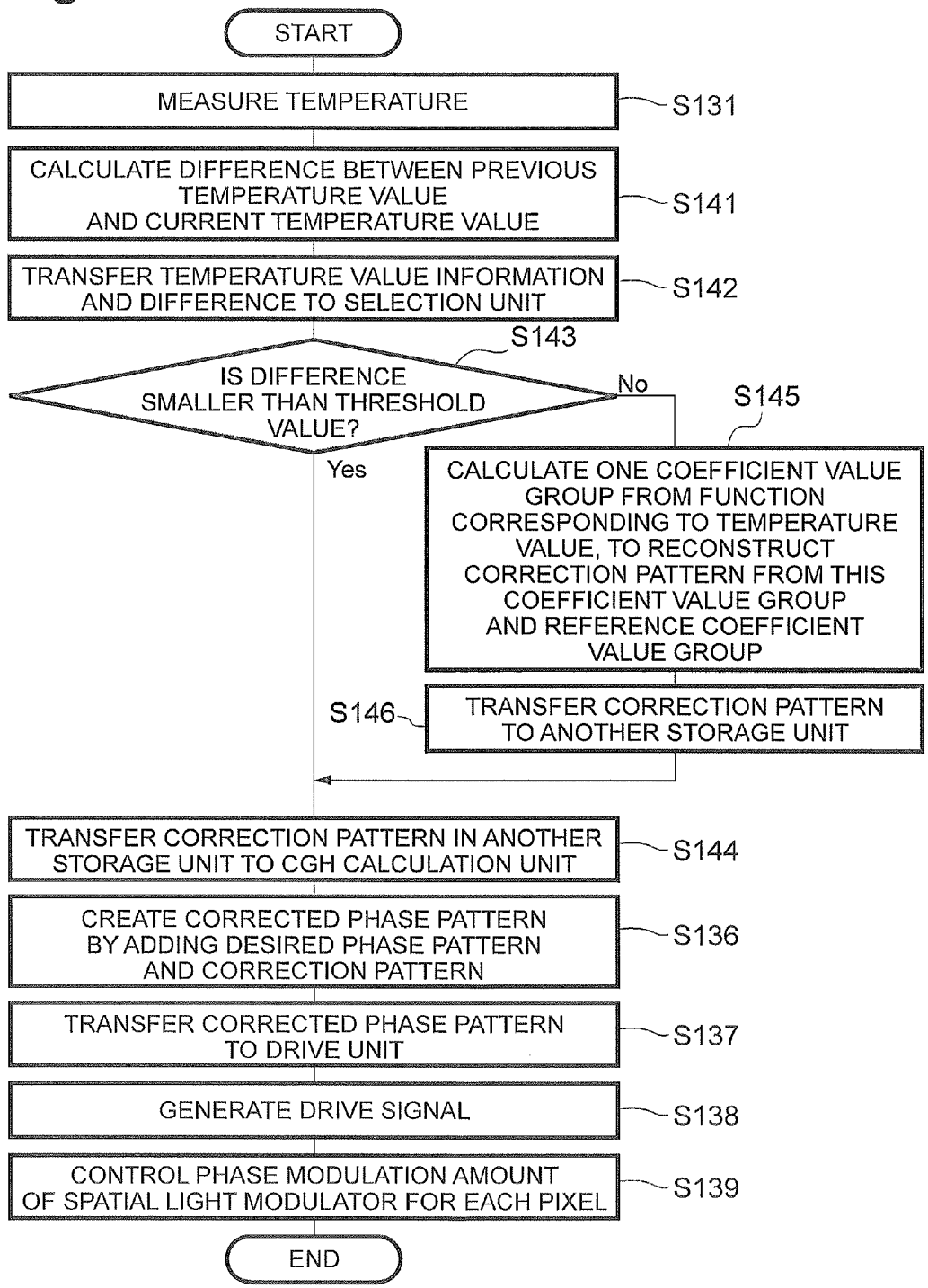
FIG. 35 is a flowchart showing an example of the operations of the control unit having another storage unit temporarily retaining a reconstructed correction pattern in the fifth embodiment.

FIG. 35 is a flowchart showing an example of the operations of the control unit 20E having such a configuration. First, the temperature sensor control unit 21 determines a current temperature value of the spatial light modulator 10 (Temperature acquisition step S131). Next, a difference between the temperature value calculated last time and the current temperature value is calculated (Step S141). Then, the current temperature value is stored in the memory, and the current temperature value and the difference are transferred to the selection unit (Step S142). It is judged whether the difference and the threshold value are large or small in the selection unit (Step S143), and in the case where the difference is smaller than the threshold value (Yes in Step S143), the correction pattern P6 stored in the other storage unit is transferred to the computer generated hologram calculation unit 25 (Step S144). Further, in the case where the difference is greater than the threshold value (No in Step S143), the coefficient value calculation unit 38 reads out a function stored in the storage unit 34, and applies the temperature value Ts to this function, thereby calculating one coefficient value group. Moreover, the correction pattern reconstruction unit 41 reconstructs one correction pattern P6 from the calculated coefficient value group and the reference coefficient value group (Step S145). This correction pattern P6 is transferred to the other storage unit (Step S146), and is further transferred from the other storage unit to the computer generated hologram calculation unit 25 (Step S144). Thereafter, processing which is the same as that in Steps S136 to S139 (refer to FIG. 34) in the present embodiment is carried out.

Further, in the present embodiment, the control unit 20E has two storage units which are the storage unit 34 and the storage unit 40, however, the control unit 20E may have one storage unit into which these storage units are integrated.

Fourth Modification

Here, a modification of the control unit 20E according to the fifth embodiment will be described. In the present modification, the storage unit 40 stores a coefficient value group for the correction pattern at the reference temperature in place of the reference coefficient value group described above. Further, the storage unit 34 stores the N difference functions in the same way as the third modification described above. In this way, the storage units 34 and 40 in the present modification store the coefficient value group for the correction pattern at the reference temperature and the N difference functions (functions showing amounts of changes from the coefficient values at the reference temperature), thereby substantially storing a function of the N coefficient value groups calculated from the N correction patterns and the temperature values.

Figure 36:
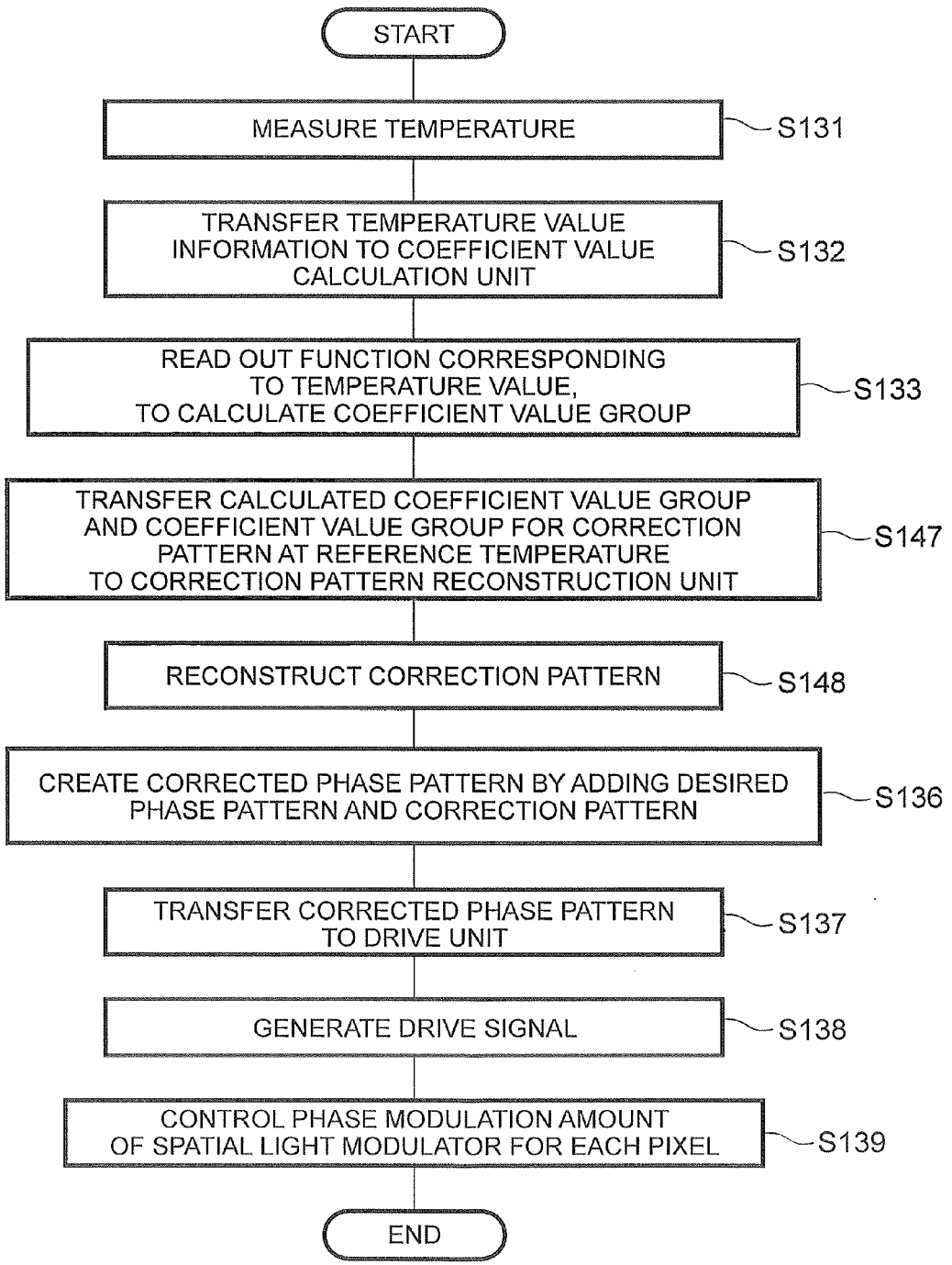
FIG. 36 is a flowchart showing the operations of a control unit according to a fourth modification.

FIG. 36 is a flowchart showing the operations of the control unit 20E having such a configuration. First, the temperature sensor control unit 21 acquires a temperature signal Stemp from the temperature sensor 17, and determines a current temperature value Ts of the spatial light modulator 10 based on the temperature signal Stemp (Temperature acquisition step S131). The information on this temperature value Ts is transferred from the temperature sensor control unit 21 to the calculation unit 38 (Step S132). Next, the coefficient value calculation unit 38 reads out the functions of the respective coefficient values stored in the storage unit 34 sequentially, and applies the temperature value Ts to these functions. Thereby, respective coefficient values corresponding to the temperature value Ts can be obtained (Step S133). Then, this coefficient value group is transferred from the coefficient value calculation unit 38 to the correction pattern reconstruction unit 41, and the coefficient value group for the correction pattern at the reference temperature is transferred from the storage unit 40 to the correction pattern reconstruction unit 41 (Step S147). The correction pattern reconstruction unit 41 reconstructs one correction pattern P6 by adding these coefficient value groups (Step S148). The reconstructed correction pattern P6 is transferred to the computer generated hologram calculation unit 25. Thereafter, processing which is the same as that in Steps S136 to S139 (refer to FIG. 34) in the above-described embodiment is carried out.

In addition, in the present modification, in the same way as the third modification described above, the data creation method is slightly different from that of the fifth embodiment. First, phase distortion of an emitted optical image L3 in the spatial light modulator 10 at a reference temperature (for example, at room temperature of 25° C.) is measured. Next, phase distortions of the emitted optical image L3 at respective temperatures are measured, to generate difference patterns between the phase distortion at the reference temperature and the phase distortions at the respective temperatures. This difference pattern is expressed by, for example, a tenth-order associated Legendre polynomial, to calculate coefficient values at the respective orders of the orthonormal function such as an associated Legendre polynomial. These coefficient values are expressed as functions with a temperature as a variable, thereby it is possible to create a difference function to be stored in the storage unit 34.

As exemplified in the present modification, the storage units 34 and 40 may substantially store a function of N coefficient value groups calculated from the N correction patterns and the temperature values by various manners. Even in such a case, it is possible to preferably obtain the operation and effect which are the same as those in the third embodiment.

In addition, in the present modification as well, in the case where the spatial light modulator 10 has a plurality of the temperature sensors 17, a temperature sensor 17 to be used for measurement is selected from among the plurality of temperature sensors 17, and the temperature sensor control unit 21 may determine a current temperature value Ts of the spatial light modulator 10 based on the temperature signal Stemp provided from the selected temperature sensor 17. In this case, a single storage unit 34 and a coefficient value calculation unit 38 may be provided respectively for the single temperature sensor 17. Or, two or more temperature sensors 17 to be used for measurement may be selected from among the plurality of temperature sensors 17, and the temperature sensor control unit 21 may determine two or more temperature values corresponding to these based on the two or more temperature signals Stemp provided from the selected two or more temperature sensors 17, and an average value of these temperature values, or a temperature correction value weighed according to a measurement point is calculated, and the value may be set as a temperature value Ts. In this case, a single storage unit 34 and a coefficient value calculation unit 38 may be provided respectively for a plurality of combinations of the temperature sensors 17.

Further, in the present modification, the temperature sensor control unit 21 may retain N temperature values corresponding to the N difference coefficient value groups in advance, and may select one temperature value from among the N temperature values based on the temperature signal Stemp, or may generate a temperature value Ts by preprocessing the temperature information on the temperature signal Stemp such as multiplying the temperature signal Stemp by a correction coefficient.

Further, in the present modification, a plurality of coefficient value groups to be stored in the storage unit 40 may be prepared so as to correspond to a plurality of reference temperature values. In that case, it is preferable that the control unit 20E further has a selection unit which selects one coefficient value group from the plurality of coefficient value groups stored in the storage unit 40.

Further, in the present modification, in the case where a temperature change in the spatial light modulator 10 is gradual, or the accuracy of temperature correction to be required is relatively low, another storage unit (for example, a frame memory or the like) for temporarily retaining the correction pattern P6 reconstructed by the correction pattern reconstruction unit 41 may be provided for the control unit 20E, and the correction pattern P6 may be appropriately read out of the other storage unit, thereby decreasing the frequency of operations of the coefficient value calculation unit 38 and the correction pattern reconstruction unit 41. In that case, it is preferable that the control unit 20E further has means for storing a temperature value corresponding to the correction pattern P6 stored in the other storage unit, and means for calculating a difference between the temperature value and the current temperature value Ts in addition to the other storage unit. Then, in the case where this difference is smaller than a threshold value, the correction pattern P6 stored in the other storage unit can be transferred to the computer generated hologram calculation unit 25.

Further, in the present modification, the control unit 20E may have the coefficient value calculation units 38 and the storage units 34 which are the same in number of the difference functions. Thereby making parallel arithmetic processing possible, it becomes possible to further speed up the calculations.

Further, in the present modification, the control unit 20E has two storage units which are the storage unit 34 and the storage unit 40, however, the control unit 20E may have one storage unit into which these storage units are integrated.

The spatial light modulation device and the spatial light modulation method according to the present invention are not limited to the embodiments described above, and other various modifications are possible. For example, the spatial light modulation devices according to the respective embodiments described above may further have means (for example, an interferometric measuring device such as a Michelson interferometer, or a wavefront sensor such as a Shack-Hartmann sensor) for measuring wavefront phase distortion of the emitted optical image L3 (or the Fourier optical image L4) of the spatial light modulator 10. With this, it is possible to measure wavefront phase distortion at room temperature (reference temperature), and calculate a correction pattern based on the measurement results in the spatial light modulation device. Further, in this case, it is possible to create a correction pattern at any temperature serving as a reference temperature by further including a device which controls a temperature of the spatial light modulator 10 and the optical system to a certain reference temperature other than room temperature. Further, in this case, it is preferable that the spatial light modulation devices according to the second to fifth embodiments further have a device which transforms a calculated correction pattern into a coefficient value group. Moreover, it is more preferable that the spatial light modulation devices according to the third to fifth embodiments further have a device which transforms a coefficient value group into a function with a function as a variable.

Further, the spatial light modulation devices according to the respective embodiments described above may further have a mechanism for controlling a temperature of the spatial light modulator 10. With this, it is possible to correct phase distortion with a higher degree of accuracy.

Further, in the respective embodiments described above, the case where the pixel electrodes of the spatial light modulator are two-dimensionally arrayed in a plurality of rows and a plurality of columns has been exemplified, however, the spatial light modulator in the present invention is not limited to this, and may have a configuration, for example, in which a plurality of pixel electrodes are one-dimensionally arrayed.

A first spatial light modulation device according to the above-described embodiments includes (1) a spatial light modulator that modulates a phase of incident light for each of a plurality of pixels one-dimensionally or two-dimensionally arrayed, (2) a temperature sensor that generates a temperature signal which is a signal corresponding to a temperature of the spatial light modulator, and (3) a control unit that provides a drive signal for controlling a phase modulation amount for each of the plurality of pixels to the spatial light modulator. The control unit has storage means storing N correction patterns which are created so as to correspond to N (N is an integer equal to or greater than 2) temperature values of the spatial light modulator in order to correct phase distortion of the spatial light modulator. The control unit selects one correction pattern from among the N correction patterns according to a temperature value indicated by the temperature signal, and generates the drive signal based on a corrected phase pattern which is created by adding the one correction pattern to a desired phase pattern.

Further, a first spatial light modulation method according to the above-described embodiments which uses a spatial light modulator modulating a phase of incident light for each of a plurality of pixels one-dimensionally or two-dimensionally arrayed, the spatial light modulation method includes (1) a temperature acquisition step of acquiring a temperature signal which is a signal corresponding to a temperature of the spatial light modulator from a temperature sensor, (2) a correction pattern selection step of selecting one correction pattern according to a temperature value indicated by the temperature signal from among N correction patterns created in advance so as to correspond to N (N is an integer equal to or greater than 2) temperature values of the spatial light modulator in order to correct phase distortion of the spatial light modulator, (3) a drive signal generation step of generating a drive signal based on a corrected phase pattern which is created by adding the one correction pattern to a desired phase pattern, and (4) a modulation control step of controlling a phase modulation amount for each of the plurality of pixels by the drive signal.

A second spatial light modulation device according to the above-described embodiments includes (1) a spatial light modulator that modulates a phase of incident light for each of a plurality of pixels one-dimensionally or two-dimensionally arrayed, (2) a temperature sensor that generates a temperature signal which is a signal corresponding to a temperature of the spatial light modulator, and (3) a control unit that provides a drive signal for controlling a phase modulation amount for each of the plurality of pixels to the spatial light modulator. The control unit has storage means storing N coefficient value groups calculated from N correction patterns which are created so as to correspond to N (N is an integer equal to or greater than 2) temperature values of the spatial light modulator in order to correct phase distortion of the spatial light modulator. The control unit selects one coefficient value group from among the N coefficient value groups according to a temperature value indicated by the temperature signal, and generates the drive signal based on a corrected phase pattern which is created by adding the correction pattern reconstructed from the one coefficient value group to a desired phase pattern.

Further, a second spatial light modulation method according to the above-described embodiments which uses a spatial light modulator that modulates a phase of incident light for each of a plurality of pixels one-dimensionally or two-dimensionally arrayed, the spatial light modulation method includes (1) a temperature acquisition step of acquiring a temperature signal which is a signal corresponding to a temperature of the spatial light modulator from a temperature sensor, (2) a coefficient value group selection step of selecting one coefficient value group according to a temperature value indicated by the temperature signal from among N coefficient value groups calculated in advance from N correction patterns which are created so as to correspond to N (N is an integer equal to or greater than 2) temperature values of the spatial light modulator in order to correct phase distortion of the spatial light modulator, (3) a drive signal generation step of generating a drive signal based on a corrected phase pattern which is created by adding the correction pattern reconstructed from the one coefficient value group to a desired phase pattern, and (4) a modulation control step of controlling a phase modulation amount for each of the plurality of pixels by the drive signal.

A third spatial light modulation device according to the above-described embodiments includes (1) a spatial light modulator that modulates a phase of incident light for each of a plurality of pixels one-dimensionally or two-dimensionally arrayed, (2) a temperature sensor that generates a temperature signal which is a signal corresponding to a temperature of the spatial light modulator, and (3) a control unit that provides a drive signal for controlling a phase modulation amount for each of the plurality of pixels to the spatial light modulator. The control unit has storage means storing a function of the temperature value and N coefficient value groups calculated from N correction patterns which are created so as to correspond to N (N is an integer equal to or greater than 2) temperature values of the spatial light modulator in order to correct phase distortion of the spatial light modulator. The control unit calculates one coefficient value group from among the N coefficient value groups by applying a temperature value indicated by the temperature signal to the function, and generates the drive signal based on a corrected phase pattern which is created by adding the correction pattern reconstructed from the one coefficient value group to a desired phase pattern.

Further, a third spatial light modulation method according to the above-described embodiments which uses a spatial light modulator that modulates a phase of incident light for each of a plurality of pixels one-dimensionally or two-dimensionally arrayed, the spatial light modulation method includes (1) a temperature acquisition step of acquiring a temperature signal which is a signal corresponding to a temperature of the spatial light modulator from a temperature sensor, (2) a coefficient value group calculation step of calculating one coefficient value group from among N coefficient value groups by applying a temperature value indicated by the temperature signal to a function of the temperature value and the N coefficient value groups calculated from N correction patterns which are created so as to correspond to N (N is an integer equal to or greater than 2) temperature values of the spatial light modulator in order to correct phase distortion of the spatial light modulator, (3) a drive signal generation step of generating a drive signal based on a corrected phase pattern which is created by adding the correction pattern reconstructed from the one coefficient value group to a desired phase pattern, and (4) a modulation control step of controlling a phase modulation amount for each of the plurality of pixels by the drive signal.

Further, in the respective spatial light modulation devices described above, the respective N coefficient value groups may contain only coefficient values dependent on a temperature of the spatial light modulator, the storage means may further store a reference phase pattern created by subtracting the phase pattern reconstructed from the coefficient values dependent on a temperature of the spatial light modulator from the correction pattern at the reference temperature, and the control unit may create the corrected phase pattern by adding the correction pattern and the reference phase pattern to the desired phase pattern. In the same way, in the respective spatial light modulation methods described above, the respective N coefficient value groups may contain only coefficient values dependent on a temperature of the spatial light modulator, and in the drive signal generation step, the corrected phase pattern may be created by adding a reference phase pattern which is created in advance by subtracting the phase pattern reconstructed from the coefficient values dependent on a temperature of the spatial light modulator from the correction pattern at the reference temperature, and the correction pattern to the desired phase pattern.

Further, in the respective spatial light modulation devices described above, the respective N coefficient value groups may contain only coefficient values whose degrees of dependence on a temperature of the spatial light modulator are higher than a reference, the storage means may further store a second coefficient value group containing only coefficient values whose degrees of dependence on a temperature of the spatial light modulator are lower than the reference, and the control unit may create the corrected phase pattern by adding the correction pattern reconstructed from a coefficient value group obtained by combining the one coefficient value group and the second coefficient value group, to the desired phase pattern. In the same way, in the respective spatial light modulation methods described above, the respective N coefficient value groups may contain only coefficient values whose degrees of dependence on a temperature of the spatial light modulator are higher than a reference, and in the drive signal generation step, the corrected phase pattern may be created by adding the correction pattern which is reconstructed from a coefficient value group obtained by combining a second coefficient value group containing only coefficient values whose degrees of dependence on a temperature of the spatial light modulator are lower than the reference, and the one coefficient value group to the desired phase pattern.

Further, it is preferable that the respective spatial light modulation devices described above further includes a mechanism for controlling a temperature of the spatial light modulator.

Further, the respective spatial light modulation devices described above may further include a light source that generates the incident light and an optical component that guides the incident light from the light source to the spatial light modulator, each of the N correction patterns may be created such that, when a temperature value indicated by the temperature signal is a corresponding temperature value among the N temperature values, the incident light is made incident from the light source into the spatial light modulator in a state in which the drive signal is not provided for the spatial light modulator, and a sign of a phase pattern of emitted light emitted from the spatial light modulator is inverted. In this case, it is preferable that the spatial light modulation device further has a measurement unit that measures a phase pattern of the emitted light, and a correction pattern creation unit that creates the N correction patterns by inverting the sign of the phase patterns of the emitted light.

INDUSTRIAL APPLICABILITY

The present invention is applicable as a spatial light modulation device and a spatial light modulation method which are capable of suppressing distortion in a phase distribution according to a temperature change in a spatial light modulator while suppressing a delay in operation.

REFERENCE SIGNS LIST

1A—spatial light modulation device, 2—light source, 3—spatial filter, 4—collimator lens, 5—Fourier transform lens, 6—processing object, 10—spatial light modulator, 11—silicon substrate, 12—liquid crystal layer, 12a—liquid crystal molecule, 13—electrode, 13a—pixel electrode, 14—electrode, 15—glass substrate, 16—spacer, 17—temperature sensor, 18—reflecting mirror, 19a, 19b—orientation film, 20A to 20E—control unit, 21—temperature sensor control unit, 22—storage unit, 23, 23a—selection unit, 24—computer generated hologram creation unit, 25—computer generated hologram calculation unit, 26—drive unit, 27—storage unit, 28—selection unit, 29—correction pattern reconstruction unit, 31—storage unit, 32—coefficient value calculation unit, 33—correction pattern reconstruction unit, 34—storage unit, 35—temperature dependent component calculation unit, 36—storage unit, 37—selection unit, 38—coefficient value calculation unit, 40—storage unit, 41—correction pattern reconstruction unit, A1 to A4—coefficient value group, A5—reference coefficient value group, L1—light, L2, L3—optical image, L4—Fourier optical image, P1—correction pattern, P2—computer generated hologram, P3—corrected phase pattern, P4—correction pattern, P5—reference phase pattern, P6—correction pattern, SD—drive signal, Stemp—temperature signal, Ts—temperature value.

The invention claimed is:

1. A spatial light modulation device comprising:
a spatial light modulator modulating a phase of incident light for each of a plurality of pixels one-dimensionally or two-dimensionally arrayed;
a temperature sensor generating a temperature signal which is a signal corresponding to a temperature of the spatial light modulator; and
a control unit providing a drive signal for controlling a phase modulation amount for each of the plurality of pixels to the spatial light modulator, wherein
the spatial light modulator has a silicon substrate, a liquid crystal layer provided on the silicon substrate, a first electrode disposed between the silicon substrate and the liquid crystal layer, and a second electrode provided at a position so as to sandwich the liquid crystal layer with the first electrode,
the control unit
has storage means storing N correction patterns which are created as correction phase patterns so as to correspond to N (N is an integer not less than 2) temperature values of the spatial light modulator in order to correct phase distortion of the spatial light modulator caused by a warpage of the silicon substrate due to a temperature change in the spatial light modulator, and selects one correction pattern from among the N correction patterns according to a temperature value indicated by the temperature signal, and generates the drive signal based on a corrected phase pattern which is created by adding the one correction pattern to a desired phase pattern.

2. A spatial light modulation device comprising:
a spatial light modulator modulating a phase of incident light for each of a plurality of pixels one-dimensionally or two-dimensionally arrayed;
a temperature sensor generating a temperature signal which is a signal corresponding to a temperature of the spatial light modulator; and
a control unit providing a drive signal for controlling a phase modulation amount for each of the plurality of pixels to the spatial light modulator, wherein
the spatial light modulator has a silicon substrate, a liquid crystal layer provided on the silicon substrate, a first electrode disposed between the silicon substrate and the liquid crystal layer, and a second electrode provided at a position so as to sandwich the liquid crystal layer with the first electrode,
the control unit
has storage means storing N coefficient value groups calculated from N correction patterns which are created as correction phase patterns so as to correspond to N (N is an integer not less than 2) temperature values of the spatial light modulator in order to correct phase distortion of the spatial light modulator caused by a warpage of the silicon substrate due to a temperature change in the spatial light modulator, and
selects one coefficient value group from among the N coefficient value groups according to a temperature value indicated by the temperature signal, and generates the drive signal based on a corrected phase pattern which is created by adding the correction pattern reconstructed from the one coefficient value group to a desired phase pattern.

3. A spatial light modulation device comprising:
a spatial light modulator modulating a phase of incident light for each of a plurality of pixels one-dimensionally or two-dimensionally arrayed;
a temperature sensor generating a temperature signal which is a signal corresponding to a temperature of the spatial light modulator; and
a control unit providing a drive signal for controlling a phase modulation amount for each of the plurality of pixels to the spatial light modulator, wherein
the spatial light modulator has a silicon substrate, a liquid crystal layer provided on the silicon substrate, a first electrode disposed between the silicon substrate and the liquid crystal layer, and a second electrode provided at a position so as to sandwich the liquid crystal layer with the first electrode,
the control unit
has storage means storing a function of the temperature value and N coefficient value groups calculated from N correction patterns which are created as correction phase patterns so as to correspond to N (N is an integer not less than 2) temperature values of the spatial light modulator in order to correct phase distortion of the spatial light modulator caused by a warpage of the silicon substrate due to a temperature change in the spatial light modulator, and calculates one coefficient value group from among the N coefficient value groups by applying a temperature value indicated by the temperature signal to the function, and generates the drive signal based on a corrected phase pattern which is created by adding the correction pattern reconstructed from the one coefficient value group to a desired phase pattern.

4. The spatial light modulation device according to claim 2, wherein
the respective N coefficient value groups contain only coefficient values dependent on a temperature of the spatial light modulator,
the storage means further stores a reference phase pattern created by subtracting a phase pattern reconstructed from the coefficient values dependent on a temperature of the spatial light modulator from the correction pattern at a reference temperature, and
the control unit creates the corrected phase pattern by adding the correction pattern and the reference phase pattern to the desired phase pattern.

5. The spatial light modulation device according to claim 2, wherein
the respective N coefficient value groups contain only coefficient values whose degrees of dependence on a temperature of the spatial light modulator are higher than a reference,
the storage means further stores a second coefficient value group containing only coefficient values whose degrees of dependence on a temperature of the spatial light modulator are lower than the reference, and
the control unit creates the corrected phase pattern by adding the correction pattern reconstructed from a coefficient value group obtained by combining the one coefficient value group and the second coefficient value group, to the desired phase pattern.

6. The spatial light modulation device according to claim 1, further comprising a mechanism for controlling a temperature of the spatial light modulator.

7. The spatial light modulation device according to claim 1, further comprising:
a light source generating the incident light; and
an optical component guiding the incident light from the light source to the spatial light modulator, wherein
each of the N correction patterns is created such that, when a temperature value indicated by the temperature signal is a corresponding temperature value among the N temperature values, the incident light is made incident from the light source into the spatial light modulator in a state in which the drive signal is not provided for the spatial light modulator, and a sign of a phase pattern of emitted light emitted from the spatial light modulator is inverted.

8. The spatial light modulation device according to claim 7, further comprising:
a measurement unit measuring a phase pattern of the emitted light; and
a correction pattern creation unit creating the N correction patterns by inverting a sign of the phase patterns of the emitted light.

9. A spatial light modulation method which uses a spatial light modulator modulating a phase of incident light for each of a plurality of pixels one-dimensionally or two-dimensionally arrayed and having a silicon substrate, a liquid crystal layer provided on the silicon substrate, a first electrode disposed between the silicon substrate and the liquid crystal layer, and a second electrode provided at a position so as to sandwich the liquid crystal layer with the first electrode, the spatial light modulation method comprising:

a temperature acquisition step of acquiring a temperature signal which is a signal corresponding to a temperature of the spatial light modulator from a temperature sensor;

a correction pattern selection step of selecting one correction pattern according to a temperature value indicated by the temperature signal from among N correction patterns which are created in advance as correction phase patterns so as to correspond to N (N is an integer not less than 2) temperature values of the spatial light modulator in order to correct phase distortion of the spatial light modulator caused by a warpage of the silicon substrate due to a temperature change in the spatial light modulator;

a drive signal generation step of generating a drive signal based on a corrected phase pattern which is created by adding the one correction pattern to a desired phase pattern; and a modulation control step of controlling a phase modulation amount for each of the plurality of pixels by the drive signal.

10. A spatial light modulation method which uses a spatial light modulator modulating a phase of incident light for each of a plurality of pixels one-dimensionally or two-dimensionally arrayed and having a silicon substrate, a liquid crystal layer provided on the silicon substrate, a first electrode disposed between the silicon substrate and the liquid crystal layer, and a second electrode provided at a position so as to sandwich the liquid crystal layer with the first electrode, the spatial light modulation method comprising:

a temperature acquisition step of acquiring a temperature signal which is a signal corresponding to a temperature of the spatial light modulator from a temperature sensor;

a coefficient value group selection step of selecting one coefficient value group according to a temperature value indicated by the temperature signal from among N coefficient value groups calculated in advance from N correction patterns which are created as correction phase patterns so as to correspond to N (N is an integer not less than 2) temperature values of the spatial light modulator in order to correct phase distortion of the spatial light modulator caused by a warpage of the silicon substrate due to a temperature change in the spatial light modulator;

a drive signal generation step of generating a drive signal based on a corrected phase pattern which is created by adding the correction pattern reconstructed from the one coefficient value group to a desired phase pattern; and a modulation control step of controlling a phase modulation amount for each of the plurality of pixels by the drive signal.

11. A spatial light modulation method which uses a spatial light modulator modulating a phase of incident light for each of a plurality of pixels one-dimensionally or two-dimensionally arrayed and having a silicon substrate, a liquid crystal layer provided on the silicon substrate, a first electrode disposed between the silicon substrate and the liquid crystal layer, and a second electrode provided at a position so as to sandwich the liquid crystal layer with the first electrode, the spatial light modulation method comprising:

a temperature acquisition step of acquiring a temperature signal which is a signal corresponding to a temperature of the spatial light modulator from a temperature sensor;

a coefficient value group calculation step of calculating one coefficient value group from among N coefficient value groups by applying a temperature value indicated by the temperature signal to a function of the temperature value and the N coefficient value groups calculated from N correction patterns which are created as correction phase patterns so as to correspond to N (N is an integer not less than 2) temperature values of the spatial light modulator in order to correct phase distortion of the spatial light modulator caused by a warpage of the silicon substrate due to a temperature change in the spatial light modulator;

a drive signal generation step of generating a drive signal based on a corrected phase pattern which is created by adding the correction pattern reconstructed from the one coefficient value group to a desired phase pattern; and a modulation control step of controlling a phase modulation amount for each of the plurality of pixels by the drive signal.

12. The spatial light modulation method according to claim 10, wherein the respective N coefficient value groups contain only coefficient values dependent on a temperature of the spatial light modulator, and in the drive signal generation step, the corrected phase pattern is created by adding a reference phase pattern which is created in advance by subtracting a phase pattern reconstructed from the coefficient values dependent on a temperature of the spatial light modulator from the correction pattern at a reference temperature, and the correction pattern to the desired phase pattern.

13. The spatial light modulation method according to claim 10, wherein the respective N coefficient value groups contain only coefficient values whose degrees of dependence on a temperature of the spatial light modulator are higher than a reference, and in the drive signal generation step, the corrected phase pattern is created by adding the correction pattern which is reconstructed from a coefficient value group obtained by combining a second coefficient value group containing only coefficient values whose degrees of dependence on a temperature of the spatial light modulator are lower than the reference, and the one coefficient value group to the desired phase pattern.

14. The spatial light modulation method according to claim 11, wherein the respective N coefficient value groups contain only coefficient values dependent on a temperature of the spatial light modulator, and in the drive signal generation step, the corrected phase pattern is created by adding a reference phase pattern which is created in advance by subtracting a phase pattern reconstructed from the coefficient values dependent on a temperature of the spatial light modulator from the correction pattern at a reference temperature, and the correction pattern to the desired phase pattern.

15. The spatial light modulation method according to claim 11, wherein the respective N coefficient value groups contain only coefficient values whose degrees of dependence on a temperature of the spatial light modulator are higher than a reference, and in the drive signal generation step, the corrected phase pattern is created by adding the correction pattern which is reconstructed from a coefficient value group obtained by combining a second coefficient value group containing only coefficient values whose degrees of dependence on a temperature of the spatial light modulator are lower than the reference, and the one coefficient value group to the desired phase pattern.

16. The spatial light modulation device according to claim 2, further comprising a mechanism for controlling a temperature of the spatial light modulator.

17. The spatial light modulation device according to claim 2, further comprising:
a light source generating the incident light; and
an optical component guiding the incident light from the light source to the spatial light modulator, wherein
each of the N correction patterns is created such that, when a temperature value indicated by the temperature signal is a corresponding temperature value among the N temperature values,
the incident light is made incident from the light source into the spatial light modulator in a state in which the drive signal is not provided for the spatial light modulator, and a sign of a phase pattern of emitted light emitted from the spatial light modulator is inverted.

18. The spatial light modulation device according to claim 17, further comprising:
a measurement unit measuring a phase pattern of the emitted light; and
a correction pattern creation unit creating the N correction patterns by inverting a sign of the phase patterns of the emitted light.

19. The spatial light modulation device according to claim 3, wherein
the respective N coefficient value groups contain only coefficient values dependent on a temperature of the spatial light modulator,
the storage means further stores a reference phase pattern created by subtracting a phase pattern reconstructed from the coefficient values dependent on a temperature of the spatial light modulator from the correction pattern at a reference temperature, and
the control unit creates the corrected phase pattern by adding the correction pattern and the reference phase pattern to the desired phase pattern.

20. The spatial light modulation device according to claim 3, wherein
the respective N coefficient value groups contain only coefficient values whose degrees of dependence on a temperature of the spatial light modulator are higher than a reference,
the storage means further stores a second coefficient value group containing only coefficient values whose degrees of dependence on a temperature of the spatial light modulator are lower than the reference, and
the control unit creates the corrected phase pattern by adding the correction pattern reconstructed from a coefficient value group obtained by combining the one coefficient value group and the second coefficient value group, to the desired phase pattern.

21. The spatial light modulation device according to claim 3, further comprising a mechanism for controlling a temperature of the spatial light modulator.

22. The spatial light modulation device according to claim 3, further comprising:
a light source generating the incident light; and
an optical component guiding the incident light from the light source to the spatial light modulator, wherein
each of the N correction patterns is created such that, when a temperature value indicated by the temperature signal is a corresponding temperature value among the N temperature values, the incident light is made incident from the light source into the spatial light modulator in a state in which the drive signal is not provided for the spatial light modulator, and a sign of a phase pattern of emitted light emitted from the spatial light modulator is inverted.

23. The spatial light modulation device according to claim 22, further comprising:
a measurement unit measuring a phase pattern of the emitted light; and
a correction pattern creation unit creating the N correction patterns by inverting a sign of the phase patterns of the emitted light.

* * * * *